US011397721B2

(12) United States Patent
Raman et al.

(10) Patent No.: US 11,397,721 B2
(45) Date of Patent: Jul. 26, 2022

(54) MERGING CONFLICT RESOLUTION FOR MULTI-MASTER DISTRIBUTED DATABASES

(71) Applicant: Microsoft Technology Licensing, LLC, Redmond, WA (US)

(72) Inventors: Karthik Raman, Sammamish, WA (US); Momin Mahmoud Al-Ghosien, Sammamish, WA (US); Bhalakumaaran Erode Ranganathan, Bellevue, WA (US); Madhan Gajendran, Bengaluru (IN); Ji Huang, Bothell, WA (US); Atul Katiyar, Sammamish, WA (US); Mikhail Mikhailovich Koltachev, Redmond, WA (US); Sujit Vattathil Kuruvilla, Redmond, WA (US); Digvijaysinh Govindbhai Makwana, Seattle, WA (US); Subramanyam Pattipaka, Bellevue, WA (US); Ovidiu Constantin Platon, Redmond, WA (US); Ankur Savailal Shah, Redmond, WA (US); Pankaj Sharma, Kirkland, WA (US); Dharma Shukla, Bellevue, WA (US); Shreshth Singhal, Seattle, WA (US); Shireesh Kumar Thota, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 574 days.

(21) Appl. No.: 16/209,647

(22) Filed: Dec. 4, 2018

(65) Prior Publication Data

US 2019/0340168 A1 Nov. 7, 2019

Related U.S. Application Data

(60) Provisional application No. 62/668,226, filed on May 7, 2018.

(51) Int. Cl.
*G06F 17/00* (2019.01)
*G06F 16/23* (2019.01)
(Continued)

(52) U.S. Cl.
CPC ........ *G06F 16/2365* (2019.01); *G06F 9/5077* (2013.01); *G06F 11/2007* (2013.01);
(Continued)

(58) Field of Classification Search
CPC ............................ G06F 16/2365; G06F 16/27
See application file for complete search history.

(56) References Cited

U.S. PATENT DOCUMENTS

| 5,446,880 A | 8/1995 | Balgeman et al. |
| 5,581,753 A | 12/1996 | Terry et al. |

(Continued)

FOREIGN PATENT DOCUMENTS

| CN | 102497410 A | 6/2012 |
| CN | 104935672 A | 9/2015 |

(Continued)

OTHER PUBLICATIONS

"Notice of Allowance Issued in U.S. Appl. No. 15/991,632", dated Dec. 10, 2020, 10 Pages.

(Continued)

*Primary Examiner* — Tyler J Torgrimson
(74) *Attorney, Agent, or Firm* — Ray Quinney & Nebeker P.C; James Bullough

(57) ABSTRACT

A server set for a data set may designate a subset of "master" servers that update the data set in order to reduce data version conflicts involving mutually exclusive updates of the data set. Multi-master configurations may fulfill the performance constraints, and the subset of masters may detect and resolve data version conflicts. However, if multiple masters perform conflict resolution for a particular data (Continued)

version conflict, the resolution may produce inefficiency and redundancy (if the masters reach the same outcome) or additional data version conflicts (if the masters reach different outcomes). Instead, among the masters, a merge master may be identified that applies conflict resolution techniques to data version conflicts and forwards the conflict resolution outcome to the other masters for application to the data set to resolve the data version conflict. The other masters may temporarily store updates in a tentative update set until data version conflicts are resolved.

15 Claims, 13 Drawing Sheets

(51) Int. Cl.
| | | |
|---|---|---|
| G06F 16/27 | (2019.01) | |
| G06F 11/20 | (2006.01) | |
| G06F 16/22 | (2019.01) | |
| G06F 16/2452 | (2019.01) | |
| G06F 16/28 | (2019.01) | |
| G06F 16/25 | (2019.01) | |
| G06F 16/21 | (2019.01) | |
| H04L 67/1008 | (2022.01) | |
| G06F 9/50 | (2006.01) | |
| H04L 41/0896 | (2022.01) | |
| H04L 41/5009 | (2022.01) | |
| H04L 47/72 | (2022.01) | |
| H04L 47/762 | (2022.01) | |
| G06F 16/182 | (2019.01) | |
| G06F 16/903 | (2019.01) | |
| H04L 41/5019 | (2022.01) | |
| H04L 67/1012 | (2022.01) | |
| H04L 67/1034 | (2022.01) | |
| H04L 41/0803 | (2022.01) | |
| H04L 41/5022 | (2022.01) | |
| H04L 41/50 | (2022.01) | |
| H04L 69/24 | (2022.01) | |
| H04L 67/1029 | (2022.01) | |

(52) U.S. Cl.
CPC ...... *G06F 11/2023* (2013.01); *G06F 11/2056* (2013.01); *G06F 16/184* (2019.01); *G06F 16/211* (2019.01); *G06F 16/219* (2019.01); *G06F 16/2246* (2019.01); *G06F 16/2255* (2019.01); *G06F 16/2272* (2019.01); *G06F 16/2315* (2019.01); *G06F 16/2322* (2019.01); *G06F 16/2329* (2019.01); *G06F 16/2336* (2019.01); *G06F 16/2452* (2019.01); *G06F 16/252* (2019.01); *G06F 16/258* (2019.01); *G06F 16/27* (2019.01); *G06F 16/28* (2019.01); *G06F 16/903* (2019.01); *H04L 41/0803* (2013.01); *H04L 41/0896* (2013.01); *H04L 41/5009* (2013.01); *H04L 41/5019* (2013.01); *H04L 41/5022* (2013.01); *H04L 41/5032* (2013.01); *H04L 47/72* (2013.01); *H04L 47/762* (2013.01); *H04L 67/1008* (2013.01); *H04L 67/1012* (2013.01); *H04L 67/1034* (2013.01); *H04L 69/24* (2013.01); *G06F 2201/80* (2013.01); *H04L 67/1029* (2013.01)

(56) References Cited

U.S. PATENT DOCUMENTS

| | | | |
|---|---|---|---|
| 5,581,754 A | 12/1996 | Terry et al. | |
| 5,787,262 A | 7/1998 | Shakib et al. | |
| 5,806,074 A * | 9/1998 | Souder | G06F 11/2035 |
| 5,923,850 A | 7/1999 | Barroux | |
| 6,523,032 B1 | 2/2003 | Sunkara et al. | |
| 6,535,874 B2 | 3/2003 | Purcell | |
| 6,925,457 B2 | 8/2005 | Britton et al. | |
| 7,117,221 B2 | 10/2006 | Hahn et al. | |
| 7,269,648 B1 | 9/2007 | Krishnan et al. | |
| 7,509,354 B2 | 3/2009 | McGarvey | |
| 7,606,838 B2 | 10/2009 | Tobies | |
| 7,689,599 B1 | 3/2010 | Shah et al. | |
| 7,751,331 B1 | 7/2010 | Blair et al. | |
| 7,774,473 B2 | 8/2010 | Elving et al. | |
| 7,877,644 B2 | 1/2011 | Stenzel | |
| 8,311,981 B2 | 11/2012 | Braginsky et al. | |
| 8,326,807 B2 | 12/2012 | Aiyer et al. | |
| 8,386,421 B2 | 2/2013 | Reid et al. | |
| 8,392,482 B1 | 3/2013 | McAlister et al. | |
| 8,572,022 B2 | 10/2013 | Hagan et al. | |
| 8,595,267 B2 | 11/2013 | Sivasubramanian et al. | |
| 8,694,639 B1 | 4/2014 | Vermeulen et al. | |
| 8,719,313 B2 | 5/2014 | Swett et al. | |
| 8,745,127 B2 | 6/2014 | Gopal et al. | |
| 8,824,286 B2 | 9/2014 | Lee et al. | |
| 8,862,588 B1 | 10/2014 | Gay et al. | |
| 8,880,508 B2 | 11/2014 | Jeong et al. | |
| 8,943,180 B1 | 1/2015 | Petit-Huguenin | |
| 8,972,491 B2 | 3/2015 | Abu-Libdeh et al. | |
| 9,026,493 B1 | 5/2015 | Weng | |
| 9,195,725 B2 | 11/2015 | Brown et al. | |
| 9,219,686 B2 | 12/2015 | Hilt et al. | |
| 9,225,770 B2 | 12/2015 | Wang et al. | |
| 9,230,040 B2 | 1/2016 | Shukla et al. | |
| 9,244,926 B2 | 1/2016 | Kakivaya et al. | |
| 9,292,566 B2 | 3/2016 | Golab et al. | |
| 9,356,793 B1 | 5/2016 | Drobychev et al. | |
| 9,405,474 B2 | 8/2016 | Shukla et al. | |
| 9,411,873 B2 | 8/2016 | Rath et al. | |
| 9,460,129 B2 | 10/2016 | Mann | |
| 9,462,427 B2 | 10/2016 | Patel et al. | |
| 9,471,711 B2 | 10/2016 | Abadi et al. | |
| 9,569,513 B1 | 2/2017 | Vig et al. | |
| 9,619,261 B2 | 4/2017 | Gaurav et al. | |
| 9,632,828 B1 | 4/2017 | Mehta et al. | |
| 9,645,835 B2 | 5/2017 | Phillips et al. | |
| 9,781,124 B2 | 10/2017 | Goldberg et al. | |
| 9,888,067 B1 | 2/2018 | Yemini et al. | |
| 10,521,311 B1 | 12/2019 | Greenwood et al. | |
| 10,552,443 B1 | 2/2020 | Wu et al. | |
| 2002/0035642 A1 | 3/2002 | Clarke et al. | |
| 2002/0161757 A1 | 10/2002 | Mock et al. | |
| 2003/0037283 A1 | 2/2003 | Srinivasan et al. | |
| 2003/0046396 A1 | 3/2003 | Richter et al. | |
| 2003/0135643 A1 | 6/2003 | Chiu et al. | |
| 2003/0220966 A1 | 11/2003 | Hepper et al. | |
| 2004/0230571 A1 | 11/2004 | Robertson | |
| 2004/0230619 A1 | 11/2004 | Blanco et al. | |
| 2004/0236801 A1 | 11/2004 | Borden et al. | |
| 2005/0015436 A1 * | 1/2005 | Singh | G06F 16/27 709/203 |
| 2005/0044530 A1 * | 2/2005 | Novik | H04L 67/104 717/122 |
| 2005/0138170 A1 | 6/2005 | Cherkasova et al. | |
| 2005/0160133 A1 | 7/2005 | Greenlee et al. | |
| 2006/0106879 A1 | 5/2006 | Zondervan et al. | |
| 2006/0155945 A1 | 7/2006 | Mcgarvey | |
| 2006/0224773 A1 | 10/2006 | Degenaro et al. | |
| 2006/0282836 A1 | 12/2006 | Barker | |
| 2007/0073675 A1 | 3/2007 | Kaar et al. | |
| 2008/0147627 A1 | 6/2008 | Natkovich et al. | |
| 2008/0301025 A1 | 12/2008 | Boss et al. | |
| 2009/0248737 A1 | 10/2009 | Shukla et al. | |
| 2010/0076939 A1 | 3/2010 | Iwaki et al. | |
| 2010/0082630 A1 | 4/2010 | Zagelow et al. | |
| 2010/0094838 A1 | 4/2010 | Kozak | |
| 2011/0149743 A1 | 6/2011 | Agarwal et al. | |
| 2011/0258483 A1 | 10/2011 | Elson et al. | |
| 2012/0136839 A1 | 5/2012 | Eberlein et al. | |
| 2012/0185444 A1 | 7/2012 | Sparkes et al. | |
| 2013/0064110 A1 | 3/2013 | Polinati et al. | |

(56) References Cited

U.S. PATENT DOCUMENTS

| | | | |
|---|---|---|---|
| 2013/0159253 A1 | 6/2013 | Dewall et al. | |
| 2013/0232153 A1 | 9/2013 | Dhuse et al. | |
| 2013/0254164 A1 | 9/2013 | Tsofi et al. | |
| 2014/0052761 A1 | 2/2014 | Teitelbaum | |
| 2014/0101298 A1 | 4/2014 | Shukla et al. | |
| 2014/0195514 A1 | 7/2014 | Stein | |
| 2014/0279844 A1 | 9/2014 | Shukla et al. | |
| 2014/0289382 A1 | 9/2014 | Chan et al. | |
| 2014/0297776 A1 | 10/2014 | Volvovski et al. | |
| 2014/0304371 A1 | 10/2014 | Mraz et al. | |
| 2014/0359348 A1 | 12/2014 | Volvovski et al. | |
| 2015/0026189 A1 | 1/2015 | Li et al. | |
| 2015/0154074 A1 | 6/2015 | Resch et al. | |
| 2015/0195162 A1 | 7/2015 | Gandham et al. | |
| 2015/0199134 A1 | 7/2015 | Mondal et al. | |
| 2015/0269239 A1 | 9/2015 | Swift et al. | |
| 2015/0304983 A1 | 10/2015 | Krening et al. | |
| 2016/0034433 A1 | 2/2016 | Yamat et al. | |
| 2016/0321588 A1 | 11/2016 | Das et al. | |
| 2016/0342645 A1 | 11/2016 | Tempero et al. | |
| 2017/0068713 A1 | 3/2017 | Joshi et al. | |
| 2017/0123948 A1 | 5/2017 | Dhuse et al. | |
| 2017/0199770 A1 | 7/2017 | Peteva et al. | |
| 2017/0201597 A1 | 7/2017 | Narasimhan et al. | |
| 2017/0220651 A1 | 8/2017 | Mathew et al. | |
| 2017/0286180 A1 | 10/2017 | He et al. | |
| 2017/0293540 A1 | 10/2017 | Mehta et al. | |
| 2017/0308562 A1 | 10/2017 | Sreekantaiah et al. | |
| 2017/0308601 A1 | 10/2017 | Massarenti et al. | |
| 2017/0318085 A1 | 11/2017 | Shukla et al. | |
| 2017/0364345 A1 | 12/2017 | Fontoura et al. | |
| 2018/0150331 A1 | 5/2018 | Chen et al. | |
| 2018/0189369 A1 | 7/2018 | Baek et al. | |
| 2018/0316752 A1 | 11/2018 | Hodges et al. | |
| 2019/0050216 A1 | 2/2019 | Brundidge et al. | |
| 2019/0163391 A1 | 5/2019 | Annamalai et al. | |
| 2019/0166019 A1 | 5/2019 | Jagadeesh | |
| 2019/0171737 A1 | 6/2019 | Duan et al. | |
| 2019/0196878 A1 | 6/2019 | Li | |
| 2019/0340166 A1 | 11/2019 | Raman et al. | |
| 2019/0340167 A1 | 11/2019 | Raman et al. | |
| 2019/0340168 A1 | 11/2019 | Raman et al. | |
| 2019/0340265 A1 | 11/2019 | Raman et al. | |
| 2019/0340273 A1 | 11/2019 | Raman et al. | |
| 2019/0340291 A1 | 11/2019 | Raman et al. | |
| 2019/0342188 A1 | 11/2019 | Raman et al. | |
| 2019/0342379 A1 | 11/2019 | Shukla et al. | |
| 2019/0342380 A1 | 11/2019 | Thota et al. | |
| 2020/0117748 A1 | 4/2020 | Gupte et al. | |

FOREIGN PATENT DOCUMENTS

| | | | | |
|---|---|---|---|---|
| WO | 9735270 A1 | 9/1997 | | |
| WO | 2008100795 A1 | 8/2008 | | |
| WO | WO-2008100795 A1 * | 8/2008 | ............. | H04L 29/06 |
| WO | 2010048595 A2 | 4/2010 | | |

OTHER PUBLICATIONS

"Final Office Action Issued in U.S. Appl. No. 15/991,786", dated Oct. 23, 2020, 16 Pages.

"Non Final Office Action Issued in U.S. Appl. No. 15/991,953", dated Jul. 16, 2020, 24 Pages.

"Non Final Office Action Issued In U.S. Appl. No. 15/991,632", dated Jan. 24, 2020, 23 Pages.

"Final Office Action Issued In U.S. Appl. No. 15/991,953", dated Feb. 14, 2020, 24 Pages.

Likness, Jeremy, "Getting Behind the 9-Ball: Cosmos DB Consistency Levels Explained", Retrieved From: https://blog.jeremylikness.com/blog/2018-03-23_getting-behind-the-9ball-cosmosdb-consistency-levels/, Mar. 23, 2018, 8 Pages.

Montazerolghaem, et al., "Overload Control in SIP Networks: A Heuristic Approach based on Mathematical Optimization", In Proceedings of Global Communications Conference (GLOBECOM), Dec. 6, 2015, 6 Pages.

"Conflict Resolution", Retreived from https://web.archive.org/web/20120402192233/https://docs.oracle.com/cd/E11882_01/server.112/e10706/repconflicts.htm, Apr. 2, 2012, 28 Pages.

"Conflict Resolution", Retrieved from https://docs.oracle.com/cd/F49540_01/DOC/server.815/a67791/ch6.htm, Retrieved Date: Aug. 31, 2018, 43 Pages.

"Conflict Resolution Concepts and Architecture", Retrieved from https://docs.oracle.com/cd/B10500_01/server.920/a96567/repconflicts.htm, Nov. 15, 2011, 35 Pages.

"Couchbase Server: Schemaless Data Modeling", Retrieved from https://developer.couchbase.com/documentation/server/3.x/developer/dev-guide-3.0/schemaless.html, Retrieved Date: Nov. 20, 2017, 5 Pages.

"Lotus Notes/Domino Replication Conflict Solver", Retrieved from https://web.archive.org/web/20100306134644/http://www.ytria.com/WebSite.nsf/WebPageRequest/Solutions scanEZ ConflictSolveren, Dec. 15, 2005, 2 Pages.

"Master Replication Concepts and Architecture", Retrieved from https://docs.oracle.com/cd/B10501_01/server.920/a96567/repmaster.htm, Feb. 17, 2012, 40 Pages.

"Master-master vs Master-slave Database Architecture?", Retrieved from https://stackoverflow.com/questions/3736969/master-master-vs-master-slave-database-architecture, Retrieved Date: Jul. 2, 2018, 8 Pages.

"Master-to-Slave Replication", Retrieved from https://www.IBM.com/support/knowledgecenter/en/POWER8/p8ha1/example2mastertoslavereplication.htm. Retrieved Date: Jul. 3, 2018, 4 Pages.

"Replica Set Elections", Retrieved from https://docs.mongodb.com/manual/core/replica-set-elections/, Retrieved Date Jul. 2, 2018, 6 Pages.

Afriansyah, et al., "Model of Load Balancing Using Reliable Algorithm With Multi-Agent System", In Journal of IOP Conference Series: Materials Science and Engineering, vol. 190, Issue 1, Apr. 2017, 9 Pages.

Ardagna, et al., "SLA Based Resource Allocation Policies In Autonomic Environments", In Journal of Parallel and Distributed Computing, vol. 67, Issue 3, Mar. 1, 2007, pp. 259-270.

Fernandez, et al., "Autoscaling Web Applications in Heterogeneous Cloud Infrastructures", In Proceedings of IEEE International Conference on Cloud Engineering, Mar. 11, 2014, 11 Pages.

Gunda, et al., "Multi-master at global scale with Azure Cosmos DB", Retrieved from https://docs.microsoft.com/en-us/azure/cosmos-db/multi-region-writers, May 7, 2018, 9 Pages.

Liu, et al., "Consistency as a Service: Auditing Cloud Consistency", In Journal of IEEE Transactions on Network and Service Management, vol. 11, Issue 1, Mar. 2014, pp. 25-35.

Masha, et al., "Implement a Custom Conflict Resolver for a Merge Article", Retrieved from https://docs.microsoft.com/en-us/sql/relational-databases/replication/implement-a-custom-conflict-resolver-for-a-merge-article?view=sql-server-2017, Mar. 14, 2017, 6 Pages.

Patra, Chandan, "How to Use Consistency Models for Amazon Web Services", Retrieved from https://cloudacademy.com/blog/consistency-models-of-amazon-cloud-services/, Jun. 3, 2016, 9 Pages.

Shukla, et al., "Schema-Agnostic Indexing with Azure DocumentDB", In Proceedings of 41st International Conference on Very Large Data Bases, vol. 8, Issue 12, Aug. 1, 2015, pp. 1668-1679.

Singh, et al., "Server-Storage Virtualization: Integration and Load Balancing in Data Centers", In Proceedings of ACM/IEEE Conference on Supercomputing, Nov. 15, 2008, 12 Pages.

Thomsen, Jakob Holdgaard, "Uber Engineering: The Architecture of Schemaless, Uber Engineering's Trip Datastore Using MySQL", Retrieved from https://eng.uber.com/schemaless-part-two/, Jan. 15, 2016, 8 Pages.

"Final Office Action Issued in U.S. Appl. No. 15/991,632", dated May 19, 2020, 22 Pages.

"Non-Final Office Action Issued in U.S. Appl. No. 15/991,786", dated May 8, 2020, 36 Pages.

"Non-Final Office Action Issued in U.S. Appl. No. 15/991,880", dated Jun. 10, 2020, 37 Pages.

(56) References Cited

OTHER PUBLICATIONS

Buckler, Craig, "How to Convert XML to a JSON-Like JavaScript Object", Retrieved From: http://www.sitepoint.com/how-to-convert-XML-to-a-javascript-object, Oct. 20, 2011, 9 Pages.
Chan, et al., "Taming XPath Queries by Minimizing Wildcard Steps", In Proceedings of the 30th VLDB Conference, Aug. 31, 2004, pp. 156-167.
He, et al., "Query Language and Access Methods for Graph Databases", In Book Managing and Mining Graph Data, 2010, pp. 125-160.
Kossmann, Donald, "The State of the Art in Distributed Query Processing", In ACM Computing Surveys, vol. 32, No. 4, Dec. 2000, pp. 422-469.
Kraska, et al., "Consistency Rationing in the Cloud: Pay only when it Matters", In Proceedings of the Very Large Data Bases Endowment, vol. 2, Issue 1, Aug. 24, 2009, 12 Pages.
Lim, et al., "Automated Control For Elastic Storage", In Proceedings of the 7th International Conference on Autonomic Computing, Jun. 7, 2010, pp. 1-10.
Moon, et al., "Introducing SSDs to the Hadoop MapReduce Framework", In Proceedings of 7th International Conference on Cloud Computing, Jun. 27, 2014, pp. 272-279.
Xue, et al., "COMET: Client-Oriented Metadata Servcie for Highly Available Distributed File Systems", In Proceedings of 27th International Symposium on Computer Architecture and High Performance Computing (SBAC-PAD), Oct. 17, 2015, pp. 154-161.
"Notice of Allowance Issued in U.S. Appl. No. 15/991,062", dated Mar. 18, 2020, 9 Pages.
"Non Final Office Action Issued in U.S. Appl. No. 15/991,223", dated Apr. 9, 2020, 15 Pages.
"International Search Report and Written Opinion Issued in PCT Application No. PCT/US2019/031207", dated Jul. 19, 2019, 13 Pages.
"International Search Report and Written Opinion Issued in PCT Application No. PCT/US2019/031204", dated Jul. 19, 2019, 14 Pages.
"International Search Report and Written Opinion Issued in PCT Application No. PCT/US2019/031208", dated Jul. 24, 2019, 15 Pages.
"Non Final Office Action Issued in U.S. Appl. No. 15/991,953", dated Aug. 22, 2019, 21 Pages.
"Non Final Office Action Issued in U.S. Appl. No. 16/207,176", dated Jun. 4, 2021, 14 Pages.
"Non Final Office Action Issued in U.S. Appl. No. 16/207,170", dated May 20, 2021, 21 Pages.
"Final Office Action Issued in U.S. Appl. No. 16/207,170", dated Sep. 7, 2021, 23 Pages.
"Final Office Action Issued In U.S. Appl. No. 16/207,176", dated Nov. 1, 2021, 24 Pages.

* cited by examiner

MERGING CONFLICT RESOLUTION FOR MULTI-MASTER DISTRIBUTED DATABASES

CROSS-REFERENCE TO RELATED APPLICATIONS

This application is a continuation-in-part of, and claims priority under 35 U.S.C. 35 U.S.C. §§ 119 and/or 120 to, U.S. Patent Application No. 62/668,226, entitled "Distributed Databases," filed on May 7, 2018, the entirety of which is incorporated by reference as if fully rewritten herein.

COMPUTER PROGRAM LISTING

This application includes a computer program listing, which may be found in the Supplemental Content file record of the PAIR record for the present application. The computer program listing is submitted as an ASCII text file with the filename "MultiMasterTLAPlus.txt", a file creation date of Dec. 4, 2018, and a file size of 90,793 bytes, with lines split to a maximum length of 72 characters per line as specified by 37 C.F.R. § 1.96. The computer program listing is hereby incorporated by reference in its entirety as if fully reproduced herein.

BACKGROUND

Within the field of computing, many scenarios involve a distributed data service that processes data on behalf of various workloads. In such scenarios, the workloads are often constrained by a set of performance requirements, such as low latency, high availability, scalability to accommodate surges in demand, and/or consistency guarantees of various types and levels. The performance requirements for respective workloads are often formalized in a service level agreement, whereby the provider of the distributed data service provides a guarantee that the distributed data service will satisfy the performance requirements of the workload.

The distributed data services are often configured to perform load-balancing of the workloads to satisfy the performance requirements with an efficient allocation of computing resources while upholding performance guarantees provided in service level agreements. A notable technique for maintaining a consistency guarantee for a workload involves the identification, among the distributed servers that process the workload, of a single master that is permitted to update the stored data of the workload. By limiting the updates to a single master, the distributed data service avoids the potential of data conflicts that might arise from writing data at multiple locations. The identification of a single master may also provide other advantages, such as a determinable upper bound on the delay in propagating updates across all of the other servers that process the workload, based on the calculable propagation delay from the master server to every other server. As another example, it may be advantageous to choose, as the single master, a server that is in proximity to an anticipated source of the updates, e.g., in order to reduce network transport delays and latency.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The designation of a single master as the sole server in the distributed data service that is permitted to alter the data of a workload may provide some advantages, but may also incur some disadvantages that may be significant for some workloads. As a first example, the single master may present a performance bottleneck; e.g., if write requests arrive at a faster rate than the master can process, writes may be unavoidably delayed. As a second example, latency not be reducible to a desired level, due to the propagation delays of the single master to the entire data set. As a third example, the designation of a single server as the sole source of updates may create a single point of failure; e.g., if the single-master server encounters a failure or a network partition, all capability of reliable updates to the data set may have to be postponed until a substitute server is selected, provisioned, and ready to take over as a substitute single master.

In order to alleviate the limitations of a single-master configuration of the data service, it may be desirable to permit the designation of multiple masters that are permitted to update the data set of a workload. While such designation may enable advances in the properties noted above (e.g., latency reduction, scalability, and availability), the designation of multiple masters may raise the prospect of data versioning conflicts, which, if undetected and unhandled, may compromise the integrity and logical validity of the entire data set.

Some data versioning conflicts may be resolvable by permitting respective masters to apply a conflict resolution technique, such as notifying an administrator of the workload for manual resolution; an automated resolution policy, such as first writer wins or last writer wins; or a stored procedure that provides a logic for resolving conflicts. However, such techniques may also present some disadvantages. As a first such example, various workloads that are executed by the distributed data service may involve a diverse and complex set of data elements, and it may not be viable to select a particular technique as a "one-size-fits-all" conflict resolution process for all workloads. Indeed, some workloads may require different conflict resolution techniques for different types of data. As a second such example, while it may be possible to ask an administrator to address data version conflicts, such manual and/or user-driven resolution may not be viable in some cases, e.g., where the data set is rapidly evolving such that the administrator is incapable or unwilling to service all data version conflicts, and/or where the data of the data service is at least partly defined by third parties in a manner that prevents the administrator from a full understanding of the data semantics that may be necessary to resolve data version conflicts. As a third such example, different servers may discover and resolve a particular data version conflict, but if the data version conflict resolution consumes significant computational resources, concurrent conflict evaluation and resolution by multiple masters may incur redundant processing that diverts computational resources from more productive uses. As a fourth such example, different servers may discover and resolve a particular data conflict, but may do so using different data conflict policies—leading to a continuation, or even exacerbation, of the data version conflict. Because each master server may believe that it has successfully resolved the data version conflict, the divergence of the data set may not be discovered until significantly later, at which point rollback to reconcile the choices to a single conflict resolution may be computationally expensive or even impossible.

Presented herein are techniques for providing a distributed data service in a manner that permits multiple masters to update a data set while reducing the incidence of conflict, the application of an unsuitable data version conflict resolution technique to a data set, and the performance characteristics of the distributed data service that are determinative of guarantees such as maximum latency, scalability, and/or availability.

In accordance with some embodiments of the techniques presented herein, a method is provided of resolving data version conflicts within a data set provided by a server set. The method involves executing, by a processor of a server, instructions that cause the server to identify a data version conflict involving at least two mutually incompatible updates of the data set. Execution of the instructions further causes the server to identify, within the server set, a merge master that is designated to resolve data version conflicts of the data set. Execution of the instructions further causes the server to receive a conflict resolution outcome of the data version conflict by, on condition of identifying the server as the merge master, applying a conflict resolution technique to the mutually incompatible updates to generate the conflict resolution outcome; and on condition of identifying a second server of the server set as the merge master, receiving the conflict resolution outcome from the second server. Execution of the instructions further causes the server to apply the conflict resolution outcome to the data set to resolve the data version conflict.

In accordance with some embodiments of the techniques presented herein, a server is provided that resolves data version conflicts within a data set provided by a server set. The server comprises a processor and a memory storing instructions that, when executed by the processor, cause the server to operate in accordance with the techniques presented herein. Execution of the instructions causes the server to identify a data version conflict involving at least two mutually incompatible updates of the data set. Execution of the instructions further causes the server to identify, within the server set, a merge master that is designated to resolve data version conflicts of the data set. Execution of the instructions further causes the server to receive a conflict resolution outcome of the data version conflict by, on condition of identifying the server as the merge master, applying a conflict resolution technique to the mutually incompatible updates to generate the conflict resolution outcome; and on condition of identifying a second server of the server set as the merge master, receiving the conflict resolution outcome from the second server. Execution of the instructions further causes the server to apply the conflict resolution outcome to the data set to resolve the data version conflict.

In accordance with some embodiments of the techniques presented herein, a method is provided that causes a server set to provide a data set. The method involves designating at least two servers of the server set as masters of the data set. The method further involves, among the masters, designating a merge master of the data set. The method further involves configuring non-master servers of the data set to forward updates of the data set to the masters. The method further involves configuring the servers designated as masters to apply the updates to the data set, and to identify a data version conflict involving at least two mutually incompatible updates of the data set. The method further involves configuring the merge master to apply a conflict resolution technique to the mutually incompatible updates to generate the conflict resolution outcome and to forward the conflict resolution outcome to at least one other master of the server set. The method further involves configuring masters that are not designated as the merge master to receive a conflict resolution outcome of the data version conflict from the merge master and to apply the conflict resolution outcome to the data set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
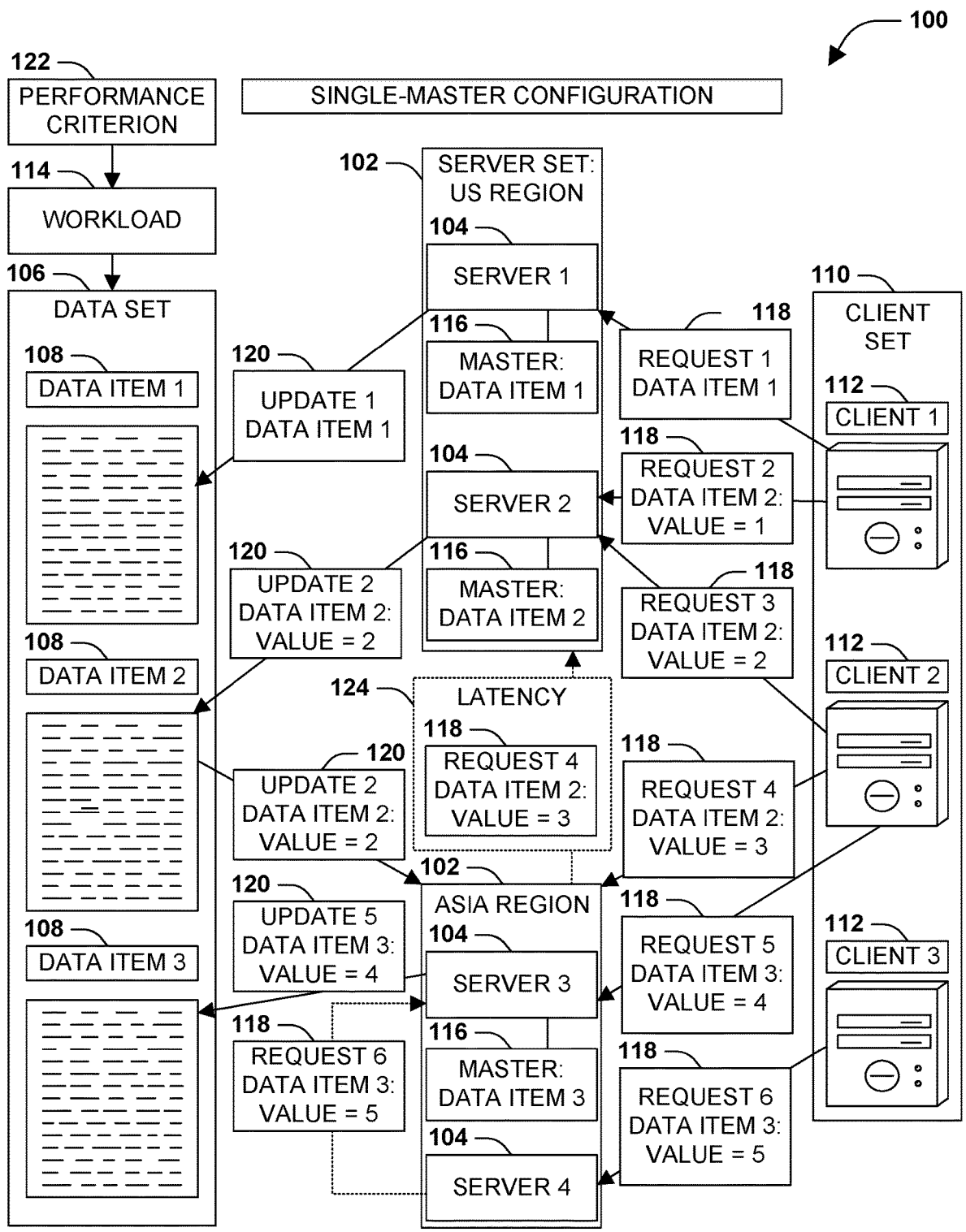
FIG. 1 is an illustration of an example scenario featuring a single-master configuration of a server set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. Introduction

Modern data services are often distributed over a set of servers in various ways, ranging from local distribution within a rack, server room, building, or campus to regional distribution over a set of cities, countries, or continents. Data services are often provided to process a set of workloads from one or more clients, such as databases that are targeted by a volume of queries. A variety of server architecture configurations may be utilized to satisfy the consistency level of a workload.

A1. Single-Master Configurations

In some scenarios, and in particular for conflict-sensitive workloads, a server architecture may be selected to ensure that updates are provided in a specific order by restricting all updates of the data set of the workload to a single "master" server. While all servers that service the workload may fulfill requests to read the data, any server except the master server that receives a write request may forward it to the master server for processing. By serving as the single point of writes to the data set, the single master server may apply all updates in a correct order and propagate updates to the other servers of the server set. In this manner, a strong consistency level may be applied to satisfy the data version conflict sensitivity of the workload.

FIG. 1 is an illustration of an example scenario 100 featuring a single-master configuration of a server set 102. In this example scenario 100, the server set 102 comprises a set of servers 104 that are distributed over a set of geographic regions, such as a first server 104 and a second server 104 that are deployed in a U.S. region and a third server 104 and a fourth server 104 that are deployed in an Asian region. The server set 102 may coordinate access to a data set 106, comprising a set of data items 108, on behalf of a client set 110 of clients 112, which may also be distributed over a set of regions. Respective clients 112 may issue requests 118 to access one or more data items 108 to a selected server 104 of the server set 102 in the context of a workload 114, such as an application, a services platform, or a task. The requests 118 may specify a read operation (such as a get request or a query such as a search) or a write operation (such as a create, update, or delete request, or a merging, splitting, or copying of data items 108). The servers 104 may share a copy of the data set 106, such as by deploying an up-to-date copy of the data set 106 to each region for local or at least proximate access by the servers 104 in the region, and a selected server 104 may fulfill a read operation by retrieving information from the local copy of a data item 108 and returning it to the client 112 in response to the request 118. However, requests 118 that involve write operations that modify one or more data items 108 of the data set 106 may be more difficult to fulfill in a manner that avoids data version conflicts. For example, a first client 112 may transmit a first request 118 to update 120 a particular data item 108 to a first value, while a second client 112 may simultaneously submit a second request 118 to update 120 the same data item 108 to a second, different value. If both requests 118 are transmitted to the same server 104, the server 104 may detect the conflicting requests 118 and may resolve the conflict in a variety of ways (e.g., selecting one write request 118 to be committed to the data set 106 as an update 120 while rejecting the other write request 118; rejecting both write requests 118 as mutually conflicting; and/or merging the write requests 118 into a single update 120 that reflects both write requests 118). However, if the first request 118 is transmitted to a first server 104 and the second request 118 is transmitted to a second server 104, each server 104 may commit the respective request 118 and then propagate the resulting update 120 to other servers 104 in the server set 102. The conflicting updates 120 may be detected after-the-fact in a manner that reveals the occurrence of a data version conflict, wherein different servers 104 ascribe different values to one or more data items 108, where the coexistence of such inconsistent and mutually incompatible updates 120 causes the servers 104 of the server set 102 to disagree about the state of the data set 106. As a result, the workload 114 may become logically inconsistent due to the conflicting updates 120, which may result in a corruption of the data set 106, a failure of the workload 114, and/or a propagation of the data version conflict to the clients 112 that utilize the data set 106 for the workload 114.

As further illustrated in the example scenario 100 of FIG. 1, the incidence of data version conflicts and consequences thereof may be avoided or reduced through the use of a single-master configuration, in which each data item 108 may be updated by only a single server 104 of the server set 102 that is designated as a master 116 of the data item 108. In this example scenario 100, the first server 104 is designated as the sole master 116 for the first data item 108; the second server 104 is designated as the sole master 116 for the second data item 108; and the third server 104 is designated as the sole master 116 for the third data item 108. Each server 104 is capable of reading any of the data items 108, but only the server 104 designated as the master 116 of a data item 108 is permitted to apply an update 120 to the data item 108. The fourth server 104 is not designated as a master 116 of any of the data items 108, but is only capable of reading the data items 108. When clients 112 send requests 118 involving a read operation, any server 104 receiving the request 118 may read the data item 108 and return the retrieved data to the client 112. However, when a request 118 involves a write operation involving a particular data item 108, the server 104 receiving the request 118 identifies the master 116 that is designated for the data item 108. If the server 104 receiving the request 118 is also the master 116 for the data item 108 involved in the request 118, the server 104 may apply the requested update 120 to data item 108 and then propagate the update 120 to other servers 104 of the server set 102 (e.g., by forwarding a notification of the update 120 to the other servers 104 and/or by synchronizing a portion of the data set 106, including the updated data item 108, with the other servers 104). For example, the first server 104 receives a first request 118 to update the first data item 108, and may handle the request 118 by updating the first data item 108. If the first request 118 had been sent to any other server 104 that is not the sole master 116, the server 104 would have refused the request 118 and/or forwarded the request 118 to the server 104 that is designated as the sole master 116. For example, when the third server 104, which is designated as the sole master 116 of the third data item 108, receives a fourth request 118 that requests an update 120 of the third data item 108, the third server 104 applies the update 120 to the third data item 108. However, when a fourth server 104, which is not a master of the third data item 108, receives a sixth request 118 to update the third data item 108, the fourth server 104 does not fulfill the request 118 by applying an update 120 to the third data item 108, but rather forwards the sixth request 118 to the third server 104, which may be permitted to update the third item 108 in accordance with its designation as the sole master 116 of the third data item 108.

The single-master configuration of the server set 102 enables the servers 104 to coordinate the application of updates 120 in a manner that may reduce data version conflicts. For example, the second server 104 is designated as the sole master 116 of the second data item 108, such that all requests 118 that involve updating the second data item 108 are forwarded to the second server 104 for evaluation. The second server 104 may apply a logic to the evaluation of requests 118 in order to select and apply updates 120 that preserve the consistency of the data set 106. For example, the logical consistency of the data set 106 may depend upon a monotonically increasing value of the second data item 108, such that a first update 120 that establishes a selected value of the second data item 108 is not chronologically followed by a second update 120 of the second data item 108 with a lower value, such as in the manner of a timestamp or monotonically increasing counter. Because all requests 118 are either received by or forwarded to the second server 104 as the sole master 116 of the second data item 108, the second server 104 may evaluate each request 118 in a sequence, such as in order of receipt or timestamp, and may verify that updates 120 to the second data item 108 are only applied in a manner that achieves a monotonically increasing value for the second data item 108. If a request 118 is received that involves an update 120 of the second data item 108 that causes the data set 106 to be logically inconsistent in view of past updates 120 and the current state of the second data item 108, the second server 104 may choose not to apply the update 120 and may refuse the request 118. Alternatively, the second server 104 may be able to initiate a remedial measure that enables the fulfillment of the second request 118 in a manner that preserves the logical consistency of the second data item 108. For example, if the request 118 is to update a monotonically increasing value (currently 3) to 4, but the request 118 is received after an earlier but still pending request 118 to update the value to 5, the second server 104 may reorder the sequence of the requests 118 in order to apply the corresponding updates 120 in a manner that enables the value of the second data item 108 to remain monotonically increasing.

The designation of the second server 104 as the sole master 116 for the second data item 108 also avoids data version conflicts that arise due to a set of requests 118 that represent a logical conflict if applied concurrently to the data item 108. For example, a first client 112 and a second client 112 may each submit a request 118 to update the second data item 108 to a different value. If the requests 118 were received by different servers 104 and separately applied to the data set 106 (such as in different regions), some servers 104 may utilize the first value (e.g., 1) for the second data item 108 while, concurrently, other servers 104 may utilize the second value (e.g., 2) for the same second data item 108. Such data version conflicts may be avoided or reduced through the designation of the second server 104 as the sole master of the second data item 108, since both requests 118 are either submitted directly to the second server 104 or forwarded to the second server 104 from the server 104 that initially received the request 118. The second server 104 may identify the conflicting requests 118 and may choose one according to a data version conflict resolution technique (e.g., selecting the earlier request 118 or the later request 118 according to timestamps associated with each request 118, or selecting the first request 118 or the second request 118 according to the sequential order in which the requests 118 arrived at the second server 104), or, alternatively, may choose another resolution that fulfills both requests 118 (e.g., applying an update 120 that sets the value of the second data item 108 to 3).

The single-master configuration of the server set 102 also enables updates 120 to be propagated from the sole master 116 to the other servers 104 of the server set 102, either directly or through an intermediate server 104. For example, when the second server 104 applies an update 120 to the second data item 108 within the local copy of the data set 106, the update 120 may be immediately visible to the first server 104, which is collocated with the second server 104 in the region and utilizes the same copy of the data set 106. Alternatively, the second server 104 may transmit the update 120 to the first server 104 within the same region, which may be facilitated by the proximity of the first server 104 to the second server 104 and/or fast and plentiful bandwidth interconnecting the first server 104 and the second server 104. The second server 104 may also transmit the update 120 to the Asia region, e.g., by applying the update 120 to a remote copy of the data set 106 that is viewable to the third server 104 and the fourth server 104, or by transmitting the update 120 to the third server 104 for application to the copy of the data set 106 that is local to the servers 104 of the Asia region. Such propagation may continue through other servers 104 and other local copies of the data set 106 (e.g., the third server 104 may propagate the same update 120 to the fourth server 104, and/or to other servers 104 located in other regions). In this manner, the update 120 of the second data item 108 by the second server 104, as the sole master 116 of the second data item 108, is propagated to all copies of the data set 106 and is apparent to all servers 104 of the server set 102. The configuration of the server set 102 with a single master 116 for each data item 108 therefore promotes the preservation of the consistency of the data set 106 and reduces or avoids the incidence of data version conflicts caused by mutually exclusive requests 118.

However, the single-master configuration may exhibit a number of deficiencies. Such deficiencies particularly relate to the details of the workload 114, and in particular the performance criteria 122 that are expected of the data set 106.

In many data services, a data set 106 may be provided to serve a workload 114 that is bound by a set of performance criteria 122. For example, some workloads 114 may be time-sensitive, where responsiveness is a significant performance criterion of the workload 114; accordingly, the server set 102 may be expected to service the workload 114 in a manner that maintains a low latency, such as a response time within five milliseconds for 99% of read requests and a response time within ten milliseconds for 99% of write requests. A variety of configurations of the server set 102 may be utilized to satisfy this performance criterion 122, such as allocating servers 104 for the workload 114 that are proximate to the clients 112 that are initiating the requests 118 (e.g., provisioning servers 104 for a local news server that are close to a source and/or a demand for the news). Other workloads may be throughput-sensitive, wherein a particular volume of requests 118 is anticipated (optionally with periodic fluctuation, such as higher volume during business hours, during the work week, or during traditional holiday months). Some workloads 114 may be availability-sensitive, wherein the vast majority of requests 118 are to be successfully completed, and wherein an inability to satisfy a request 118 is considered problematic. Some workloads 114 may be consistency-sensitive, wherein updates 120 that are occurring in an inadequately synchronized manner may cause parts of the data set 106 to diverge, such as data version conflicts caused by conflicting updates 120 to a single data item 108 or inconsistencies between the values stored in different data items 108 (e.g., a foreign key relationship between a first table and a second table, where the inconsistency comprises a key identifier in the first table that does not correspond to any record in the second table).

For a particular workload 114, a data service may formalize the pertinent performance criteria 122 in a service level agreement. The use of a service level agreement may permit an administrator of a workload 114 to specify the performance criteria 122 of the workload 114 and the expectations of the performance of the server set 102, and a guarantee by the providers of the data service of the performance that is to be provided and maintained by the server set 102 for the workload 114. A data service may utilize the service level agreement to guide an administrator in selecting and provisioning a set of data service resources to satisfy the guarantees. Alternatively or additionally, a data service may use the service level agreement to inform an automated process that provisions and configures the resources of the server set 102 to handle the workload 114. Many distributed data services are multi-tenant, such that workloads 114 of various clients 112 are distributed over and concurrently processed by the server set 102, wherein a particular server 104 may consecutively and/or concurrently perform two or more workloads 114 on behalf of two or more clients 112. Such multitenancy scenarios may involve careful configuration of the servers, e.g., to prevent a first workload 114 of a first client 112 from observing and/or interfering with a second workload 114 of a second client 112, and/or to ensure that excessive resource utilization by a first workload 114 does not jeopardize the fulfillment of a service level agreement for a second workload 114.

Some workloads 114 that are constrained by multiple performance criteria 122. For example, some service level agreements may specify different performance criteria 122 for different portions of the workload 114 (e.g., different tasks comprising the workload 114, such as different types of queries that have different performance sensitivities) and/or for different contexts in which a workload 114 is performed (e.g., different performance criteria for peak hours vs. off-hours). Alternatively or additionally, some service level agreements may specify a collection of performance criteria 122, such as both a latency criterion and a consistency level that are both expected of the server set 102. In some cases, different performance criteria 122 may present a tradeoff, wherein fulfilling a first performance guarantee affects the capability of the server set 102 to fulfill a second performance guarantee. In some instances, the concurrent fulfillment of two performance guarantees may be achievable, but may considerably increase the commitment of computational resources relative to the fulfillment of either performance guarantee alone. In other instances, the concurrent fulfillment of two performance guarantees may not be reasonably achievable, or in some cases may be physically impossible with some data service architectures.

An example of a performance criteria tradeoff that may be difficult to fulfill is a workload 114 that expects both low latency and a strong consistency level. A server set 102 may be configured to satisfy the strong consistency level through a single-master configuration in which all updates 120 are routed to a single server 104 that is designated as the master 116 for the data item 108, such as in the example scenario 100 of FIG. 1. However, such propagation may involve an unavoidable network transport delay, based upon technical constraints (e.g., the maximum achievable responsiveness of server and networking hardware) and/or physical constraints (e.g., maximum transmission speeds limited by the speed of light). For example, as illustrated in the example scenario 100 of FIG. 1, a server 104 from the second region may receive an update to the second data item 108 for which the second server 104 in the first region is designated as the master 116. However, the delay in forwarding the fourth request 118 to the second server 104 may introduce enough latency 124 to violate a performance criterion 122 that all updates 120 are to be committed to the data set 106 of the workload 114 by a within a latency bound, such as ten milliseconds. If requests 118 for updates 120 are to be received throughout the world, then the maximum round-trip delay between any selectable server location and the furthest anticipated source of requests 118 for updates 120 may exceed the maximum desired latency 124 according to the performance criterion 122 of the workload 114. In workloads 114 that involve broad-scale geographic distribution and that feature a performance criterion 122 of very low latency 124, it may not be possible to transmit requests 118 from all of the clients to a single master 116 positioned anywhere in the world within the speed-of-light physical constraint. As another example, even if the second server 104 receives a request 118 from a nearby client 112 (such as the second request 118 transmitted by a nearby client 112 to the second server 104) and applies it nearly instantaneously to the data set 106, the propagation of the update 120 to servers 104 in other regions may involve latency 124 that exceeds a latency threshold as a performance criterion 122 of the workload 114.

A single-master configuration may also violate other types of performance criteria 122 of a workload 114 that may be formalized in a service level agreement. For example, a service level agreement may specify an availability-based performance criterion 122 as an expectation of high availability of the workload 114 even in the event of failures, such as hardware failures and network partitioning. However, a single-master configuration represents a single point of failure; e.g., the sole server 104 designated as a master 116 of a particular data item 108 may fail for a variety of reasons, or a network partition may occur between the master 116 of a data item 108 and a client 112 that requests to update 120 the data item 108. While failover techniques may enable the rapid designation of another server 104 as a substitute master 116 for the failed server 104, the transition from the original master 116 to the substitute master 116 may involve a delay, during which requests 118 are unfulfilled in violation of the availability performance criterion 122.

Due to such practical constraints, distributed data services based on single-master configurations may be incapable of consistently fulfilling the performance criteria 122 of one or more workloads 114; may violate some performance guarantees, and/or may be unable to offer certain types of service level agreements with performance guarantees that may be violated in some circumstances. Other architectures may therefore be considered that may address these deficiencies.

A2. Multi-Master Architectures

In some scenarios, in order to alleviate the performance limitations of a single-master server architecture, a server set 102 may be configured with a multi-master architecture, in which updates 120 to a particular data item 108 may be fulfilled by two or more servers 104 of the server set 102 that are designated as masters 116 of the data item 108. It may be undesirable to designate all servers 104 as masters 116 of the data item 108, such that any server 104 of the server set 102 may apply an update 120 to it; e.g., the resolution of data version conflicts may become unmanageably complicated if every server 104 concurrently applies an update 120 of a different value to the same data item 108. Rather, the designation of a subset of the servers 104 as masters 116 of a particular data item 108 may promote the fulfillment of performance criteria 122, such as latency, scalability, availability, and consistency, without creating complexity and/or inefficiency that may diminish the capability of the server set 102 to apply updates 120 to the data set 106. As one example, for each broad geographic region (e.g., Africa, Asia, Europe, and North America), a selected server 104 may be designated as a regional master 116, and all updates 120 received within a particular region may be forwarded to the regional master 116 for application to the data set 106.

The designation of a subset of servers 104 as masters 116 may promote the offering and/or fulfillment of performance criteria 122 that may not be offered and/or fulfilled in other configurations. For example, a latency performance criterion 122 of updates 120 to the data set 106 may be unattainable with a single server 104 designated as the master 116; e.g., because the master 116 may be overloaded with requests 118 for updates 120 and may not be able to apply an update 120 within a latency threshold. Moreover, the latency performance criterion 122 may also be unattainable by designating every server 104 as a master 116, as verifying the commitment of the update 120 by every server 104 may also exceed the latency threshold. However, designating a subset of at least two servers 104 of the server set 102 as masters 116 of the data item 108 may balance the availability of masters 116 to apply an update 120 to the data set 106 with the expedient verification that the update 120 has been committed over the server set 102 (e.g., verification that the subset of servers 104 designated as masters 116 are in agreement as to the state of the data item 108 before and/or after the update 120), thereby fulfilling performance criteria 122 that a single-master server set 102 may be unable to offer and/or fulfill.

Figure 2:
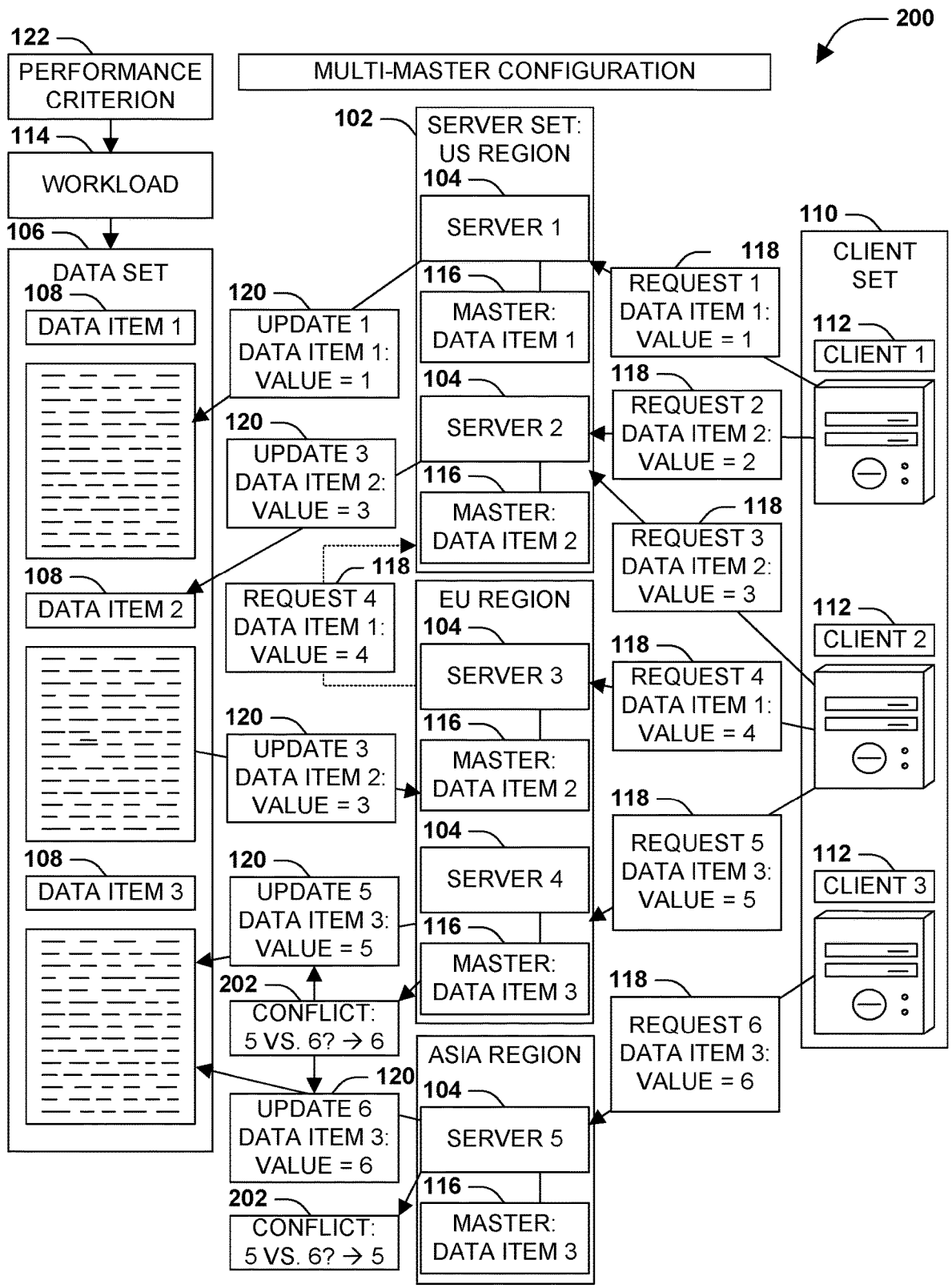
FIG. 2 is an illustration of an example scenario featuring a multi-master configuration of a server set.

FIG. 2 is an illustration of an example scenario 200 featuring a multi-master configuration of a server set 102. In this example scenario 200, a server set 102 is provided that spans three regions, and where the server set 102 is organized to serve a data set 106 to a client set 110 of clients 112 in the context of a workload 114 that is constrained by a performance criterion 122, such as latency, throughput, scalability, availability, and/or consistency. In order to provide the workload 114 in a manner that is consistent with the performance criterion 122, the server set 102 may be partitioned, for each data item 108, into a master subset of at least two servers 104 that are permitted to update the data item 108 and a non-master subset of servers 104 that are not permitted to update the data item 108. For example, among the five server 104 illustrated in the example scenario 200 of FIG. 2, the second data item 108 may be updated only by the second server 104 and the third server 104, while the third data item 108 may be updated only by the fourth server 104 and the fifth server 104.

When a request 118 is received by a server 104 to read the data item 108, the server 104 may simply access the data item 108 to read the data item 108 and may provide information to the client 112 based on the reading. However, when a request 118 is received by the server 104 to apply an update 120 to the data item 108, the server 104 may determine the identity of the masters 116 of the data item 108 involved in the request 118. If the server 104 determines that it has been designated as a master 116 of the data item 108, the server 104 applies the requested update 120 to the data set 106 to fulfill the request 118, and then propagates the update to at least one other server 104 of the server set 102 (e.g., forwarding the update 120 to each other master 116, and/or to at least one server 104 in each geographic region). The other servers 104 that receive the update 120 may ensure that the update 120 is applied to the local copy of the data set 106, and/or may propagate the update 120 to other servers (e.g., the other servers 104 within the same geographic region). If the server 104 determines that it has not been designated as a master 116 of the update 120, the server 104 forwards the request 118 to a master 116 of the server set 102 for the data item 108, and the master 116 applies the update 120 to the server set 102.

For example, in the example scenario 200 of FIG. 2, a first request 118 for an update 120 of a first data item 108 is sent to a first server 104. The first server 104 determines that it has been designated as a master 116 for the first data item 108, applies the update 120 to the data set 106 to fulfill the request 118, and propagates the update 120 to at least one other server 104 of the server set 102 (e.g., to one server 104 in each region, and/or to at least one other server 104 that has been designated as a master 116 for the first data item 108). However, when a fourth request 118 is issued by a client 112 to a third server 104 that has not been designated as a master 116 of the first data item 108, the third server 104 does not apply the update 120 to the first data item 108, but rather forwards the request 118 to another server 104 that has been designated as a master 116 for the second data item 108 (e.g., to the first server 104 in the first region).

As another example in the example scenario 200 of FIG. 2, a second server 104 receives, from different clients 112, a second request 118 and a third request 118 to update a second data item 108. The second server 104 determines that it has been designated as a master 116 of the second data item 108, and also that the application of the requests 118 may create a data version conflict. The second server 104 therefore performs a data version conflict resolution technique to resolve the data version conflict, and selects the third request 118, opting to refuse the second request 118. The second server 104 applies an update 120 to the data set 106 to fulfill the second request 118 and propagates the update 120 to at least one other server 104 of the server set 102.

As a third example in the example scenario 200 of FIG. 2, a fourth server 104 and a fifth server 104, deployed within different regions, are designated as masters 116 of a third data item 108 in the data set 106. Each master 116 concurrently receives a request 118 from a different client 112 to update the third data item 108 to a value. Because each server 104 is designated as a master 116, the servers 104 apply updates 120 to the third data item 108 (e.g., each server applying the update 120 to a local copy of the third data item 108 for the geographic region). Each master 116 also propagates its updates 120 to other servers 104 of the server set 102. When one of the masters 116 discovers that the other master 116 has also applied an update 120 to the third data item 108, the master 116 compares the updates 120 and determines that a data version conflict 202 has arisen: different subsets of the servers 104 concurrently perceive the third data item 108 as having different, conflicting values, based on which of the updates 120 has been most recently applied to the third data item 108. The data version conflict 202 may arise, e.g., because the fourth server 104 commits the fifth update 120 to of the local copy of the third data item 108 for the EU region, while, concurrently, the fifth server commits the sixth update 120 to the local copy of the third data item 108 for the Asia region. As another example, the updates may have both been committed, but in a different order; e.g., the EU region and the Asia region may both commit the fifth update 120 of the third data item 108 before the sixth update 120, but the servers 104 in the U.S. region may have been notified of the updates 120 in a reverse order, and may have applied the sixth update 120 before the fifth update 120 to the local copy of the third data item 108 for the U.S. region. Moreover, the data version conflict 202 does not reflect an ordinary and ephemeral discrepancy that is resolvable within a latency threshold; rather, because the sequence of updates 120 applied to one version of the third data item 108 differs from the sequence of updates 120 applied to another version of the data item 108, the discrepancy reflects a genuine inconsistency among the versions of the third data item 108 in the distributed data set 106. Accordingly, one of the masters 116 applies a data version conflict resolution technique to choose among the competing updates 120 (e.g., a selection of one update 120 and a discarding of another update 120; a canonical sequence in which the updates 120 are to be applied; and/or a superseding update 120 that merges and takes precedence over all such updates 120). Alternatively, the master 116 may request a rollback of all such updates 120 and revert the third data item 108 to its state before either of the committed updates 120. In this manner, the master 116 may enable a rapid resolution of the data version conflict 202, and may propagate the data version conflict resolution outcome to one or more of the other servers 104 for application to the data set 106 to resolve the data version conflict 202.

However, some deficiencies may arise in multi-master server architectures such as illustrated in the example scenario 200 of FIG. 2. In this example architecture, conflict resolution of a data version conflict 202 may be initiated by any of the masters 116 of the data item 108 involved in the data version conflict 202. For example, the data version conflict 202 in the example scenario 200 of FIG. 2 involves the third data item 108, for which both the fourth server 104 and the fifth server 104 are designated as masters 116. Either master 116 may discover the data version conflict 202 involving the conflicting updates 120. In some cases, both masters 116 may concurrently, or even simultaneously, discover the data version conflict 202. Moreover, either master 116 may apply a conflict resolution technique to resolve the data version conflict 202, and in some cases, both masters 116 may concurrently, or even simultaneously, apply data version conflict resolution techniques to resolve the same data version conflict 202. These circumstances may present new challenges within multi-master architectures.

For example, as further depicted in the example scenario 200 of FIG. 2, the fourth server 104 may apply the fifth update 120 to the third data item 108 while, concurrently or even simultaneously, the fifth server 104 applies the sixth update 120 to the third data item 108. Moreover, the fourth server 104 may propagate the fifth update 120 to the fifth server 104, while, concurrently or even simultaneously, the fifth server 104 propagates the sixth update 120 to the fourth server 104. Finally, the fourth server 104 may initiate conflict resolution, resulting in the selection of an update 120 to be applied to the third data item 108 to resolve the data version conflict 202. However, concurrently or even simultaneously, the fifth server 104 may initiate conflict resolution to resolve the same data version conflict 202, resulting in the selection of the sixth update 120 to be applied to the third data item 108 to resolve the data version conflict 202.

Due to the lack of coordination, the application of conflict resolution processes by both masters 116 may create new disadvantages and problems. As a first such example, if the fourth server 104 and the fifth server 104 reach the same outcome (such as both selecting the sixth update 120 to be applied to the third data item 108, and discarding and/or rolling back the fifth update 120), the masters 116 may unproductively duplicate the conflict resolution process. Moreover, both masters 116 may propagate a notification of the data version conflict 202, and of the data version conflict resolution outcome thereof, to all of the other masters 116 of the server set 102. Each such master 116 may receive two such notifications, and may repeatedly and redundantly apply the conflict resolution outcome to the data set 106 to resolve the data version conflict 202 of the data item 108.

Although redundantly applying the updates 120 to the data item 108 may eventually lead to the same result and a consistent data set 106, the duplication of processing may unnecessarily consume computational resources, such as processor capacity, network capacity among the servers 104 of the server set 102, and storage. If data version conflicts 202 occur frequently and/or the number of masters 116 is significant, the aggregate redundancy may scale up to a significant performance drain, such as ten masters 116 redundantly performing data version conflict resolution techniques to resolve on average ten data version conflicts 202 per second. The inefficiency may limit the overall capacity and performance of the server set 102; may reduce scalability and create bottlenecks; and, in some cases, may cause the server set 102 to violate performance criteria 122 of a workload 114, such as may be set forth in a service level agreement. Such failures may be surprising and counterintuitive when arising within a robust server set 102 with computational resources that might otherwise be amply sufficient to satisfy the performance criteria 122, and the nature of the inefficiency may be difficult to identify and/or resolve.

In some scenarios, even redundant, substantively identical updates may be problematic. As a second such example, the masters 116 may generate data version conflict resolution outcomes of a data version conflict 202 with the same result (e.g., selecting the same update 120 to be applied to the data item 108), but with timing differences, leading to different timestamps with which the data version conflict resolution outcomes are to be applied. If a third master 116 receives both data version conflict resolution outcomes and applies them in a certain order, the timestamp of the second conflict resolution outcome may prevail for its version of the data set 106; and if a fourth master 116 receives both data version conflict resolution outcomes and applies them in the opposite order, the timestamp of the first conflict resolution outcome may prevail for its version of the data set 106. The differences in timestamps, despite the identical content of the data item 108, may cause the data sets 106 to diverge. Determining the cause of this discrepancy, given this complicated set of interactions, may be difficult.

Even more significant problems may arise if the first master 116 and the second master 116 initiate data version conflict resolution techniques for the same data version conflict 202 and reach different data version conflict resolution outcomes. For example, and as shown in the example scenario 200 of FIG. 2, each master 116 may identify a data version conflict 202 between its own update 120 of the data item 108 and a mutually incompatible update by the update 120 of the other master 116. Each master 116 may apply a data version conflict resolution technique that, in such circumstances, prioritizes updates 120 of other masters 116 to local updates 120 by the same master 116. Accordingly, the fourth server 104 may resolve the data version conflict 202 by selecting the sixth update 120 initiated by the fifth server 104, and rolling back and/or discarding the fifth update 120 initiated by the fourth server 104. Concurrently or even simultaneously, the fifth server 104 may resolve the data version conflict 202 by selecting the fifth update 120 initiated by the fourth server 104 and rolling back and/or discarding the sixth update 120 initiated by the fifth server 104. The masters 116 may therefore inadvertently create a new data version conflict by engaging in conflicting data version conflict resolution techniques that produce different data version outcomes. Such data version conflicts may be even more complicated and/or significant than the initial data version conflict 202, e.g., because each master 116 may proceed on the understanding that the data version conflict 202 has been identified and rectified, potentially delaying the detection of the persisted data version conflict 202. Moreover, both masters 116 may distribute, to the other masters 116 of the server set 102, notifications of the data version conflict resolution outcomes that present different and potentially contradictory instructions for resolving the data version conflict 202. Absent a configuration of the other masters 116 to detect and mitigate such conflicting notifications, the other masters 116 may in turn apply the outcomes in a potentially different manner (such as in a different order), thus potentially propagating the divergence of the data item 108 throughout the data set 106.

It may be appreciated that these disadvantageous outcomes and the complications arising therefrom result from a relatively uncoordinated application of data version conflict resolution, in which any master 116—and potentially multiple masters 116—of the same data item 108 may detect a data version conflict 202, perform data version conflict resolution, and distribute notifications of the data version conflict resolution outcome. The absence of coordination may be difficult to resolve in a decentralized manner, and even more difficult to resolve retrospectively, such as detecting the propagation of multiple data version conflict resolution outcomes for a single data version conflict 202 and initiating still further data version conflict resolution techniques to resolve the conflicting outcomes of the initial data version conflict 202. The conflict may cascade and be amplified in a manner that consumes even more computing resources and/or creates even more complicated causes of the divergence of data set 106.

Indeed, the incidence of such cascading conflicts arising as a result of data version conflict resolution processes may invalidate the fundamental premise of the multi-master configuration: i.e., the containment of data version conflicts to the subset of masters 116, such that non-master servers 104 may operate on the presumption that updates 120 issued by the masters 116 are expected to be coherent. Contrary to this expectation, the follow-on data version conflicts 202 arising from conflicting updates 120 issued by different masters 116 may diminish this presumption, and the non-master servers 104 may have to implement further checks to verify that the updates 120 are coherent (e.g., keeping a record of the updates 120 and/or data version conflict resolution outcomes of a selected data item 108 to ensure that a particular data item 108 and the data set 106 as a whole remain consistent), as well as a notification mechanism to enable non-master servers 104 to notify masters 116 of the detection of mutually incompatible conflict resolution outcomes of data version conflict 202. Even if such detection is limited to the masters 116, the potential for such conflicts entails other complexity, such as a first master 116 of a data item 108 having to compare conflict resolution outcomes issued for the first data item 108 by a second master 116 and a third master 116, thereby expanding the encumbrance of the respective masters 116 with administrative tasks that may limit capacity and scalability. These and other disadvantages may arise from poorly coordinated multi-master architectures such as shown in the example scenario 200 of FIG. 2.

B. Presented Techniques

In view of the limitations of single-master and multi-master server architectures and the potential problems with data version conflicts and/or performance guarantees that may arise with some multi-master server architectures, the present disclosure provides multi-master service configurations that involve a coordinated resolution of data version conflicts 202. Such techniques involve the designation, among the masters 116 of the server set 102, of a merge master that is responsible for initiating data version conflict resolution techniques for data version conflicts 202 arising within the data set 106 (and, optionally, within a particular data item 108 for which the master 116 is designated as a merge master). Just as non-masters refrain from updating a data item 108 and instead forward requests 118 for updates 120 to the masters 116, the masters 116 that are not designated as the merge master refrain from initiating data version conflict resolution techniques, and instead forward notifications of detected data version conflicts 202 to the merge master. The merge master initiates a data version conflict resolution technique to generate a data version conflict resolution outcome of the data version conflict 202, and forwards the conflict resolution outcome to the other masters 116 to be applied to the data set 106. This architecture therefore consolidates data version conflict resolution to a merge master, and therefore reduces the incidence of conflicting data version conflict resolution techniques, in accordance with the techniques presented herein.

Figure 3:
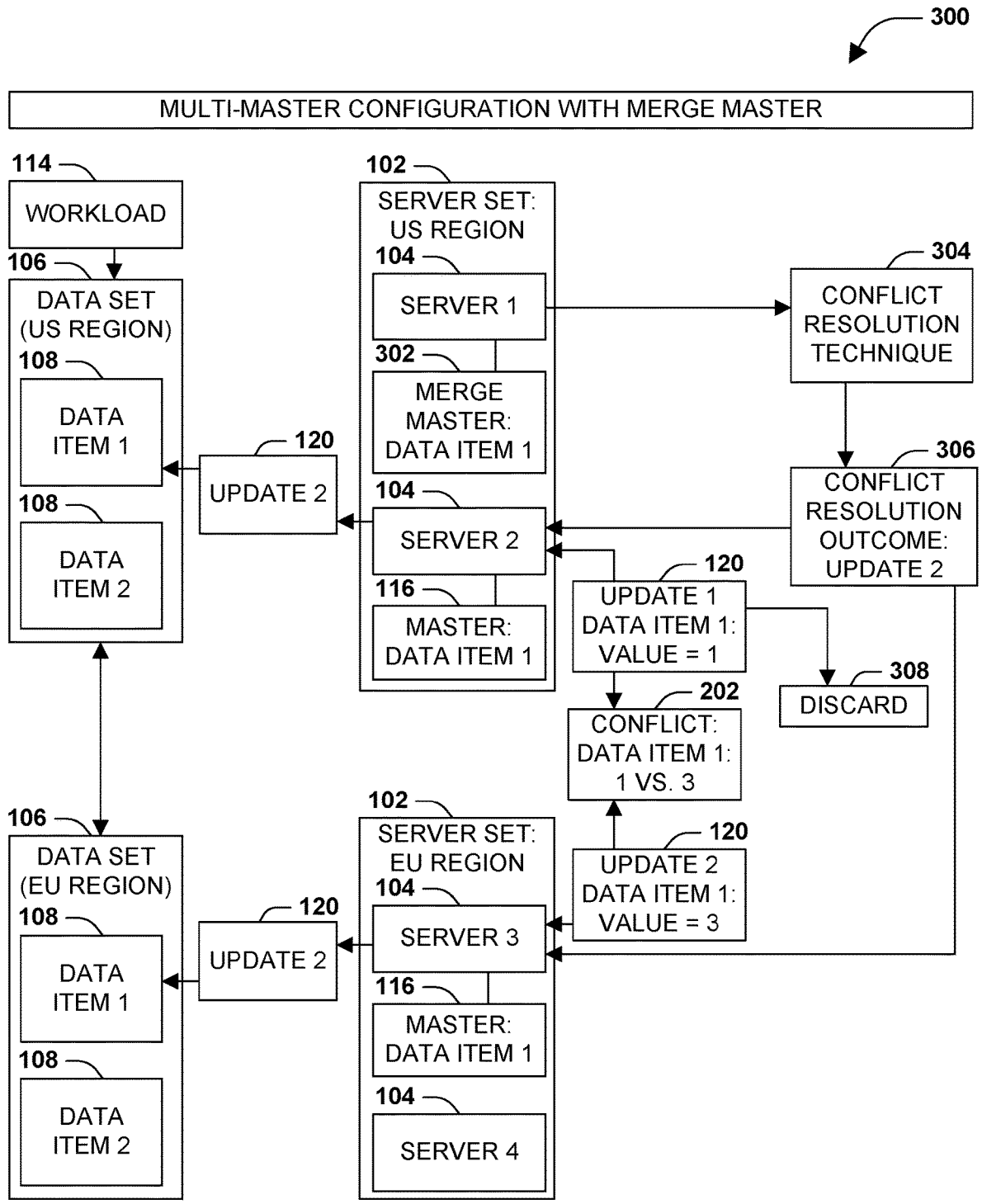
FIG. 3 is an illustration of an example scenario featuring a multi-master configuration of a server set including a merge master that resolves data version conflicts in accordance with the techniques presented herein.

FIG. 3 is an illustration of an example scenario 300 featuring a multi-master configuration of a server set 102 with the additional designation of a merge master 302 in accordance with the techniques presented herein. In this example scenario 300, the server set 102 comprises two groups of servers 104 that are positioned within different regions: a first region (the US region) featuring a first server 104 and a second server 104, and a second region (the EU region) featuring a third server 104 and a fourth server 104. The server set 102 is provided to serve a data set 106 on behalf of a workload 114. Each region features a replica of the data set 106 for access by the servers 104 within the region, and the replicas of the data set 106 are maintained in synchrony through the coordination of the multi-master architecture of the server set 102. The data set 106 may comprise multiple data items 108, including a first data item 108 and a second data item 108, and for each data item 108, respective servers 104 may be designated as a master 116 that is permitted to read and update the data item 108 or a non-master that is permitted to read, but not update, the data item 108. In this example scenario 300, for a first data item 108, the second server 104 in the US region and the third server 104 in the EU region are designated as masters 116, but the fourth server 104 is not and is only a non-master for the first data item 108. The first server 104 is designated as a merge master 302 for the data item 108, and is permitted to read and update the data item 108 as well as to resolve data version conflicts 202 involving the first data item 108. Other designations may be applied to the servers 104 for the second data item 108.

As further shown in the example scenario 300 of FIG. 3, respective servers 104 may receive requests 118 to update 120 the first data item 108. Any such request received by the fourth server 104, which is designated as a non-master of the first data item 108, is forwarded to a master 302 (such as the third server 104 that is collocated with the fourth server 104 in the EU region). The masters 116 may apply the updates 120 to the data item 108 and forward the update 120 to the other servers 104 of the server set 102. In some cases, the second server 104 and the third server 104 may apply update 120 that are mutually incompatible, such as competing updates 120 that set the value of the first data item 108 to two different values. The mutually incompatible updates 120 present a data version conflict 202, and the application of the updates 120 by the second server 104 and third server 104, respectively, to the replicas of the data set 106 for the US region and the EU region, may cause the replicas to diverge.

Instead, one or more of the servers 104 may detect the occurrence of the data version conflict 202 (e.g., the second server 104 may receive the second update 120 from the third server 104 of the EU region while also applying the first update 120 to the same data item 108, and determining that only one of the first update 120 and the second update 120 may be applied to the data item 108 at a selected time). The first server 104 may detect and/or be notified of the data version conflict 202 involving the mutually incompatible updates 120 of the first data item 108, and consistent with its designation as the merge master 302 for the first data item 108, the first server 104 may invoke a conflict resolution technique 304 involving the updates 120. The conflict resolution technique 304 may generate a conflict resolution outcome 306, such as an instruction to apply the second update 120 and (explicitly or tacitly) to rollback and/or discard the first update 120. The merge master 302 may directly or indirectly forward the conflict resolution outcome 306 to the masters 116, each of which may receive the conflict resolution outcome 306 by updating the local replica of the data set 106, e.g., by committing the second update 120 to the data set 106 and discarding 308 the first update 120. In this manner, the first server 104 fulfills its designation as the merge master 302 for the first data item 108, and performs a conflict resolution process to address data version conflicts 202 arising within the data set 106 in accordance with the techniques presented herein.

C. Technical Effects

The organization of a server set in accordance with the techniques presented herein may enable a variety of technical effects in some embodiments thereof.

A first example of a technical effect that may be achieved through the multi-master techniques presented herein involves the resolution of data version conflicts 202 in a coordinated, deterministic manner. In contrast with multi-master architectures that do not use such techniques (including the example scenario 200 of FIG. 2), the designation of a merge master 302 to resolve data version conflicts 202 reduces the incidence of multiple masters 116 performing data version conflict resolution techniques that produce different outcomes, or that produce substantively identical outcomes but that are applied in an inconsistent manner across the server set 102, such as conflict resolution outcomes that are applied in a different order and therefore leave the data item 108 in a different state in different replicas of the data set 106. The designation of a server 104 as a merge master 302 may consolidate the resolution of data version conflicts 202 in a manner that reduces or avoids the inconsistent resolution of data version conflicts 202 by multiple masters 116 as may occur in other multi-master architectures, such as the example scenario 200 of FIG. 2.

A second example of a technical effect that may be achieved through the multi-master techniques presented herein involves preserving and promoting the performance of the server set 102, including its fulfillment of performance criteria 122 of workloads 114 that utilize a data set 106 provided by the server set 102. When a data version conflict 202 is resolved by multiple masters 116, even if the multiple data version conflict resolution outcomes generated thereby result in consistent replicas of the data set 106, the redundant performance of the data version conflict resolution outcome by multiple masters 116 may unproductively utilize the computational resources thereof. For example, a server set 102 may comprise ten masters 116 of a data item 108 that is subjected to mutually incompatible updates 120. If, according to the techniques presented herein, data version conflict resolution is limited to a merge master 302, the resolution of the data version conflict 202 includes nine notifications of the data version conflict resolution outcome sent by the merge master 302, directly or indirectly, to the respective nine other masters 116. However, if five of the masters 116 detect a data version conflict 202, invoke a data version conflict resolution technique to produce a data version conflict resolution outcome, and forward the data version conflict resolution outcome to the other masters 116 for application to the data item 108, then a total of 45 notifications of data version conflict resolution outcomes are distributed among the masters 116, resulting in wasted energy and delayed performance of tasks involving the data set 106. The logical processes invoked to resolve the redundant notifications and outcomes, even if substantively identical, may further reduce the computational resources of the server set 102. In some scenarios, the compounding complexity of resolving the data version conflicts 20 among the outcomes of the original data version conflict 202 may lead to a cascading amplification of the data version conflict 202 and the consequences thereof. In some scenarios, such as where the number of masters 116 is significant and/or where data version conflicts 202 frequently arise, the drain on the performance of the server set 102 may limit its scalability or even violate performance criteria 122 of a workload 114, such as the details of a service level agreement.

A third example of a technical effect that may be achieved through the multi-master techniques presented herein involves enhanced administrative information and control of the server set 102, such as resource provisioning, deployment, and load-balancing. In uncoordinated multi-master architectures, such as the example scenario 200 of FIG. 2, the servers 104 of the server set 102 are designated as masters 116 or non-masters, wherein the masters 116 are tasked with receiving requests 118, applying and forwarding updates 120 to the data set 106, and the detection and resolution of data version conflicts 202. The computational demands of the diverse tasks allocated to each master 116 may vary; e.g., the workload involved in participating in the evaluation of data version conflicts 202 may sometimes be minimal, and at other times may be excessive, such as when data version conflicts 202 are frequent, difficult to untangle, and/or resolved by generated outcomes that conflict with the outcomes of other masters 116 for the same data version conflict 202. The volatility may complicate the allocation of server resources to provide masters 116 in a manner that both enables the master 116 to meet peak demand when data version conflicts 202 are frequent, and also reduce idling computations resources when data version conflicts 202 are not occurring. It may even be difficult for administrators to distinguish between the computational resources of the masters 116 that are utilized in fulfilling the diverse set of tasks. On the other hand, the designation of a merge master 302 in accordance with the techniques presented herein may enable the consolidation of data version conflict resolution, as a discrete task, to a particular server 104, while also alleviating other masters 116 of the computational demands of this task. The delegation of server tasks and responsibilities in accordance with the techniques presented herein may therefore provide administrators of the server set 102 with finer-grain information about the computational load involved in discrete responsibilities of the masters 116, which in turn may enable the prediction and provisioning of computational resources that are more closely aligned with these tasks, thereby promoting sufficiency while also reducing idleness.

A fourth example of a technical effect that may be achieved through the multi-master techniques presented herein involves the complexity and analysis of the server architecture. A data set 106 may diverge to an inconsistent state, exhibiting an undesirable variance in the state of various data items 108 within different replicas of the data set 106 due to undetected and/or poorly resolved data version conflicts 202. Some architectures may promote the determination of the causal sequence that led to the divergence of the data set 106. In some architectures, the causal sequence may be relatively easy to determine (such as the application of mutually incompatible updates 120 by different masters 116 to a single data item 108), but may not promote the incidence of such divergence of the data set 106. Other architectures may address data version conflicts 202 in an incomplete manner (such as in the example scenario 200 of FIG. 2), and the deficiencies in the resolution process may lead to inconsistencies that are more difficult to detect and evaluate; e.g., the logs of the respective masters 116 may each indicate that a data version conflict 202 of a data item 108 was detected and addressed, and only by comparing the data version conflict resolution outcomes—including the sequence in which such outcomes were propagated throughout the server set 102 and/or applied by a third master 116 that was not involved in the data version conflict 202—may reveal the cause of the divergence. The consolidation of the data version conflict resolution process to a merge master 302, in accordance with the techniques presented herein, may reduce some forms of complexity of the data version conflict resolution process, and thereby promote an easier analysis of the state of the data set 106. Many such technical effects may be exhibited by some variations of the techniques presented herein.

D. Primary Embodiments

The techniques presented herein may be implemented as various embodiments that may take many forms.

Figure 4:
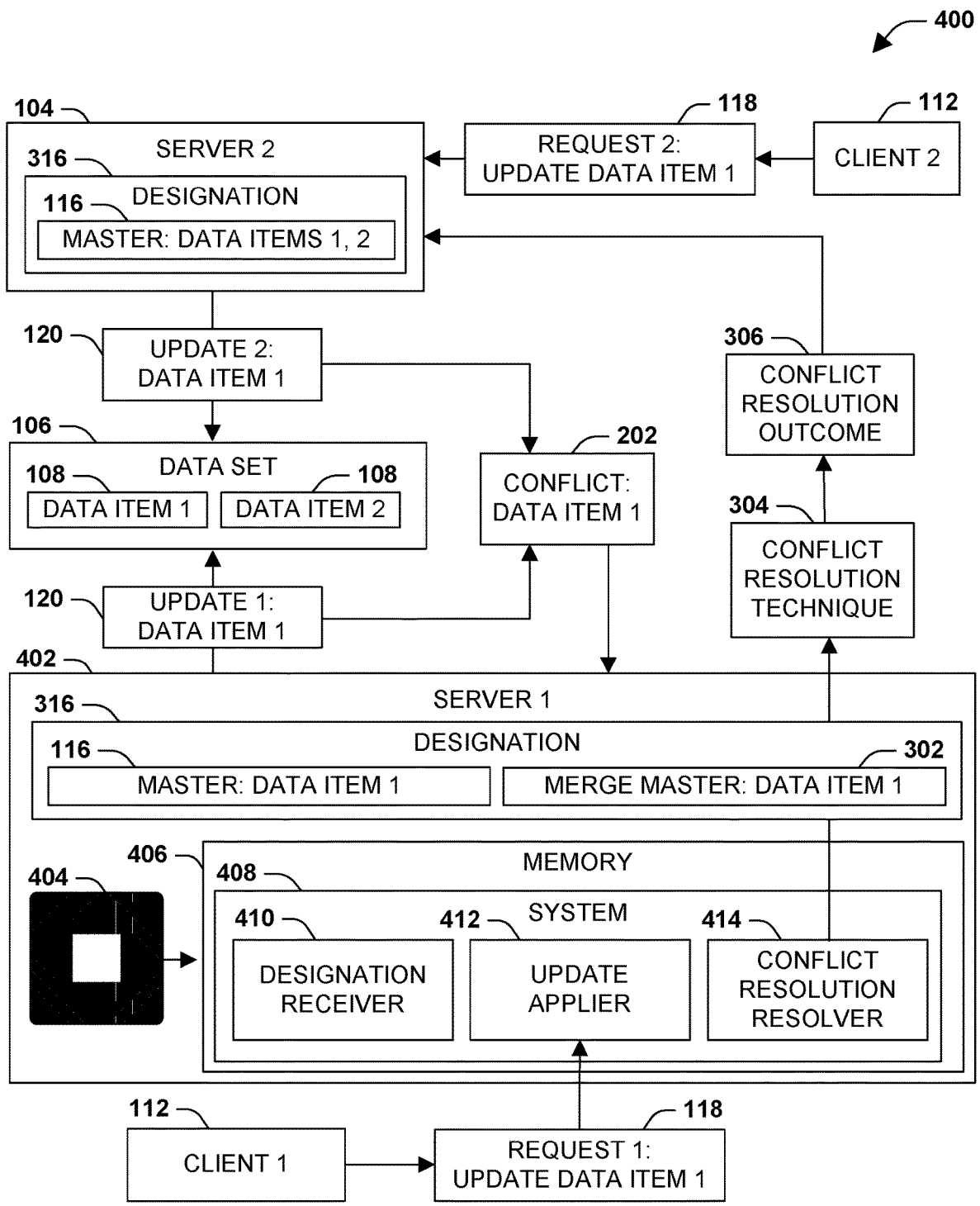
FIG. 4 is a component block diagram illustrating an example server featuring an example system for configuring a server of a server set to resolve data version conflicts arising in a data set in accordance with the techniques presented herein.

FIG. 4 is an illustration of an example scenario featuring embodiments of the techniques presented herein, including an example server 402 that is configured to provide access to a data set 106 and to resolve data version conflicts 202 arising therein, in accordance with the techniques presented herein. FIG. 4 also features an illustration of an example system 408 that causes such an example server 402 to resolve data version conflicts 202 in accordance with the techniques presented herein. The example server 402 may comprises, e.g., a processor 404 and a volatile or nonvolatile memory 406 (e.g., a volatile system memory circuit, a platter of a hard disk drive, a solid-state storage device, and/or an magnetic and/or optical computer-readable medium), wherein the memory stores instructions that, when executed by the processor 404, cause the server 402 to implement at least a portion of the techniques presented herein. The example system 408 may comprise, e.g., instructions stored in a volatile or nonvolatile memory 406 (e.g., a volatile system memory circuit, a platter of a hard disk drive, a solid-state storage device, and/or an magnetic and/or optical computer-readable medium), wherein the execution of the instructions by a processor 404 of a server 104 causes the instantiation of a set of components, wherein respective components of the example system 408 implement a portion of the techniques presented herein, and wherein the interoperation of the components causes the server 104 to operate in accordance with the techniques presented herein.

In this example scenario 400, a server set 102, comprising the example server 402 and a second server 104, provides access to a data set 106 comprising a set of data items 108. The servers 104 of the server set 102 receive request 118 to update 120 one or more data items 108 of the data set 106, and fulfill the requests 118 through a multi-master architecture; e.g., the example server 402 is designated as a master 116 of the first data item 108 (and a non-master of the second data item 108), whereas the second server 104 is designated as a master 116 for both the first data item 108 and the second data item 108. Additionally, the example server 402 receives and stores a designation as a merge master 302 of the first data item 108. The example system 408 may comprise a designation receiver 410 that receives and stores the designation as a master 116 and/or merge master 302 of the first data item 108 of the data set 106.

As further shown in the example scenario 400, each of the example server 402 and the second server 104 receives a request 118 to apply an update 120 to the first data item 108. Both the example server 402 and the second server 104 are designated as masters 116 of the first data item 108, and therefore each server 104 endeavors to apply an update 120 to the first data item 108. For example, the example system 408 may comprise an update applier 412 that fulfills a first request 118 of a first client 112 to apply a first update 120 to the first data item 108, while, concurrently and perhaps even simultaneously, the second server 104 fulfills a second request 118 of a second client 112 to apply a second update 120 to the first data item 108. Because the updates 120 of the first data item 108 are mutually incompatible, one of the masters 116 identifies a data version conflict 202. In accordance with the techniques presented therein, the data version conflict 202 is resolved by the example server 402 and/or a conflict resolution resolver 414 on the example system 408 in accordance with designation of the example server 402 as the merge master 302 for the first data item 108 to which the data version conflict 202 pertains. For example, if the data version conflict 202 is detected by the second server 104, the second server 104 may refrain from initiating a data version conflict resolution process, and may instead notify the example server 402 of the data version conflict 202. Alternatively, the example server 402 and/or example system 408 may first discover the data version conflict 202 (e.g., may discover the second update 120 applied to the first data item 108 while endeavoring to apply the first update 120 to the same first data item 108) and may sua sponte initiate data version conflict resolution.

As further shown in the example scenario 400 of FIG. 4, the example server 402 may resolve the data version conflict 202 by invoking a conflict resolution technique 304, such as a timestamp-based conflict resolution technique; a substantive comparison of the updates 120; a union or merging of the updates 120; an invocation of a data version conflict resolution logic; and/or an identification of the first data item 108 as an instance of a conflict resolution data type (CRDT) that is associated with a logical resolution of mutually incompatible updates 120. The example server 402 may initiate the conflict resolution technique with the mutually incompatible updates 120 to generate a conflict resolution outcome 306 for the first data item 108. The example server 402 may forward, directly or indirectly, the conflict resolution outcome 306 to the second server 104. The example server 402 and/or the second server 104 may apply the conflict resolution outcome 306 to the data set 106 (e.g., as a selection of a selected update from the mutually incompatible updates 120, and/or a superseding update 120 included in the conflict resolution outcome 306), optionally rolling back and/or discarding other updates 120 that are not involved in the conflict resolution outcome 306. In this manner, the example server 402 and the example system 408 enable the resolution of the data version conflict 202 in accordance with the techniques presented herein.

Figure 5:
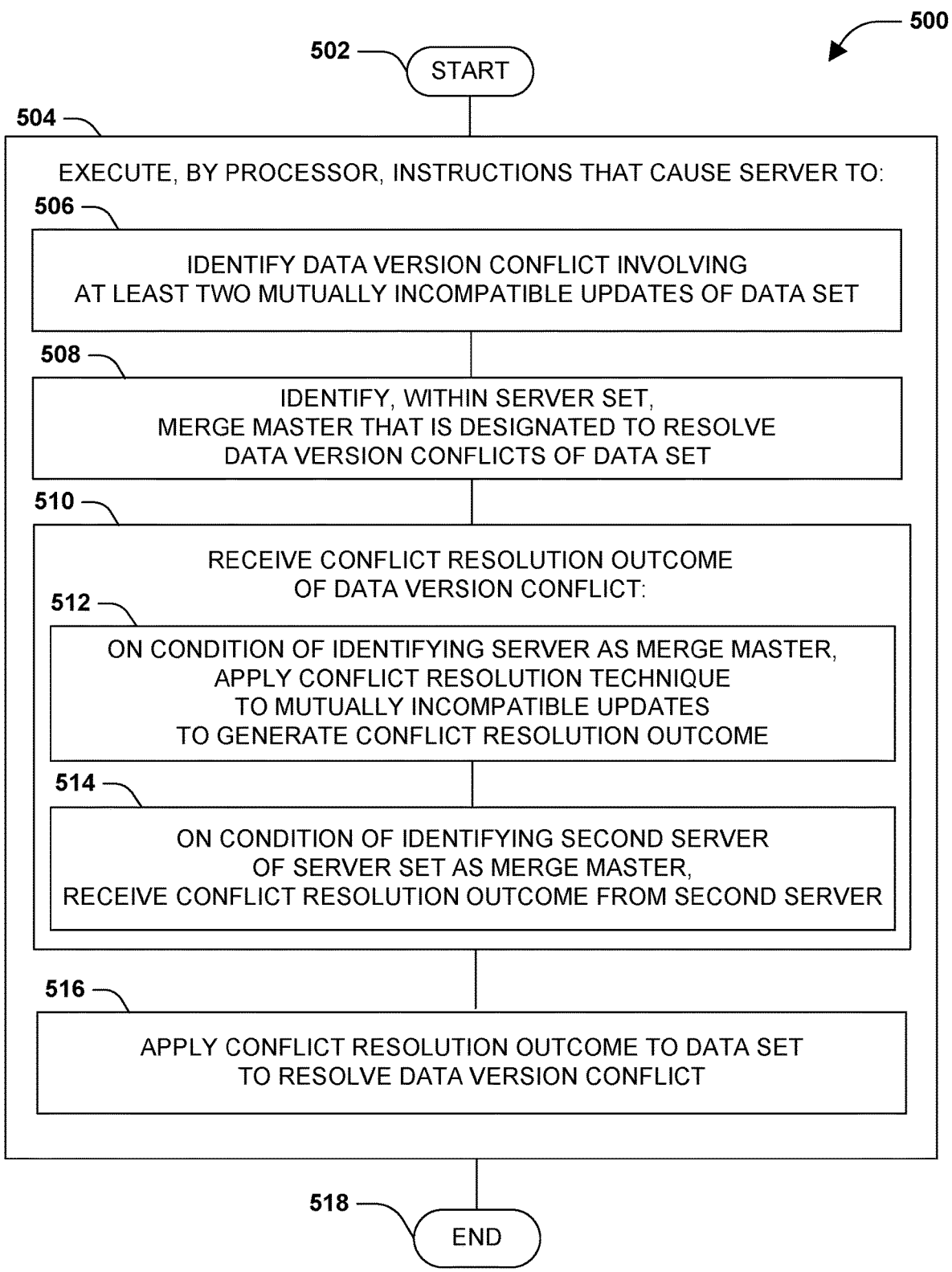
FIG. 5 is an illustration of an example method of configuring a server of a server set to resolve data version conflicts arising within a data set in accordance with the techniques presented herein.

FIG. 5 is an illustration of an example method 500 of configuring a server 104 of a server set 102 resolving data version conflicts 202 within a data set 106 in accordance with the techniques presented herein. The example method 500 may be implemented, e.g., as a set of instructions stored in a volatile or nonvolatile memory of a server, such as a system memory circuit, a platter of a hard disk drive, a solid-state storage device, and/or an magnetic and/or optical computer-readable medium, wherein execution of the instructions by a processor 404 of the server 104 causes the server 104 to operate in accordance with the techniques presented herein.

The example method 500 begins at 502 and involves executing 504 the instructions by the processor 404 of the server 104. In particular, execution 504 of the instructions causes the server 104 to identify 506 a data version conflict involving at least two mutually incompatible updates of the data set. Execution 504 of the instructions further causes the server 104 to identify 508, within the server set 102, a merge master 302 that is designated to resolve data version conflicts 202 of the data set 106. Execution 504 of the instructions further causes the server 104 to receive 510 a conflict resolution outcome 306 of the data version conflict 202. In particular, receiving 510 the conflict resolution outcome 306 involves, on condition of identifying the server 104 as the merge master, applying 512 a conflict resolution technique to the mutually incompatible updates to generate the conflict resolution outcome. Alternatively, receiving 510 the conflict resolution outcome 306 involves, on condition of identifying a second server 104 of the server set 102 as the merge master, receiving 514 the conflict resolution outcome from the second server 104. Execution 504 of the instructions further causes the server 104 to apply 516 the conflict resolution outcome 306 to the data set 106 to resolve the data version conflict 202. Having achieved the resolution of the data version conflict 202 through the use of a merge master 302, the example method 500 enables the server 104 to resolve the data version conflict 202 in accordance with the techniques presented herein, and so ends at 518.

Figure 6:
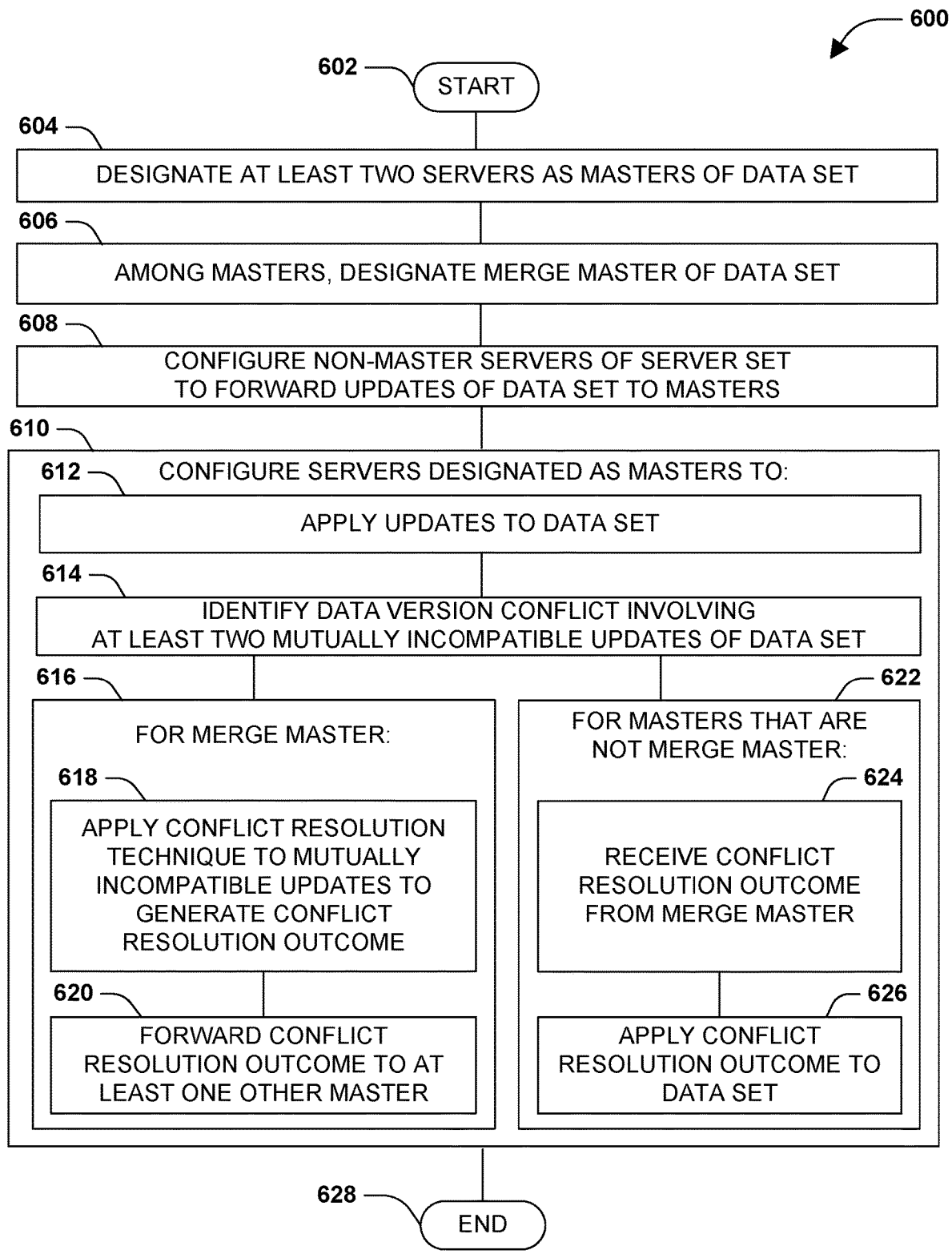
FIG. 6 is an illustration of an example method of configuring a server set to provide a data set in accordance with the techniques presented herein.

FIG. 6 is an illustration of an example method 500 of configuring a server set 102 to provide a data set 106 in accordance with the techniques presented herein. At least some portions of the example method 600 may be implemented, e.g., as a set of instructions stored in a volatile or nonvolatile memory of a server, such as a system memory circuit, a platter of a hard disk drive, a solid-state storage device, and/or an magnetic and/or optical computer-readable medium, wherein execution of the instructions by a processor 404 of the server 104 causes the server 104 to operate in accordance with at least a portion of the techniques presented herein.

The example method 600 begins at 602 and involves designating 604 at least two servers 104 of the server set 102 as masters 116 of the data set 106. The example method 600 further involves, among the masters 116, designating 606 a merge master 302 of the data set 106. The example method 600 further involves configuring 608 non-master servers 104 of the data set 106 to forward updates 120 of the data set 106 to the masters 116. The example method 600 further involves configuring 610 the servers 104 designated as masters 116 to apply 612 the updates 120 to the data set 106, and to identify 614 a data version conflict 202 involving at least two mutually incompatible updates 120 of the data set 106. The example method 600 further involves configuring 616 the merge master 302 to apply 618 a conflict resolution technique 304 to the mutually incompatible updates 120 to generate the conflict resolution outcome 306, and to forward 620 the conflict resolution outcome 306 to at least one other master 116 of the server set 106. The example method 600 further involves configuring 622 the masters 116 that are not designated as the merge master 302 to receive 624 the conflict resolution outcome 306 of the data version conflict 202 from the merge master 302, and to apply 626 the conflict resolution outcome 306 to the data set 106. Having achieved the configuration of the server set 102 to provide the data set 106 in accordance with the techniques presented herein, the example method ends at 628.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 7:
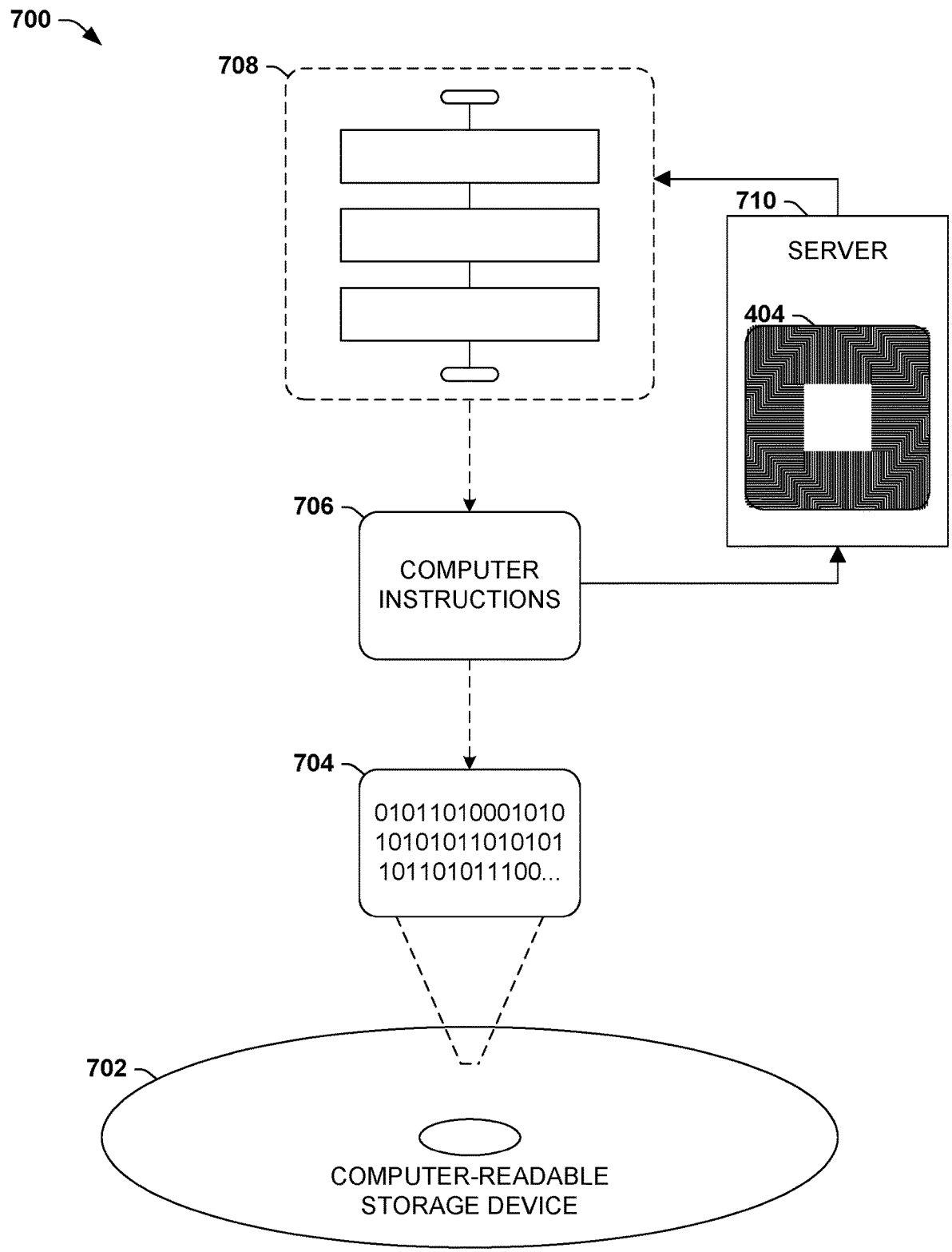
FIG. 7 is an illustration of an example computer-readable storage device storing instructions that, when executed by a processor of a server of a multi-master server set, cause the server to provide access to a data set on behalf of a workload in accordance with the techniques presented herein.

An example computer-readable medium that may be devised in these ways is illustrated in FIG. 7, wherein the implementation 700 comprises a computer-readable memory device 702 (e.g., a CD-R, DVD-R, or a platter of a hard disk drive), on which is encoded computer-readable data 704. This computer-readable data 704 in turn comprises a set of computer instructions 706 that, when executed on a processor 404 of a server 710, provide an embodiment 708 that causes the server 710 to operate according to the principles set forth herein. For example, the processor-executable instructions 706 may encode a system that causes the server 710 to resolve data version conflicts 202 arising within a data set 106 through the use of a merge master 302 in accordance with the techniques presented herein, such as the example server 402 and/or the example system 408 of FIG. 4. As another example, the processor-executable instructions 706 may encode a method of configuring the server 710 to resolve data version conflicts within a data set 106 through the use of a merge master 302, such as the example method 600 of FIG. 6. As a third example, the processor-executable instructions 706 may encode at least a portion of a method of configuring at least one server 104 of a server set 102 to resolve data version conflicts within a data set 106 through the use of a merge master 302, such as the example method 600 of FIG. 6. Many such embodiments may implement various portions of the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

E1. Scenarios

A first aspect that may vary among scenarios in which the techniques may be utilized relates to the types of servers and server sets. For example, the presented techniques may be utilized with a variety of servers, such as workstations, laptops, consoles, tablets, phones, portable media and/or game players, embedded systems, appliances, vehicles, and wearable devices. The server set may comprise a collection of server units, such as a collection of server processes executing on a device; a personal group of interoperating devices of a user; a local collection of server units comprising a computing cluster; and/or a geographically distributed collection of server units that span a region, including a global-scale distributed database. Such servers may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication).

A second aspect that may vary among scenarios in which the techniques may be utilized involves the types of workloads that are processed by the server set. Such workloads may include databases of various types, including relational databases such as SQL, object graph databases, and key/value store databases, as well as mixed-modality databases that support various data structures and/or query languages. Such workloads may also include, e.g., websites; web services; microservices; computing environments provided to various devices; data processing services, such as image processing, data mining, and/or artificial intelligence services; and/or local or remote applications, such as games. The presented techniques may be utilized with a variety of data sets featuring a variety of data models, such as a relational database comprising tabular data organized into tables comprising sets of attributes and sets of rows presenting values for the respective attributes; graph data comprising a graph of nodes with interconnecting edges; key/value pairs of keys and associated values; and documents provided as structured or unstructured collections of entities. Such data sets may also be used in a variety of circumstances, such as data warehousing; content provided through a content system such as a webserver; and object systems for an application or operating system. Some data sets may comprise a hybrid of several data models, which may be aggregated in a horizontal manner (e.g., a collection of items of which some items are provided and/or requested in a first native item format, such as relational data, and other items are provided and/or requested in a second native item format, such as entities within documents) and/or non-horizontal manner (e.g., a collection of items in a first native item format, such as entities within documents, may be described by metadata represented by other items provided in a second native item format, such as relational data). Many such scenarios may be identified in which the techniques presented herein may be advantageously utilized. Additionally, such workloads may be provided by, provided for, accessed by, and/or processed on behalf of a variety of clients, such as a client process on a server storing the data set; other servers within the server set; and/or various client devices that utilize the server set on behalf of one or more users and/or other devices.

A third aspect that may vary among scenarios in which the techniques may be utilized involves the types of service level agreements and/or performance requirements and guarantees extended thereby. Such performance requirements may include, e.g., latency requirements; availability requirements; throughput requirements; scalability requirements; and consistency level requirements, such as strong consistency, bounded staleness consistency, session consistency, prefix consistency, and/or eventual consistency. Some service level agreements may specify different performance requirements for different portions of the workload (e.g., different tasks comprising the workload, such as different types of queries that have different performance sensitivities); for different types of clients or data (e.g., workloads executed by or on behalf of a first class of clients and/or data may involve a first set of performance requirements, and workloads executed by or on behalf of a second class of clients and/or data may involve a different set of performance requirements); and/or for different contexts in which a workload is performed (e.g., different performance requirements for peak hours vs. off-hours). Many such variations may be included in variations of the techniques presented herein.

E2. Master and Merge Master Designation

A second aspect that may vary among embodiments of the techniques presented herein involves the designation of the masters 116 among the servers 104 that are permitted to update of the data set 106, and of the designation the merge master 302 that performs data conflict resolution for the data set 106.

As a first variation of this second aspect, the server set 102 may be partitioned to designate a master subset of at least two masters 116 that are permitted to update any data item 108 of the data set 106, including the designation of at least one of the masters 116 as a merge master 302, and a non-master subset of at least one non-master that is not permitted to update any data item 108 of the data set 106. Alternatively, the data set 106 may be partitioned into a first data subset and a second data subset, and the partitioning may involve partitioning the server set 102 into a first set of masters 116 and non-masters for the first data subset and a second, non-redundant set of masters 116 and non-masters for the second data subset. The subsets of the data set 106 for which different partitions of the server set 102 are selected may involve, e.g., different regions over which the server set 102 and/or data set 106 is distributed; different types of data sets 106 and/or servers 104; and/or different workloads 114 and/or clients 112 for whom the data set 106 is provided.

As a second variation of this second aspect, partitioning the server set 102 may involve a designation of masters 116 on a regional basis; e.g., a server set 102 may be distributed over at least two geographic regions, and the partitioning may involve designating at least one server 104 in each region as a master 116 of at least some data items 108 of the data set 106. In some embodiments, such designation may be further performed based on determined and/or expected sources of requests 118 for updates 120 to the data set 106, and the partitioning may involve identifying a geographic location as a source of requests 118 to update the data set 106 and designating a server 104 of the server set 102 that is proximate to the geographic location as a master 116 of the data items 108 that are anticipated to be updated by clients 112 near the geographic location.

As a third variation of this second aspect, the partitioning of the server set 102 into masters 116, including a merge master 302, and non-masters may be based upon the particular types of performance criteria 122 for the workload 114. That is, different types of performance criteria 122 may involve different heuristics and/or strategies for partitioning the multi-master server set 102 in a manner that promotes the consistent fulfillment of the performance criteria 122.

Figure 8:
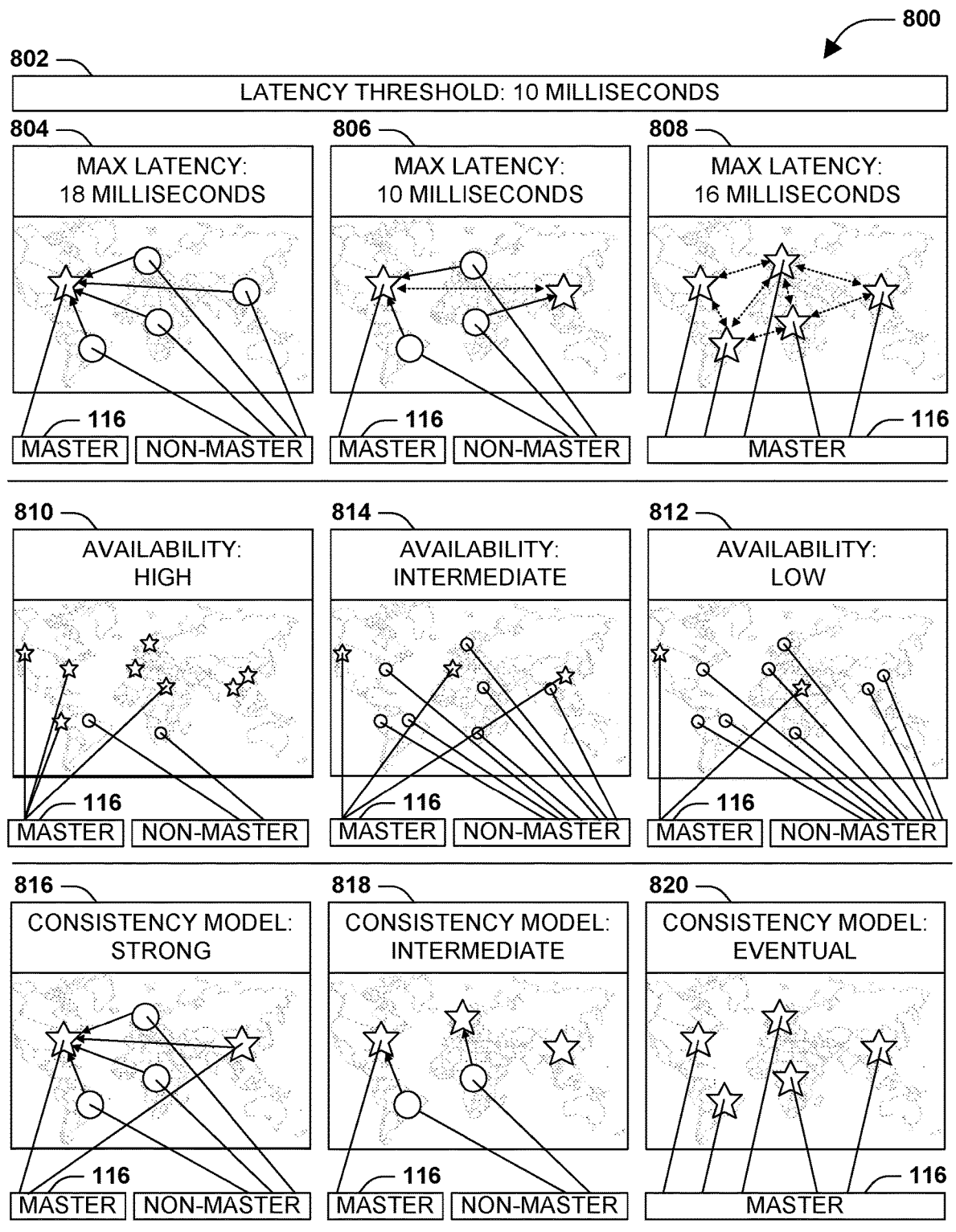
FIG. 8 is an illustration of an example scenario featuring various techniques for designating masters and merge masters of the server set in accordance with the techniques presented herein.

FIG. 8 is an illustration of a set of example scenarios 800 in which a server set 102 for a data set 106 is partitioned between a master subset of at least two masters 116, including the selection of a merge master 302, and a non-master subset of at least one non-master based upon the particular performance criteria 122 involved in the workload 114.

A first example shown in FIG. 8 involves a performance criterion 122 comprising a latency threshold 802, e.g., a 10-millisecond maximum duration in which an update 120 is expected to propagate throughout the server set 102. A single-master partitioning 804 may be identified as involving a maximum latency of 18 milliseconds, due to the worst-case path by which a request 118 may be forwarded to the selected single master 116 (e.g., a selection of a single master 116 located in the United States may involve a lengthy transmission delay from clients 112 located in Asia). In this scenario, no merge master 302 may be identified, as no multi-master merge conflicts are capable of arising. Conversely, an all-master partitioning 808, in which all servers 104 are identified as masters 116, may also involve a high maximum latency due to the extensive coordination involved in propagating the update 120 to every server 104 of the server set 102. The designation of even one merge master 302 may be incapable of handling the high volume of data version conflicts 202 without presenting a performance bottleneck and/or an availability risk. A multi-master partitioning 806 may present a balancing point in which each non-master is relatively proximate to a master 116 (thus reducing the forwarding delay in forwarding requests 118 for updates 120 from a non-master to a master 116), and also limiting the number of masters 116 to which an update 120 has to be propagated to ensure further propagation to the entire server set 102 as well as verification of the absence of data version conflicts. The multi-master partitioning 806, including the designation of a merge master 302, may therefore provide a placement of servers 104 and/or partitioning between masters 116 and non-masters that provides a worst-case latency that is within the latency threshold 802 comprising the performance criterion 122.

A second example shown in FIG. 8 involves a partitioning of the server set based on a performance criterion 122 specified as an availability of the workload 114 to the clients 112. A first partitioning 810 may be provided for a workload 114 that depends upon high availability, such as a service that has to remain available to receive and process updates 120 even in the event of multiple server failures, a wide-scale network partitioning, or a regional catastrophic event, such as a communication platform for first responders or government agencies. The partitioning may therefore involve a designation of a large number of masters 116, such that any client 112 that is able to connect to a network such as the Internet is guaranteed to find at least some masters 116 that are available to receive and process updates 120. However, the first partitioning 810 may exhibit high latency in confirming updates 120 across the entire server set 102 and/or may raise the likelihood of data version conflicts. On the other hand, a second partitioning 812 may be provided for a service that involves a performance criterion 122 only involving a low availability for processing updates 120, such as a relatively static distribution of content that may be widely available for reading but where temporary unavailability for updates 120 and a modest delay in propagating updates 120 may be tolerable. Such workloads 114 may be satisfied by allocating a server set 102 comprising a significant number of servers 104 but designating only a few masters 116, such that the majority of the servers 104 are non-masters that provide read-only access to the data set 106. Such designation may reduce the administrative complexity and the resource allocation in view of the relaxed performance criteria 122 of the workload 114. A third partitioning 814 may be provided for a workload 114 specifying a performance criterion 122 of an intermediate availability, where the third partitioning 814 may involve a designation of a modest but not excessive number of masters 116 (e.g., one master 116 in each of several broad geographic regions, such as continents) to provide a balance between availability of the workload 114 to clients 112 in the event of localized networking or server failures and the resource costs of the partitioning of the server set 102.

A third example shown in FIG. 8 involves a partitioning of the server set based on a performance criterion 122 specified as a consistency model. A first workload 114 may present a performance criterion 122 involving a strong consistency model, such as a condition that a requested update 120 is to be committed over the entire server set 102 before being reported to a client 112 as a fulfillment of a request 118. Such strong consistency may be appropriate, e.g., for financial transactions that depend upon complete guarantees of reliability. The server set 102 in this case may involve a first partitioning 816 in accordance with the strong consistency model, wherein the first partitioning 816 of the server set 102 involves the designation of two masters 116, which may confer with one another to verify and guarantee the absence of data version conflicts involving an update 120 before reporting the fulfillment of the request 118 to the client 112, where the two-master configuration provides a measure of availability in case one of the masters 116 fails or becomes inaccessible. A second partitioning 818 may involve an intermediate level of consistency, such as session consistency in which each master 116 provides a view of the data set 106 that is consistent within a session provided to respective groups of clients 112, though the sessions may differ from one another. The second partitioning 818 may involve the selection of one master 116 for each such group of clients 112, wherein data version conflicts among updates 120 may result in acceptable differences in versions of a data item 108 as perceived by different sessions, and wherein the masters 116 may resolve such differences in a relaxed manner to maintain the session consistency of each master 116 and group of non-masters. A third partitioning 820 may involve an eventual consistency model, in which each server 104 may reflect a series of updates 120 that are temporarily inconsistent with respect to the entire data set 106, and wherein updates 120 are eventually received and reorganized by each server 104 to present a consistent view of the data set 106. A third partitioning 820 may be provided in which all servers 104 are designated as masters 116, and in which all servers may eventually propagate updates 120 throughout the data set 102 on an indeterminate but unconstrained basis. In this manner, variations in the types of performance criteria 122 may inform the designation of masters 116 and the partitioning of the server set 102 in accordance with the techniques presented herein.

As a fourth variation of this second aspect, a merge master 302 may be designated among the masters 116 of the server set 102 in various ways. As a first such example, the number of merge masters 302 may vary. For example, a single merge master 302 may be designated for the data set 106 provide a comprehensive conflict resolution technique. Alternatively, several merge masters 302, each respectively identified as a merge master 302 for one or more subsets of data items 108 of the data set 106, may promote a per-data-item consolidation of data version conflict resolution while distributing the computational load of this task over several servers 104. As another alternative, a plurality of merge masters 302 may be designated for one or more data items 108; e.g., a first merge master 302 may serve as the merge master 302 for data version conflicts 202 arising within a first region or a first period of the day, while a first merge master 302 may serve as the merge master 302 for data version conflicts 202 arising within a second region or a second period of the day. As another alternative, multiple merge masters 302 may be identified in designated in a load-sharing or failover arrangement. For example, one or more servers 104 may monitor a computational load of the server 104 designated as the merge master 302, and responsive to a determination that the computational load of the merge master 302 exceeds a computational load threshold, the designation of the server 104 as the merge master 302 may be removed and a second master 116 of the server set 102 may be designated as a merge master 302 in lieu of the first server 104. As a second such example, a merge master 302 may be designated as a master 116 of the same data set 106 or data item 108 that also applies updates 120 to the data set 106. Alternatively, the merge master 302 may be reserved for addressing data version conflicts 202, and may otherwise operate as a non-master of the data set 106 or data items 108 thereof. As a third such example, the merge master 302 may be selected in various ways. For example, respective servers 104 of the server set 102 have a proximity with respect to other servers 104 of the server set 102, and the merge master 302 may be selected the proximity of the merge master 302 according to the proximity of the merge master 302 with respect to the masters 116 or other servers 104 of the server set 102. As another example, the merge master 302 may be designated as a master 116 that is within or near a region where updates 120 and/or data version conflicts 202 are known or anticipated to arise frequently, such that resolution of the data version conflicts 202 by reducing network transport delays. As yet another example, the merge master 302 may be selected based on the capabilities of the respective servers 104 of the serer set 102, such as a server 104 having the maximum available processing, storage, or network capacity among the available servers 104 and/or masters 116 of the server set 102.

Figure 9:
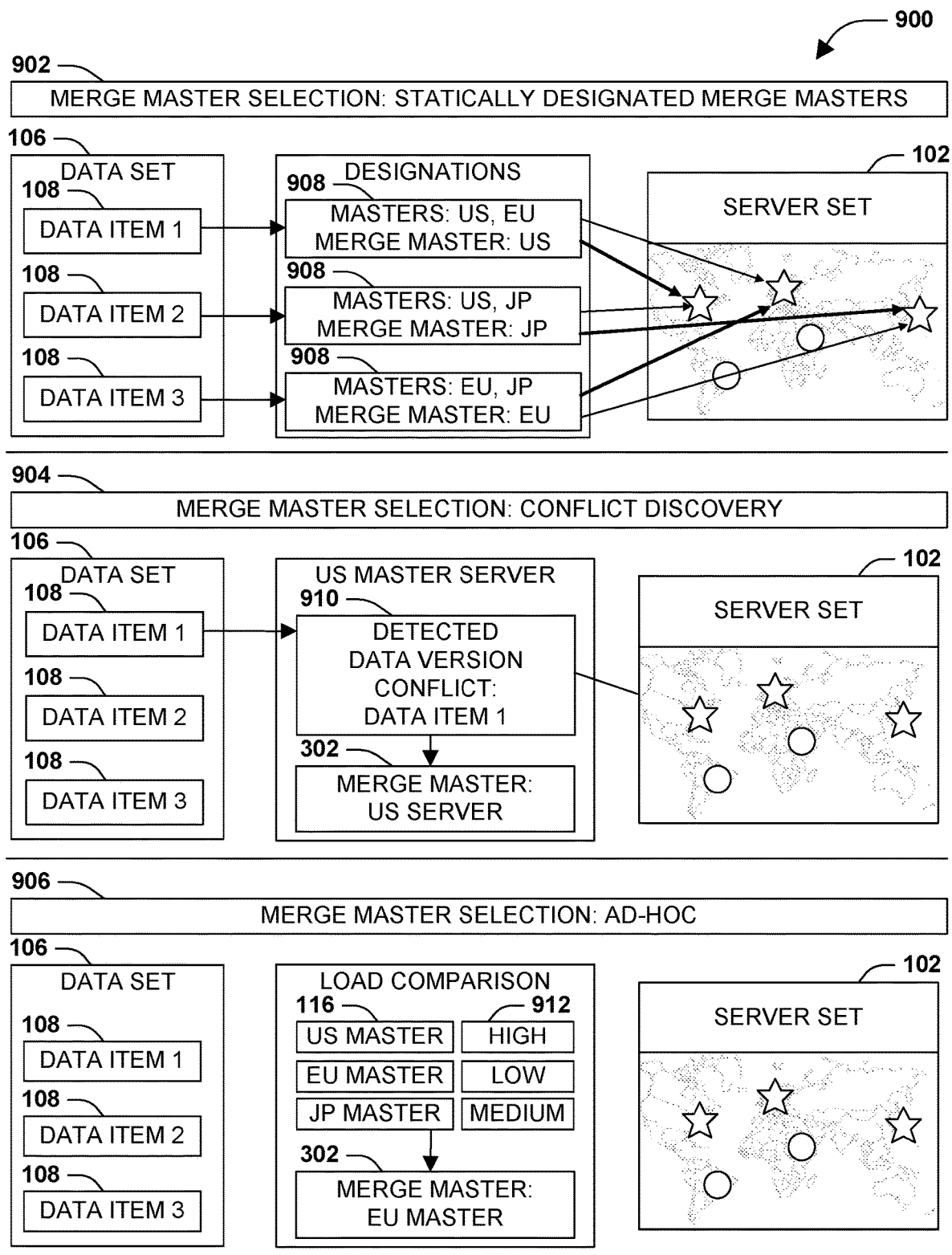
FIG. 9 is an illustration of an example scenario featuring various techniques for identifying a merge master that is designated to perform data version conflict resolution for a selected data version conflict in accordance with the techniques presented herein.

FIG. 9 is an illustration of some example scenarios 900 featuring a designation of a merge master 302 to resolve a data version conflict 202. FIG. 9 presents, as a first such example 902, a designation 908 of a merge master 302 in a static manner; e.g., respective data items 108 of the data set 106 may have designations 908 of both the masters 116 of the data item 108 and the merge master 302 for a data item 108. When a server 104 identifies a data version conflict 202 involving a particular data item 108, the server 104 may identify the merge master 302 that has been designated for the data item 108 and may notify the merge master of the data version conflict 202.

FIG. 9 presents, as a second such example 904, a designation 908 of a merge master 302 in a dynamic manner. In this second example 904, among the masters 116 in each of several geographic regions, a merge master 302 is identified for each such region. In response to a detection 910 of a data version conflict 202, a designation 908 of a merge master 302 for the data version conflict 202 may be performed, e.g., by identifying the master 116 that has been designated as a merge master 302 for the geographic region in which the data version conflict 202 is initially detected. The data version conflict 202 may be forwarded to the merge master 302 for the region for resolution.

FIG. 9 presents, as a third such example 906, an ad-hoc designation 908 of a merge master 302. In this third example 906, at the time of a data version conflict 202, different masters 116 that may serve as a merge master 302 may be subjected to an evaluation of a current computational load 912. The master 116 currently exhibiting the lowest computational load 912 among such masters 116 may be designated as the merge master 302 for the data version conflict 202.

As a fifth variation of this second aspect, a variety of techniques may be used to verify that the partitioning of the server set 102 into a master subset, including the designation of the merge master 302, and a non-master subset is sufficient to fulfill the performance criteria 122 of the workload 114, such as may be specified in and/or guaranteed by a service level agreement. As a first such example, the capabilities of various partitions of the server set 102 may be prospectively evaluated through estimation, prediction, and/or heuristics (e.g., estimating the latency and/or throughput of respective servers 104 in a selected partitioning of the server set 102 and comparing the estimates with a latency threshold and/or estimated volume of the workload 114) and compared with a similarly evaluated computational demand in providing the workload 114 according to the performance criteria 122. Alternatively or additionally, a partitioned server set 102 may be subjected to a computational load, either of the workload 114 or of a simulation thereof, and the performance of the partitioned server set 102 may be measured and compared with the performance criteria to verify that the partitioned server set 102 fulfills the performance criteria 122 of the data set 106 and the workload 114. For example, a workload 114 may involve a performance criterion 122 comprising a latency threshold for propagation of updates 120 to the data set 106, and an embodiment may observe the performance of the server set 102 during the commitment of updates 120 to various data items 108 in order to verify that the updates 120 of the partitioned server set are completed within the latency threshold. In an embodiment, the evaluation may be performed for a task of the workload 114 by identifying a set of paths through the server set 102 by which the task is performed; among the set of paths, identify a worst-performing path (e.g., the longest network path, by distance and/or number of nodes, over which the server set 102 communicates regarding an update 120 of the data set 106) and verifying that the worst-performing path fulfills the performance criterion 122.

As a sixth variation of this second aspect, the designation of servers 104 as masters 116, including the merge master 302, and non-masters and the partitioning of the server set 102 into a master subset and a non-master subset—as well as the redesignation and repartitioning, as further discussed herein—may be achieved in a variety of ways. As a first such example, the designation and partitioning may be performed by a user such as an administrator, either via direct selection of servers 104 and designation as masters 116 or non-masters, or via the provision of a logic, such as rules or conditions under which respective servers 104 are to be designated as masters 116 or non-masters. As a second such example, the designation and partitioning may be determined in an automated manner, e.g., via rules or heuristics (e.g., a rule that two servers 104 in each region are to be designated as masters 116, such as the two servers 104 that exhibit the lowest update latency and/or that are centrally located, that the rest of the servers 104 in the respective regions are to be designated as non-masters), or via simulation, such as generating a set of candidate partitions of the server set 102 and comparing simulated and/or measured performance metrics to identify a partition that may satisfy the performance criteria 122 of a service level agreement. Such comparison may be guided by heuristics, such as genetic selection of candidate partitions, or may be performed by sampling a substantial portion of the search space of the candidate partitions, optionally performing such testing to the exhaustion of the search space. Such searches may also be informed by prior instances of partitions of the server set 102 for the same or other data sets 106 and/or workloads 114. As a third such example, the partitioning may be performed in a centralized manner (e.g., a single user or process determines the partitioning) or a decentralized manner (e.g., respective servers 104 elect to serve as a master 116 or a non-master of a data item 108, and conflicts such as too many or two masters 116 are resolved via vote-based consensus). As a fourth such example, the partitioning may be informed by and/or performed according to the details of the server set 102 (e.g., designating some servers 104 as non-masters that lack the computational resources to apply updates 120 in accordance with a performance criterion 122), the data set 106, the workload 114, and/or the client set 110 (e.g., examining the data set 106 and the usage by the workload 114 to identify a consistency level and a latency threshold according to the semantics of the workload 114 and/or the geographic distribution of the client set 110). As a fifth such example, designation and partitioning may be performed at various levels of granularity (e.g., the designation of a server 104 as a master 116 may apply to all data items 108 of the data set 106, or only to a select data item 108 or even a portion thereof; and the designation of the server 104 as a master 116 may apply to all data sets used by workloads 114 of a particular user or application, or even to all data sets used by workloads 114 of several or even all users or applications). Some embodiments may utilize a combination of such techniques; e.g., an administrator may specify a few heuristics, and an automated process may be applied to choose a partitioning that satisfies the performance criteria 122 in addition to the heuristics. Conversely, an automated process may be utilized to generate a small number of candidate partitions, optionally with varying tradeoffs (e.g., a first partition that presents lower latency but higher consistency than a second partition), and an administrator may be presented with the set of candidate partitions (optionally describing the relative advantages of each) and allow the administrator to choose the partitioning of the server set 102 for the data set 106 and workload 114. Many such variations may arise within the range of scenarios within which the currently presented techniques may be utilized.

E3. Merge Master Receipt of Data Version Conflict

A fourth aspect that may vary among embodiments of the presented techniques involves the detection of data version conflicts 202 due to the multi-master configuration of the server set 102; the identification of the merge master 302 to perform data version conflict resolution for the data version conflict 202; and the forwarding of the data version conflict 202 from another server 104 to the merge master 302.

As an example of such a data version conflict 202, the data item 108 may comprise a counter with an initial value of 10; the first update 120 may specify an increase in the value of the counter from 10 to 12; and the second update 120 may specify an increase in the value of the counter from 10 to 14. The final value of the counter may vary depending on how the updates 120 are received and processed by different masters 116. A first master 116 may receive and apply the first update 120 (making the value 12), and may then receive the second update 120 but may reject the second update 120 as inapplicable since the value of the counter is no longer 10. A second master 116 may receive and apply the second update 120 (making the value 14), and may then receive the first update 120 but may reject the first update 120 as inapplicable since the value of the counter is no longer 10. A third master 116 may concurrently receive both updates 120 (e.g., receiving one update 120 while the other update 120 is still pending, or even receiving both updates 120 simultaneously), may identify the potential for a data version conflict 202, and may reject both updates 120, leaving the data item 108 in its initial state with a value of 10. A fourth master 116 may receive and commit the first update 120, may then receive the second update 120 and identify the potential for a data version conflict 202, and may initiate a rollback of the first update 120—such that that the counter briefly exhibits the value 12, but then reverts to the value 10. A fifth master 116 may receive and commit the second update 120, may then receive the first update 120 and identify the potential for a data version conflict 202, and may initiate a rollback of the second update 120—such that that the counter briefly exhibits the value 14, but then reverts to the value 10. A sixth master 116 may receive both updates 120 and determine that the first update 120 requests a value increase of two, and the second update 120 requests a value increase of four, and, by applying the first update 120 and then the second update 120, such that the value of the data item 108 is briefly 12 and then ends at 16. A seventh master 116 may follow a similar process, but may receive and apply the updates 120 in the opposite order—such that the value of the data item 108 is briefly 14 and then ends at 16. In this manner, the processing of two updates 120 of a single, relatively simple data item 108 may result in a variety of data versions that reflect differences in the processing performed by each master 116 in a multi-master configuration.

The details may become even more complicated, e.g., if more than two updates 120 and/or more than two master 116 are involved, resulting in more than two data versions; if an update 120 involves several data items 108, such as a transfer of value from a first data item 108 to a second data item 108, and moreover wherein the respective data items 108 may have different sets of masters 116; and/or if the complexity of the data item 108 is substantial.

As noted, the configuration of a server set 102 with multiple masters 116 may introduce or increase the prospects of data version conflicts 202 involving conflicting updates 120 by different masters 116. A variety of techniques may be utilized to detect and resolve such data version conflicts.

As a first variation of this fifth aspect, the detection of a data version conflict 202 may occur in many ways. As a first such example, a first master 116 that endeavors to apply an update 120 to a data item 108 may find that a previously applied and/or concurrently pending update 120 by a second master 116 produces a different version of the data item 108, such that applying the update 120 by the master 116 may leave the data item 108 in an inconsistent state. As a second such example, a first master 116 may apply a first update 120 to the data item 108, and may subsequently receive a second update 120 of the data item 108 propagated by a second master 116 that conflicts with the first update 120. As a third such example, respective masters 116 may apply updates 120 to local copies of the data set 106, and a synchronization process that endeavors to synchronize the local copies of the data set 106 (e.g., on a periodic basis) may identify a data version conflict 202 involving different versions of the data item 108 in different local copies of the data set 106. As a fourth such example, a process may scan the data set 106 and may discover the presence of data version conflicts 202 therein; e.g., the data version conflicts may involve a violation of a constraint of the data set 106, such as a violation of a schema of the data set 106 or a broken relationship, such as where a first master 116 creates a relationship of a first record to a second record while a second master 116 deletes the second record.

As a second variation of this fifth aspect, the detection of a data version conflict 202 may result in the identification of a merge master 302 that is to perform the data version conflict resolution, which may occur in various ways. As a first such example, the entire data set 106 may include a designation of one merge master 302 for the entire data set 106, and the identification may involve an identification of the one merge master 302. As a second such example, respective servers 104 may be designated as a merge master 302 for a selected data item 108, and identifying the merge master 302 to perform the data version conflict resolution may involve identifying the data item 108 that is involved in the data version conflict 202 and the merge master 302 associated with the data item 108. For example, the data set 106 may include an annotation or association of respective data items 108 with the server 104 designated as the merge master 302 for the data item 108. Where a data version conflict 202 involves multiple data items 108 that are respectively associated with different merge masters 302, the identification of a merge master 302 may involve a selection of any of the merge masters 302, either arbitrarily or in a deterministic manner (e.g., based on a lowest-numbered data item 108 included in the data version conflict 202); and/or a notification of all such merge masters 302 to result in a further consensus selection, thereamong, of the particular merge master 302 to perform the data version conflict resolution. As a fourth such example, where respective servers 104 are designated as merge masters 302 only under certain circumstances (e.g., a first merge master 302 provided to resolve conflicts arising within a first region or within a first period of the day, and a second merge master 302 provided to resolve conflicts arising within a second region or within a second period of the day), the identification of the merge master 302 may involve a comparison of the circumstances under which the data version conflict 202 arises with the circumstances under which the respective servers 104 are designated as a merge master 302. As a fifth such example, the masters 116 of the server set 102 may be informed in advance of the merge master(s) 302, and may store such information for later use during an identification in response to the detection of a data version conflict 202. Alternatively, a master 116 may perform such an identification on an ad-hoc basis, e.g., by broadcasting a request among the masters 116 for a response identifying the merge master 302, or by consulting a live or active directory of the servers 104 that identifies the merge master 302.

As a third variation of this fifth aspect, the server 104 that detects the data version conflict 202 may determine that it is the merge master 302 for the data version conflict 202, and on such condition, may initiate the data version conflict resolution process. Alternatively, the server 104 may identify a second server 104 of the server set 102 as the merge master 302, and may forward the data version conflict 202 to the merge master 302 for resolution. As a first such example, the forwarding may involve transmitting to the merge master 302, a notification of the data version conflict 202, either directly or indirectly (e.g., through another server 104, such as a server 104 serving as an intake or triage point for data version conflict notifications). As a second such example, the forwarding may involve a broadcast notification by the server 104 discovering the data version conflict 202 to the masters 116 of the data set 106 and/or the data item 108 involved in the data version conflict 202, wherein the merge master 302 may be included in the broadcast group and may receive the notification. As a third such example, the forwarding may involve registering the data version conflict 202 in a data version conflict log that is monitored by the merge master 302, such that the merge master 302 is notified of the insertion of a record into the data version conflict log (e.g., a push or subscribe notification mechanism), and/or the merge master 302 periodically checks the data version conflict log (e.g., a polling or discovery notification mechanism). As a fourth such example, the notification may involve flagging or annotating the data item 108, such that the merge master 302 that is associated with the data item 108 is notified and/or may discover the flag or annotation denoting the occurrence of a data version conflict 202. As a fifth such example, the notification may include an identification of the data items 108 involved in the data version conflict 202; one or more of the updates 120 involved in the data version conflict 202; and/or the circumstances under which the data version conflict 202 was detected (e.g., the nature of the mutual incompatibility of the updates 120, such as a schema restriction of the data item 108 that the updates 120 apparently violate). Many such techniques may be utilized to detect the data version conflict 202 and notify the merge master 302 thereof in accordance with the techniques presented herein.

E4. Data Version Conflict Resolution

A fourth aspect that may vary among embodiments of the presented techniques involves variations of the data version conflict resolution techniques used by the merge master 302 to resolve the data version conflict 202 of the mutually incompatible updates 120 of the data item 108.

As a first variation of this fourth aspect, a portion of the data set of a workload may be associated with a manual conflict resolution technique. When a data version conflict arises within such a portion of the data set, a server may register the conflict (e.g., in a data version conflict log) and/or notify a user, such as the client of the workload, as a request to resolve the data version conflict. In some embodiments, the server may simply ask the user to resolve the conflict, e.g., by deleting one of the conflicting data versions and/or selecting one of the data versions as the controlling data version. In some embodiments, the server may assist the user in resolving the conflict, e.g., by identifying and describing the conflict, and/or by presenting selectable options to the user to resolve the conflict, optionally including details about the consequences of selecting each such option (such as presenting a view of the data set if each option is selected). In some embodiments, the server may provide additional resources to enable the user to resolve the conflict, e.g., executing code provided by the user to evaluate and/or resolve the conflict.

As a second variation of this fourth aspect, a portion of the data set of a workload may be associated with a last-writer-wins policy. For example, a particular workload may be significantly based on a latest version of the data set, with little or no interest in maintaining past versions of the data set, such that conflicts may be resolved by automatically choosing the latest update and overwriting previous versions of the data element, including earlier writes presented by data version conflicts. In such embodiments, the server may automatically resolve data version conflicts by identifying and choosing the latest write. "Latest" may be determined in a variety of ways; e.g., if the distributed servers share a synchronized clock, the updates may be compared by timestamp, but if the distributed servers to not share a synchronized clock, the updates may be compared by logical sequence numbers. In some variations, the latest update may be selected while conflicting updates are simply discarded; in other variations, the conflicting updates may not be applied to the data set, but may be recorded in a log, used to update a logical sequence number of the updates, etc. Other variations that involve a relatively simple comparison and selection include: first-writer-wins (e.g., subsequent conflicting writes are discarded and may be reinitiated based on the updated data set); prioritization (e.g., writes received by a first server, or initiated by a first client or user, or of a certain value, may take priority over writes from a different server, initiated by a different client or user, or of a different value); and/or side-effects (e.g., writes that require little or no rollback of other writes may be selected over writes that require extensive rollback of other writes). In some instances, data version conflicts may be selected arbitrarily (e.g., based on random number selection) and/or consensus (e.g., different master servers may vote on which of the conflicting data versions to accept). In some cases, multiple conflicting data versions may all be applied (e.g., a first update that involves incrementing a data element and a second update that involves decrementing a data element may both be applied without conflict to the data element, and/or may be identified as canceling each other and therefore both dropped).

As a third variation of this fourth aspect, custom conflict resolution may be applied. For example, a client may specify that a particular process is to be used to evaluate and/or resolve any conflicts that may arise within a particular portion of the data set of a workload. The process may be stored, e.g. as a stored procedure that is triggered whenever a data element within the selected portion of the data set is updated and/or whenever a data version conflict is identified. For example, when a server identifies a data version conflict, the server may retrieve the process and invoke it with the collection of conflicting data versions; the process may indicate which data version to accept, and the server may apply the selected data version and discard the conflicting data versions. In some circumstances, the process may be stateful (e.g., recording the incidence of data version conflicts, and/or resolving a current data version conflict in view of past data version conflicts) and/or may generate reports for the client of the workload. In some embodiments, the custom conflict resolution process may be limited to an examination of the conflicting data versions (e.g., in order to expedite resolution of the data version conflict). In other embodiments, the custom conflict resolution process may be permitted to inspect other aspects of the data set in the context of evaluating and resolving the data version conflict (e.g., determining the consequences of choosing each data version on the overall integrity of the data set of the workload). Furthermore, some of these embodiments may apply the conflict resolution process within a snapshot isolation guarantee (e.g., the conflict resolution process may be presented with a view of the data set at the time the data version conflict arose and/or was detected); other of these embodiments may apply the conflict resolution process to a live, dynamic version of the data set (e.g., the conflict resolution process may be presented with a current view of the data set). In some embodiments, the custom conflict resolution may be invoked on an ad-hoc basis, e.g., to evaluate and resolve an identified and currently pending conflict. Alternatively or additionally, the custom conflict resolution may be invoked on a prospective and/or proactive basis (e.g., a process that scans the data set of a workload to identify as-yet-undetected data version conflicts, and/or that examines pending transactions or activities to identify emerging instances of data version conflicts).

As a fourth variation of this fourth aspect, some data elements of the data set of a workload may be identified as comprising conflict resolution data types (CRDTs). A conflict resolution data type schema and/or specification may be provided that indicates the semantics of conflict resolution for any and all data elements of respective conflict resolution data types. As a second example, a data element may be identified as an array. Data version conflicts may take the form of concurrent requests to write an item to the array while it is in a particular state (e.g., both a first master server and a second master server may agree that the array currently has three elements, but both master servers may initiate requests top write a particular data item as the fourth element in the array). The conflict resolution data type schema may be consulted to determine that such conflicts, in the context of an array, may be resolved by appending both items into the array, and optionally a selected appending order. As a second example, a data element may be identified as a value that is modified in a relative manner. For example, a counter-type integer with an initial value of 10 may be the subject of conflicting write requests: one that requests a value of 12 and one that requests a value of 15. The conflicting writes may be interpreted as requests to increment the value by 2 and 5, respectively, and both updates may be applied by incrementing the value by 7 and writing the new value of 17. Alternatively, a value-type integer with an initial value of 10 may be the subject of conflicting write requests: one that requests a value of 12 and one that requests a value of 15. In this case, the updates may be identified as mutually exclusive—i.e., the data element may comprise a reference to an identifier of another element, and must comprise either 12 (referencing a second data element) or 15 (referencing a third data element), but not any other value—and a selection may be made, or at least a pending data conflict may be registered. In some scenarios, users may be permitted to define their own conflict resolution data types (CRDTs) and/or the semantics of updating such data types and resolving data version conflicts thereof. In some scenarios, the conflict resolution data types of various data elements may be specified by a client or a workload, such as metadata annotations of the data elements according to the data types specified in the CRDT schema (e.g., "this integer is a counter" vs. "this integer is a reference"). Alternatively or additionally, the conflict resolution data types may be inferred, e.g., from the data type itself (such as its name); from the access and/or usage patterns of the data type; and/or from similarities with other data elements for which conflicts have previously been resolved. In some scenarios, the CRDT may be formalized as an application programming interface (API) that accepts the data version conflicts and other factors, such as the circumstances in which the conflict arose, and that determines and applies an appropriate conflict resolution data type. In some embodiments (particularly inferences), the selected conflict resolution data type and associated resolution technique may be automatically applied (e.g., where the confidence in the inference is high) either permanently or tentatively; and/or the selected conflict resolution type and associated resolution technique may merely be identified and presented as a suggestion, e.g., to a client, a workload, and/or a conflict resolution delegate process.

In some embodiments, the server may permit further access to the data element while data version conflict is pending (e.g., responding to read requests by indicating the existence of the pending data version conflict and/or specifying the content of different data versions, and/or by selecting a default or tentative data version conflict that is to be tentatively considered the current state of the data element until the data version conflict is resolved). In other embodiments, the server may restrict access to the data element while the data version conflict is pending (e.g., quarantining the data element from writes, and possibly even from reads, until the data version conflict has been resolved).

As a fifth variation of this fourth aspect, different portion of the data set of a workload may be associated, e.g. in a static manner, with a particular data conflict resolution technique. For instance, certain sections, tables, paths, and/or data element types of the data set of a workload may be associated with a first data version conflict resolution technique, while other sections, tables, paths, and/or data element types of the data set of a workload may be associated with a different data version conflict resolution technique. Alternatively or additionally, a portion of the data set may be associated with multiple data version conflict resolution techniques, which may be selected in combination (e.g., to identify a consensus in the data version conflict resolution among the various data version conflict resolution techniques) and/or in a priority order (e.g., invoking a first data version conflict resolution technique, and either applying it if the first data version conflict resolution technique produces a high-confidence output, or invoking a second data version conflict resolution technique if the first data version conflict resolution technique produces a low-confidence output). In some embodiments, the particular data version conflict resolution technique to be applied to a portion of the data set may be specified by a client of the workload, e.g., in a prospective and/or ad-hoc manner. In some embodiments, the particular data version conflict resolution technique to be applied to a portion of the data set may be determined on an ad-hoc basis (e.g., an API may be called with the details of the data version conflict, and may therefore choose a data version conflict resolution technique). In some embodiments, the particular data version conflict resolution technique to be applied to a portion of the data set may be inferred, e.g., based on the context in which the data version conflict arises, such as the type of conflict and/or the type of data element involved in the conflict.

As a sixth variation of this fourth aspect, a conflict resolution outcome 306 generated to resolve the data version conflict 202 may contain various types of information. As a first such example, a conflict resolution outcome 306 may include a subset of the mutually incompatible updates 120 that have been selected to resolve the data version conflict 202, and may exclude other mutually incompatible updates 120 that are to be discarded and not applied to the data set 106. As a second such example, rather than including particular updates 120, a conflict resolution outcome 306 may reference or indicate the updates 120 that are to be applied, e.g., by specifying reference numbers or symbols that distinctively identify the updates 120 to be applied to the data set 106, such as a logical sequence number that was attached to the update 120 by the master 116 initiating the update 120. As a third such example, a conflict resolution outcome 306 may include a new update 120 that supersedes the mutually incompatible updates 120, such as an update 120 that merges the mutually incompatible updates 120 and that is to be applied in lieu of any of the mutually incompatible updates 120. As a fourth such example, a conflict resolution outcome may comprise instructions for modifying the data set 106 in a manner that resolves the data version conflict 202. Many such data version conflict resolution techniques may be selected and applied to various portions of the data set of a workload in accordance with the techniques presented herein.

E5. Transmission of Updates and Conflict Resolution Outcomes

A fifth aspect that may vary among embodiments of the presented techniques involves variations in the transmission of updates 120 and conflict resolution outcomes 306 among the servers 104 of the server set 102 to resolve data version conflicts 202.

In some scenarios, the order in which updates 120 and/or conflict resolution outcomes 306 are applied may affect the state of the data set 106 and/or the performance of the server set 102. For example, a merge master 302 may receive updates 120, determine data version conflicts 202, and identify conflict resolution outcomes 306 using many sequences of operations. Concurrently, servers 104 designated as a master 116 (but not necessarily a merge master 302) may also perform operations in a particular sequence to transmit updates 120 and receive and apply conflict resolution outcomes 306. Moreover, the propagation of updates 120 and conflict resolution outcomes 306 may vary through the server set 102. For example, a first master 116 may transmit a first update 120 and then receive a conflict resolution outcome 306 based thereupon; a second master 116 may receive the first update 120 (initiated by the first master 116) only after receiving the conflict resolution outcome 306 involving the first update; and a third master 116 may receive the first update 120 and/or the conflict resolution outcome 306 after initiating or receiving a subsequent, superseding update 120 and/or conflict resolution outcome 306. If the logical sequences of the operations applied by the various masters 116 and merge master 302 varies, the data sets 106 utilized by different sets of servers 104 may diverge, leading to the propagation and even generation of new data version conflicts 202 that may be difficult to counteract. In other scenarios, a particular update 120 may be received by a master 116 more than once, e.g., due to multiple routing paths from the source of the update 120 to the master 116, and/or a failed transmission of an acknowledgment sent by the master 116 to the source that causes the source to retry the delivery of the update 120 to the master 116. The receipt of duplicates of an update 120 may cause the master 116 to process the update 120 multiple times, which may cause the data set 106 stored by the master 116 to diverge from replicas of the data set 106 stored by other masters 116. In accordance with these observations, a variety of techniques may be used to organize the application of operations by the server set 102 in a consistent and deterministic manner.

As a first variation of this fifth aspect, logical sequence numbers (LSNs) are attached to updates 120 and/or conflict resolution outcomes 306 to indicate a logical sequence of operations performed by each master 116 and merge master 302. Each server 104 may track the logical sequence numbers utilized by other servers 104 and apply the operations in sequential order matching the sequential order of the logical sequence numbers. A first master 116 may store a current logical sequence number for its own updates 120, and for each update 120 in a sequence, the master 116 may (in either order) increment the current logical sequence number and attach the current logical sequence number to the update 120, thereby indicating to other masters 116 the order in which the updates 120 by the master 116 are to be applied to match the order in which the master 116 initiated the updates 120.

As a second variation of this fifth aspect, respective masters 116 may promptly transmit each update 120 to another master 116, including a merge master 302, for evaluation to identify data version conflicts 202 or the absence thereof. Alternatively, respective masters 116 may collect updates 120 into an update batch, which may be transmitted to a master 116 in accordance with an update batch condition, such as the collection of a selected threshold item count of updates 120 in the update batch or an age of the update batch (e.g., the oldest pending update 120 in the update batch). In some scenarios, the update batch condition is selected based upon performance criteria of the data set 106.

As a third variation of this fifth aspect, respective masters 116 may store a vector clock, which indicates, for respective other masters 116 (including merge masters 302), the highest logical sequence number that has been received for operations performed by the other master 116. When a receiving master 116 receives an update 120 from an issuing master 116 that includes a logical sequence number that is higher than the current logical sequence number of the issuing master 116, the receiving master 116 may apply the update 120 as the latest operation in the sequence of operations initiated by the issuing master 116, and may also update the vector clock for the issuing master 116 with the logical sequence number attached to the received update 120. Alternatively, if the logical sequence number of the update 120 matches the current logical sequence number indicated by the vector clock for the issuing master 116, the receiving master 116 may discard the update 120 as a duplicate (since the vector clock indicates that the logical sequence number attached to the update 120 has been previously received). Alternatively, if the logical sequence number of the update 120 is below the current logical sequence number stored by the vector clock for the issuing master 116, the receiving master 116 may determine that the update 120 was initiated by the issuing master 116 before a second update 120 from the issuing master 116 that has previously been received and applied by the receiving master 116, where the second update 120 included the current logical sequence number represented in the vector clock for the issuing master 116 that is higher than the logical sequence number attached to the first update 120. The receiving master 116 may respond, e.g., by discarding the first update 120; by reordering the order in which the updates 120 are applied in accordance with the logical sequence numbers, e.g., by reversing the second update 120 and applying the first update 120 before the second update 120; or by forwarding the first update 120 and the second update 120 to a merge master 302 as a data version conflict 202 to be resolved by the merge master 302.

As a fourth variation of this fifth aspect, the merge master 302 may utilize logical sequence numbers in the evaluation and resolution of data version conflicts 202. For example, if the updates 120 with different logical sequence numbers involve the same data item 108, the merge master 302 may determine that the updates 120 are mutually incompatible and may choose one update 120 (as the conflict resolution outcome 306) while discarding the other update 120, e.g., choosing the update 120 with the lower logical sequence number as a first-writer-wins conflict resolution technique 304, or choosing the update 120 with the higher logical sequence number as a last-writer-wins conflict resolution technique 304. In other scenarios, the merge master 302 may determine that the updates 120 are mutually compatible if applied in a particular order (e.g., both updates are to be applied in the order represented by the logical sequence number), or because the updates 120 involve different data items 108 of the data set 106 or different, unrelated portions of the same data item 108. In this manner, the merge master 302 may promote the orderly application of updates 120 initiated by an issuing master 302 across the data set 106 in accordance with the techniques presented herein.

As a fifth variation of this fifth aspect, the merge master 302 may use logical sequence numbers to establish a sequence of conflict resolution outcomes 306. For example, a series of data version conflicts 202 involving a particular data item 108 may lead to a sequence of conflict resolution outcomes 306, and the order in which the conflict resolution outcomes 306 are applied to the data set 106 by the masters 116 may affect the resulting state of the data set 106. A merge master 302 may store a logical sequence number to identify a sequential order of the set of conflict resolution outcomes 306 issued by the merge master 302. The logical sequence numbers used by the merge master 302 may be identified as global logical sequence numbers (GLSNs), e.g., signifying that the conflict resolution outcomes 306 identified by the GLSNs involve the resolution of mutually incompatible updates 120 received from any masters 116 of the server set 102, and are therefore to be received and applied by each master 116 to the replicas of the data set 106 stored and/or accessed thereby. For example, a merge master 116 may generates a sequence of global logical sequence numbers, and may transmitting conflict resolution outcomes 306 by attaching a current global logical sequence number to the conflict resolution outcome 306 and (before or after such attaching) incrementing the current global logical sequence number.

As a sixth variation of this fifth aspect, a merge master 302 may utilize batching to distribute conflict resolution outcomes 306. For example, a merge master 302 may generate a set of conflict resolution outcomes 306 for respective data version conflicts 202, and rather than promptly transmitting a conflict resolution outcome 306 upon generation, the merge master 302 may temporarily store the conflict resolution outcome 306 in a conflict resolution outcome batch with other conflict resolution outcomes 306 until a batch transmit condition is fulfilled, and may then transmit the conflict resolution outcome batch to at least one master 116 of the server set 102. As a first example, the batch transmit condition may comprise a batch time as compared with a batch period (e.g., conflict resolution outcome batches may be transmitted periodically, such as once per minute). As a second example, the batch transmit condition may comprise a batch age as compared with a batch age threshold (e.g., conflict resolution outcome batches may be transmitted when the oldest conflict resolution outcome 306 and/or update 120 in the conflict resolution outcome batch exceeds a threshold age, which may limit the maximum pendency of updates 120). As a third example, the batch transmit condition may comprise a batch data volume as compared with a batch volume threshold (e.g., the conflict resolution outcome batch may be sent when the data volume stored thereby exceeds a data size threshold limit). As a fourth example, the batch transmit condition may comprise a batch item count as compared with a batch item count threshold (e.g., the conflict resolution outcome batch may be transmitted when a selected number of conflict resolution outcomes 306 are collected). As a fourth example, the batch transmit condition may comprise a batch priority as compared with a batch priority threshold (e.g., determining a significance of the conflict resolution outcomes 306 in the conflict resolution outcome batch, such as the significance of the data items 108 involved in data version conflicts 202 included in the conflict resolution outcome batch and/or the consequential impact of the pending data version conflict 202, and transmitting the conflict resolution outcome batch when the significance of the resolved data version conflicts 202 meets a batch priority threshold). In some embodiments, the batch transmit condition may be selected based on a performance criterion set forth in a service level agreement, such as choosing a shorter period for data sets 106 that are dependent upon low latency or a strong consistency model, and a longer period for data sets 106 that is tolerant of high latency and/or an eventual consistency model. In some embodiments, a combination and/or hierarchy of batch transmit conditions may be utilized, such as transmitting conflict resolution outcome batches periodically but promptly transmitting a conflict resolution outcome batch in order to propagate a high-priority conflict resolution outcome 306 for a data version conflict 202 with potentially severe consequences.

As a seventh variation of this fifth aspect, a merge master 302 may propagate conflict resolution outcomes 306 throughout the server set 102 according to a routing map; e.g., the merge master 302 may initially transmit a conflict resolution outcome 306 or a conflict resolution outcome batch to a first subset of masters 116, which may in turn forward the conflict resolution outcome 306 or the conflict resolution outcome batch to an additional subset of masters 116. As a first example, a proximity-based star topology may be utilized in which the merge master 302 transmits to a subset of nearby masters 116, which may in turn forward to additional masters 116 in an outwardly radiating manner. As a second such example, a hierarchical topology may be utilized in which the merge master 302 transmits to a subset of regional masters 116 (e.g., a first master 116 serving the United States, a second master 116 serving the European Union, and a third master 116 serving Asia), and each master 116 may forward to other masters 116 within the region. In some scenarios, the routing map may be relatively static and established; in other scenarios, the routing map may be determined dynamically, e.g., as masters 116 including merge masters 302 are designated and undesignated. In some scenarios, the routing map may be formulated in a centralized manner, such as by the merge master 302; in other scenarios, the routing map may be formulated in a decentralized manner, such as mesh networking scenarios. Many such techniques may be utilized to transmit updates 120 and conflict resolution outcomes 306 throughout the server set 102 in accordance with the techniques presented herein.

E6. Resolution of Pending Writes

A sixth aspect of the techniques presented herein involves the configuration of the masters 116 to store and utilize data items 108 that are involved in a pending update 120 that to be evaluated by a merge master 302, and that may be the subject of a data version conflict 202.

As a first variation of this sixth aspect, while an update 120 to a data item 108 is pending (e.g., prior to receiving either a conflict resolution outcome 306 from a merge master 302 that settles any data version conflicts 202 involving the update 120, or confirmation by the merge master 302 that no such data version conflict 202 exists), a server 104 may handle requests 118 for the data item 108 in a variety of ways. As a first such example, the server 104 may provide the data item 108 in its pre-update state despite the update 120, e.g., making updates 120 visible only after commitment and resolution of data version conflicts 202. As a second such example, the server 104 may provide the updated data item 108, even if the state of the data item 108 may be reverted or changed by a conflict resolution outcome 306. As a third such example, the server 104 may provide both the pre-update and updated states of the data item 108. As a fourth such example, the server 104 may include, with its response to the request 118, a notification of the pending update 120 of the data item 108 and the possibility of a data version conflict 202 that may affect the state of the data item 108. As a fifth such example, the server 104 may hold such requests 118 until the update 120 and any data version conflicts 202 involving the update 120 are resolved. As a sixth such example, the server 104 may decline to fulfill the request 118, optionally advising a client 112 to resubmit the request 118 at a later time when the update 120 may be resolved.

As a second variation of this sixth aspect, a server 104 may communicate the volume and outcomes of pending updates 120 to the data set 106 to clients 112. As a first such example, a server 104 may store an update feed that indicates updates 120 to the data set 106, such as an enumeration or log of updates 120, and may present the update feed to clients 112 inquiring about updates 120 to the data set 106. The update feed may include a variety of information, such as the number of pending updates 120; the data items 108 involved in the updates 120, optionally including the pre-update and/or post-update states of the data items 108; the incidence of detected data version conflicts 202; and the conflict resolution outcomes 306 generated therefor. As a second such example, a server 104 may store a set of subscribers to one or more data items 108 and/or updates 120 thereof (e.g., a list of clients 112 that are currently utilizing respective data items 108, or that initiated the updates 120 that may be involved in a data version conflict 202), and may notify the set of subscribers of a conflict resolution outcome 306 and/or the absence of a data version conflict 202 in response to communication from the merge master 302. As a third such example, a request 118 involving a data item 108 that is involved in a pending update 120 may specify a pre-update read and/or a post-update read, and the request 118 may be fulfilled by providing the corresponding state of the data item 108.

As a third variation of this sixth aspect, a master 116 may store pending updates 120 of data items 108 in a tentative update set. Responsive to determining that the update 120 is not involved in a data version conflict 202, the master 116 may commit the update 120 stored in the tentative update set to the data set 106, and may remove the update 120 from the tentative update set. The tentative update set may also be compared with conflict resolution outcomes 306 received from the merge master 302 to distinguish between updates 120 that are to be committed to the data set 106 (either because such updates 120 are not involved in a data version conflict 202 or because such updates 120 have been selected to resolve a data version conflict 202) and updates 120 that are to be discarded and not committed to the data set 106 (because such updates 120 are involved in a data version conflict 202 and have been superseded by other updates 120). A master 116 may therefore compare the tentative update set with the conflict resolution outcome 306 to determine that an update 120 is involved in the data version conflict, as indicated by whether the update is included in the conflict resolution outcome received from the merge master 302; responsive to determining that an update 120 in the tentative update set is not included in the conflict resolution outcome 306, the master 116 may discard the update from the tentative update set.

As a fourth variation of this sixth aspect, a master 116 may store a vector clock that indicates a highest global logical sequence number that has previously been received in a conflict resolution outcome 306 or conflict resolution outcome batch from the merge master 302. Respective conflict resolution outcomes 306 or conflict resolution outcome batches may also include a global logical sequence number to indicate a sequential order in which the conflict resolution outcomes 306 transmitted by the merge master 302 are to be applied. If the global logical sequence number of a conflict resolution outcome 306 or conflict resolution outcome batch is equal to the global logical sequence number in the vector clock, the conflict resolution outcome 306 or conflict resolution outcome batch may be identified as a duplicate that has already been received and applied, and may be discarded. If the conflict resolution outcome 306 or conflict resolution outcome batch includes a global logical sequence number that is lower than the global logical sequence number in the vector clock, the master 116 may determine that the conflict resolution outcomes 306 or conflict resolution outcome batches have been applied out of order. If the conflict resolution outcome 306 or conflict resolution outcome batch includes a global logical sequence number that is higher than the global logical sequence number in the vector clock, the master 116 may determine that the conflict resolution outcome 306 or conflict resolution outcome batch is new and the latest in a sequence, and may apply it to the data set 106 and store the global logical sequence number in the vector clock. If the global logical sequence number is at least two counts higher than the global logical sequence number in the vector clock, the master 116 may determine that at least one conflict resolution outcome 306 or conflict resolution outcome batch with an intermediate global logical sequence number that is to be applied before the more recently received conflict resolution outcome 306 or conflict resolution outcome batch has not yet been received. The master 116 may therefore request the missing conflict resolution outcome 306 or conflict resolution outcome batch from the merge master 302, or may store the newly received conflict resolution outcome 306 or conflict resolution outcome batch for processing in the correct sequential order.

As a fifth variation of this sixth aspect, in addition to storing a global logical sequence number for the merge master 302 (e.g., in a vector clock), a master 116 may use the global logical sequence number to facilitate processing of conflict resolution outcomes 306 and to coordinate the sequence of operations of the master 116 with the sequence of operations of other masters 116 and the merge master 302. As a first such example, a master 116 that transmits updates 120 to a merge master 302 may attach the global logical sequence number of the merge master 302 in the vector clock, e.g., to indicate that the update 120 sequentially follows the last received conflict resolution outcome 306 or conflict resolution outcome batch. For instance, if a data item 108 was included in a data version conflict 202 that was resolved by a conflict resolution outcome 306, a new update 120 of the same data item 108 may attach a global logical sequence number that is equal to or greater than the global logical sequence number of the conflict resolution outcome 306 in order to indicate that the update 120 is subsequent to the resolution of the earlier data version conflict 202. As a second such example, the global logical sequence numbers attached to the respective updates 120, along with the logical sequence numbers that identify the individual updates 120, may be used to determine which updates 120 are involved in a data version conflict 202, have not been selected by the merge master 302, and are therefore to be discarded and not applied to the data set 106. This determination may involve receiving a conflict resolution outcome 306 from the merge master 302 that includes a global logical sequence number that exceeds the global logical sequence number of the update (i.e., that the merge master 302 performed a review of data version conflicts 202 that included the update 120) and that omits the update 120, thereby indicating that the update 120 is not selected. Accordingly, the master 116 may discard the update 120 (e.g., removing the update 120 from a tentative update set) and refrain from applying it to the data set 106. As a third such example, a conflict resolution outcome 306 may be received by a master 116 that also stores (e.g., in a tentative update set) an additional update 120 of a data item 108 that is involved in a data version conflict 202 that was resolved by the conflict resolution outcome 306. If the additional update 120 is subsequent to the conflict resolution outcome 306 (e.g., if the additional update 120 includes a logical sequence number that is higher than the logical sequence number of an update 120 in the conflict resolution outcome 306), then the conflict resolution outcome 306 may be discarded, as it represents an outdated updating of the state of the data item 108. Alternatively, the additional update 120 may instead be discarded, e.g., as an update 120 that was requested when the data item 108 was in a state that did not reflect the conflict resolution outcome 306. A client 112 requesting the update 120 may be informed of the intervening state change of the data item 108 and/or requested to retry the update 120 in view of the updated state of the data item 108.

As a sixth variation of this sixth aspect, the tentative update set may be regarded as a volatile memory store of uncommitted updates, such that loss or corruption of the tentative update set (e.g., a failure of a storage component of a master 116 storing the tentative update set) may be regarded as inconsequential. Alternatively, the tentative update set may be regarded as a set of updates 120 that have to be processed or at least attempted, and therefore safeguards against data loss may be utilized to secure the tentative update set in the event of a failure of a storage component. For example, the server set 102 may comprise at least one replica of a master 116, and the tentative update set may be propagated from the master 116 to the at least one replica. Many such techniques may be utilized to store and process updates 120 while conflict resolution is pending in accordance with the techniques presented herein.

E7. Example Embodiment

Figure 10:
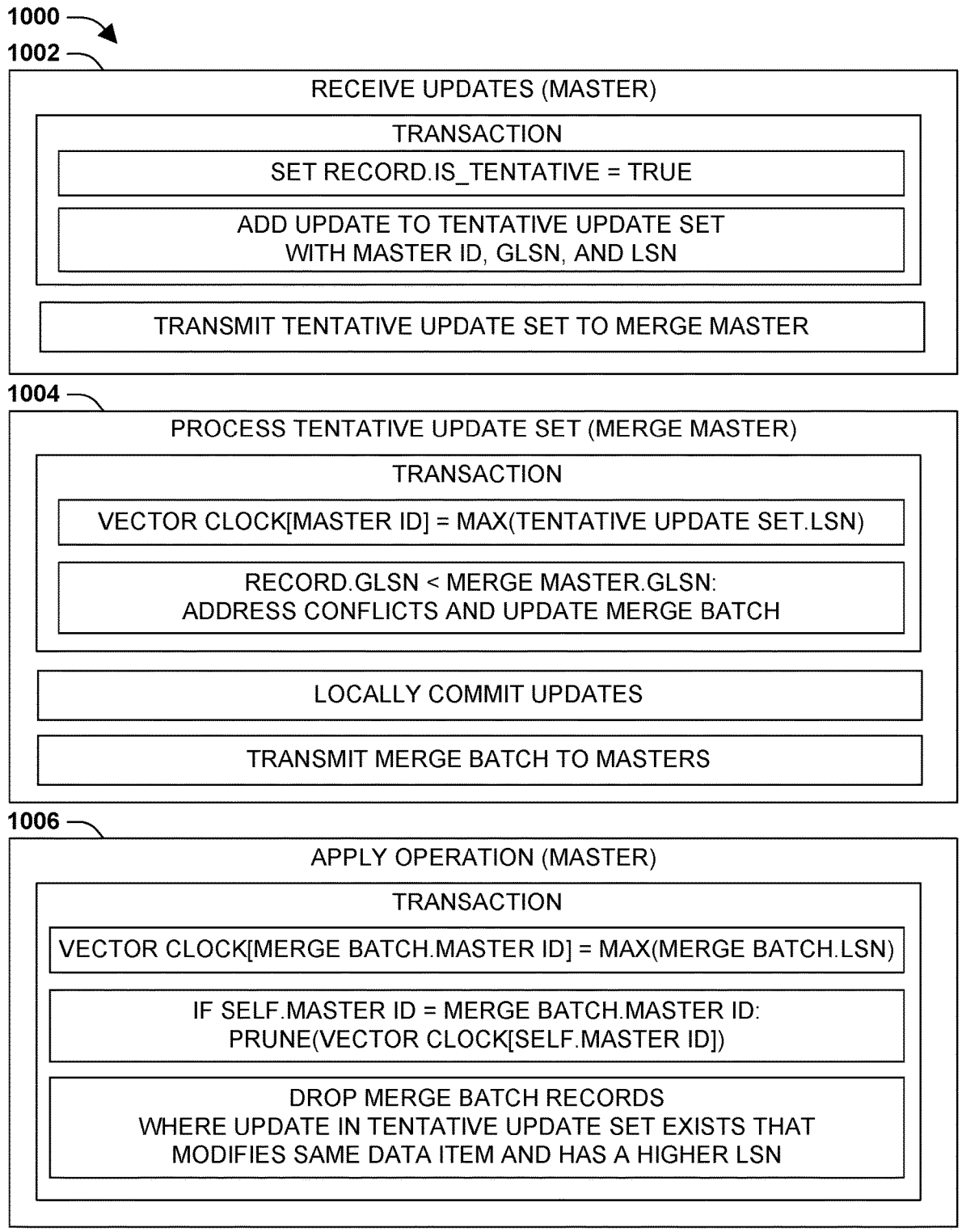
FIG. 10 is an illustration of an example algorithm for coordinating a data version conflict resolution by a merge master on behalf of a set of masters in accordance with the techniques presented herein.

FIG. 10 is an illustration of an example algorithm 1000 that causes a master 116 and a merge master 302 to provide data version conflict resolution in accordance with the techniques presented herein. The example algorithm provides a concise and general summary of an embodiment of the techniques presented herein, which is illustrated in more detail in the example scenario of FIGS. 11A-11B.

The example algorithm 1000 comprises three parts. A first part 1002 of the example algorithm is performed by a master 116 for an update 120 of the data set 106. The master 116 may perform, as a transaction, setting a tentative flag on a record of the data set 106, and updating a tentative update set with a record of the update 120, including a master identifier of the master; a global logical sequence number; and a sequence number. The master 116 may then transmit the tentative update log to the merge master 302 for further evaluation.

A second part 1004 of the example algorithm is performed by a merge master 302 for a tentative update set received from a master 116. The merge master 302 may perform, as a transaction, a vector clock update for the master 116 submitting the tentative update set to indicate the highest logical sequence number presented in the tentative update set; and a data version conflict 202 check and resolution of any records in the tentative update set having a global logical sequence number that is less than the current global logical sequence number (and which may, therefore, conflict with previously committed updates that were considered and resolved in a batch update associated with a lower global logical sequence number). The merge master 302 may also locally commit the updates to a local version of the data set 106, and may transmit a merge batch to one or more masters 116.

A third part 1006 of the example algorithm is performed by a master 116 for a merge batch received from the merge master 302. The master 116 may, as a transaction, update a vector clock that associates each master 116 indicated in the merge batch with the maximum logical sequence number provided in the merge batch for the master 116. If the merge batch includes updates 120 for the master 116, the transaction also involves pruning the tentative update set of any updates 120 that have a lower logical sequence number than the vector clock record for the master 116. The transaction also involves discarding any updates 120 in the merge batch that involve the same data item 108 as an update 120 that remains in the tentative update set after the pruning (e.g., any updates 120 in the merge batch that are superseded by a subsequent and pending update 120 of the same data item 108, wherein the superseding update 120 has a logical sequence number that is higher than the maximum logical sequence number in the vector clock for the master 116). In this manner, the configuration of the master 116 and merge master 302 as provided by in the example algorithm 1000 of FIG. 10 enables the provision of the data set 106 in a manner that detects and resolves data version conflicts 202.

Figure 11A:
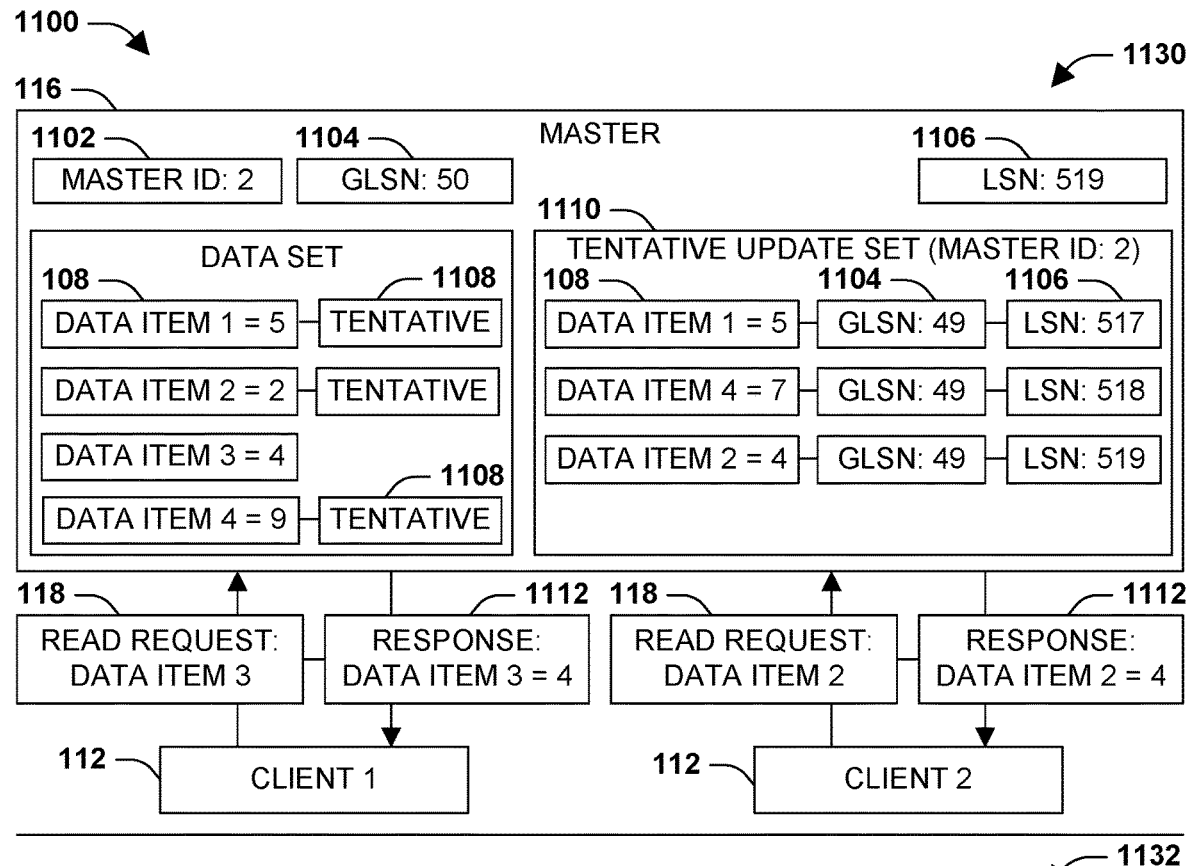
FIG. 11A-B together presents an illustration of an example scenario featuring a resolution of a data version conflict using a vector clock and a tentative operation log in accordance with the techniques presented herein.
Figure 11A:
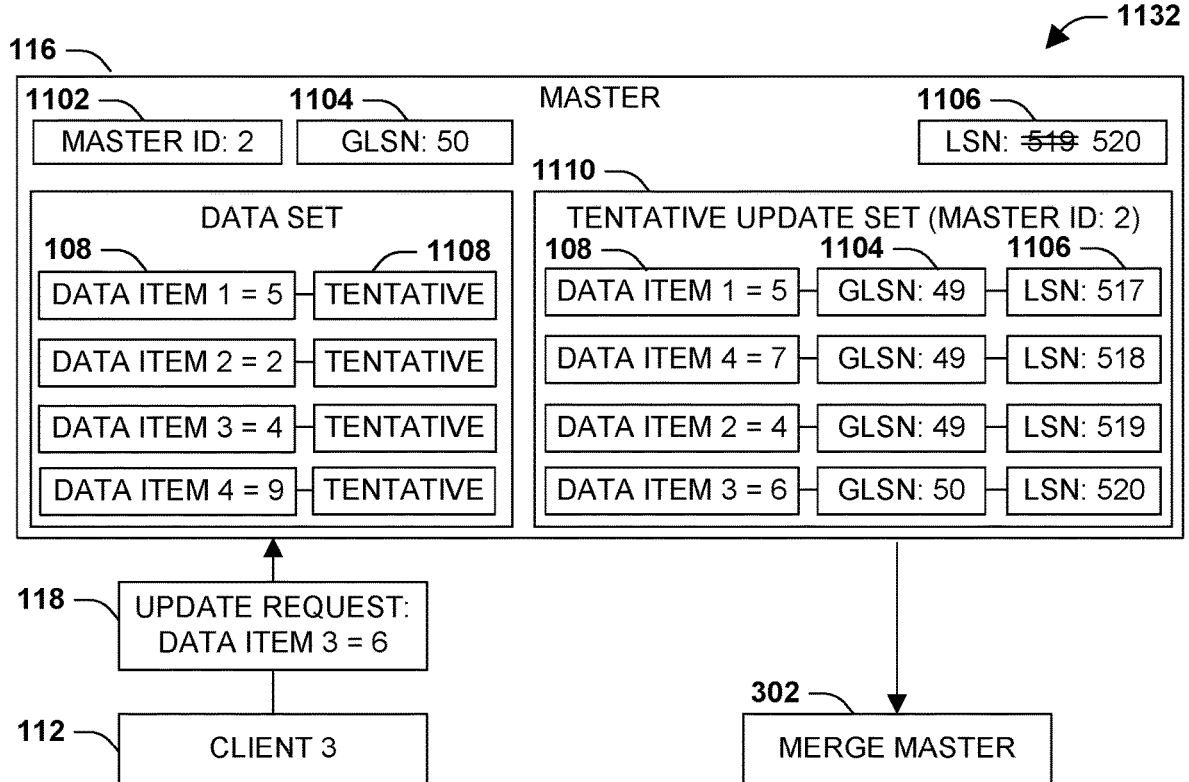
Figure 11B:
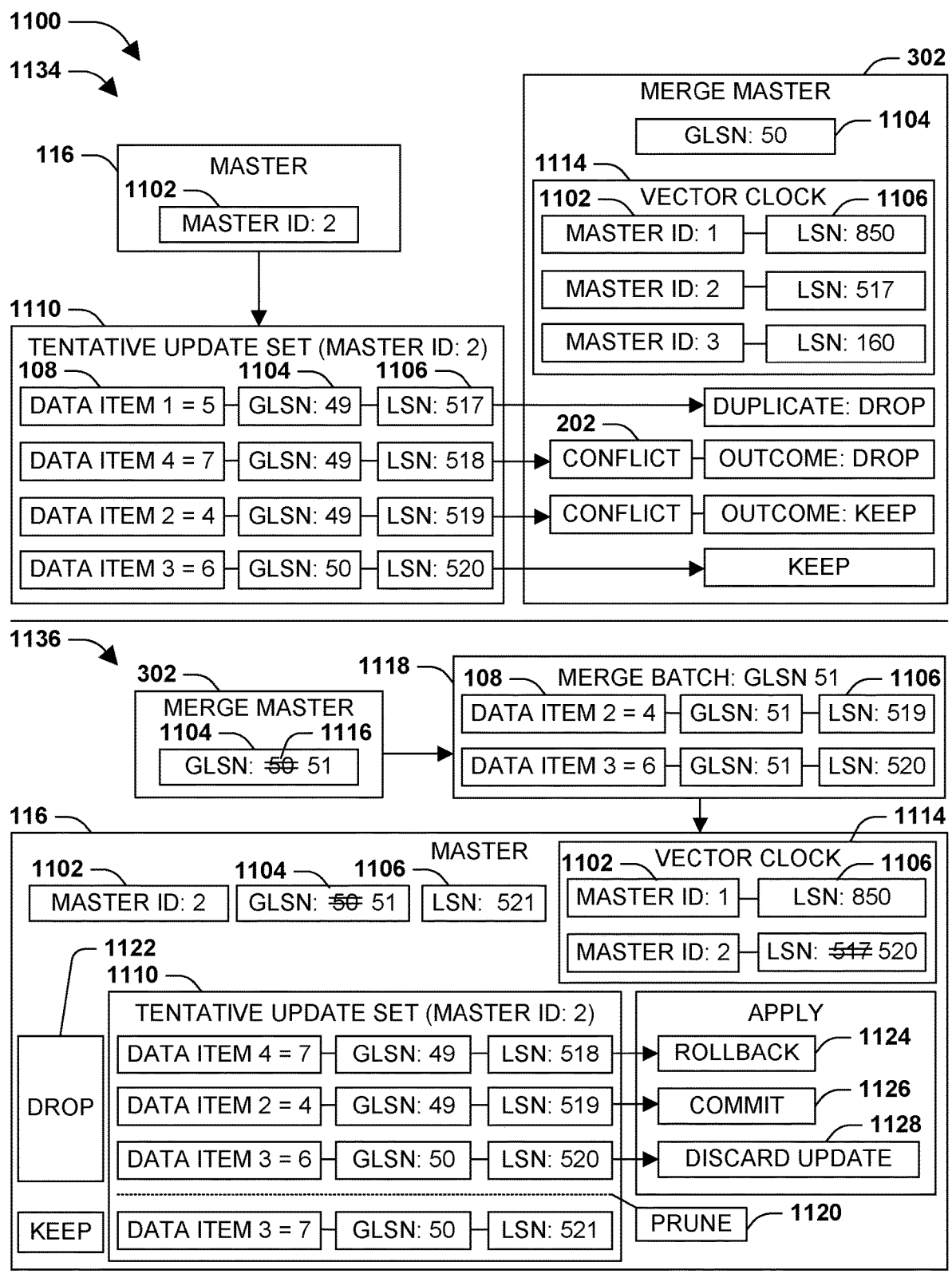

FIGS. 11A-11B, together, present an illustration of an example scenario 100 featuring an example embodiment of the present disclosure, wherein a master 116 and a merge master 302 interoperate to achieve the distribution of updates 120 and the detection and resolution of data version conflicts 202 in accordance with the techniques presented herein.

In this example scenario 1100, the master 116 is a server 104 of a server set 102 that provides a data set 106, wherein the server 104 has been designated as a master 116 for four data items 108 of the data set 106, and is therefore permitted to apply updates 120 to any of the four data items 108. The merge master 302 is another server 104 of the server set 102 that, in addition to being designated as a master 116 of at least a portion of the data set 106, has been designated as a merge master 302 for at least the same four items 108 of the data set 106, and, consistent with this designation, resolves data version conflicts 202 arising in the data items 108. The example scenario 1100 includes four stages: a first stage 1130 wherein a master 116 receives requests 118 and maintains a tentative update set 1110; a second stage 1132 wherein the master 116 applies an update 120 to the data set 106 and transmits the tentative update set 1110 to a merge master 302; a third stage 1134 wherein the merge master 302 receives and processes the tentative update set 1110 of the master 116; and a fourth stage 1136 wherein the merge master 302 transmits a merge batch 1118 to the master 116, which applies the contents thereof to the data set 106.

In FIG. 11A, at a first stage 1130, a master 116 stores a data set 106 comprising a set of data items 108 and fulfills requests 118 by the respective clients 112. The master 116 is identified by a master identifier 1102, and also stores two numeric identifiers: a global logical sequence number 1104 that identifies the last merge batch 1118 received from the merge master 302 and a logical sequence number 1106 that identifies the latest update 120 that the master 116 has applied to the data set 106. The master 116 in this example scenario also stores a tentative update set 1110 that includes records of updates 120 that have been requested to be applied to a data item 108 of the data set 106; that the master 116 has initiated for application to the corresponding data item 108, but has not yet committed to the data set 106. The respective updates 120 comprise an identification of the data item 108 and the update 120 applied thereto (e.g., a new value to be assigned to the data item 108); the global logical sequence number 1104 stored by the master 116 at the time the update 120 was initiated; and a logical sequence number 1106, which is a monotonically increasing integer that distinctively identifies each update 120 initiated by the master 116, and which indicates the sequence in which the updates 120 are to be applied to the data set 106. The data set 106 also includes an option to flag a data item 108 as tentative 1108, i.e., subject to an update 120 that is featured in the tentative update set 1110. When a first client 112 submits a request 118 to read the third data item 108, the master 116 may examine the data set 106 to determine whether the third data item 108 is flagged as tentative 1108; finding no such flag, the master 116 may provide the first client 112 with a response 1112 indicating the value of the third data item 108 stored in the data set 106. However, when a second client 112 submits a request 118 to read the second data item 108, the master 116 may examine the data set 106 and determine that the second data item 108 is flagged as tentative 1108, and therefore provide the second client 112 a response 1112 indicating the value of the second data item 108 in the tentative update set 1110, which may fulfill some types of concurrency, such as "read-your-writes" concurrency in which the updates 120 of a particular client 112 are promptly visible to the client 112 even if such updates 120 have not yet propagated throughout the server set 102 to the other servers 104 and are not yet visible to other clients 112.

Although not shown in the example scenario 1100 of FIG. 11A, in some embodiments, the master 116 may, alternatively or additionally, notify a requesting client 112 that the value provided in the response 1112 is tentative 1108, thereby notifying the client 112 that the value is subject to change. In some embodiments, the master 116 may, alternatively or additionally, include the current value of the second data item 108 in the data set 106, thereby maintaining a durable sequential consistency of the data item 108 and/or giving the client 112 the option of using either the current value of the data item 108 or the tentative, new value of the data item 108. In some embodiments, when the master 116 fulfills a read request 118 of the client 112 of a data item 108 that is flagged as tentative 1108, the master 116 may later proactively notify the client 112 when the tentative value of the data item 108 has been resolved (e.g., when the value of the data item 108 has changed and/or been confirmed as having the value recorded in the tentative update set 1110 at the time of fulfilling the read request 118, or when the value of the data item 108 has been maintained and/or reverted to the value stored in the data set 106 if the tentative update 120 is dropped and/or rolled back).

In FIG. 11A, at a second stage 1132, the master 116 receives a request 118 from a third client 112 to update a third data item 108 to a particular value. The master 116 may first increment the logical sequence number 1106, and then generate a new update 120 in the tentative update set 1110 indicating the update 120 of the third data item 108, including the global logical sequence number 1104 currently stored by the master 116 and the incremented logical sequence number 1106. The master 116 may also flag the third data item 108 as tentative 1108, such that subsequent reads of the third data item 108 during the pendency of the update 120 are provided using the value stored in the tentative update set 1110. Additionally, the master 116 may transmit at least a portion of the tentative update set 1110 to the merge master 302, labeled with the master identifier 1102 of the master 116. Such transmission may promote the propagation of updates 120 throughout the server set 102 as well as the detection and resolution of data version conflicts 202 involving the updates 120 provided by the second master 116.

Although not shown in the example scenario 1100 of FIG. 11A, in some variations, the tentative update set 1110 may include updates 120 initiated by other masters 116 (e.g., where a second master 116 transmits its tentative update set 1110 to the merge master 302 indirectly through the current master 116, such as where a routing path has been established, and/or where a network partition prevents the second master 116 from transmitting directly to the merge master 302). In such cases, the current master 116 may merge its tentative update set 1110 with the tentative update set 1110 of the second master 116 and transmit the merged tentative update set 1110 to the merge master 302. Alternatively or additionally, the master 116 has received the tentative update set 1110 may include updates 120 that were previously submitted to the merge master 302, either directly by the master 116 in a previous tentative update set 1110 or indirectly via another master 116, such as in the case of a network partition that prevents the master 116 from transmitting the tentative update set 1110 directly to the merge master 302.

In FIG. 11B, at a third stage 1134, the merge master 302 comprises a global logical sequence number 1104, which is a monotonically increasing integer that distinctively identifies each merge batch 1118 of updates 120 that are free from data version conflicts 202 and/or that resolve an existing data version conflict 202. The merge master 302 also comprises a vector clock 1114 that stores, for respective masters 116 respectively identified by a master identifier 1102, the highest logical sequence number 1106 that the merge master 302 has received from the master 116. For example, prior to receiving the tentative update set 1110 as depicted in the third stage 1136 of FIG. 11B, the merge master 302 has seen the highest logical sequence number 1106 of the second master 116 as 517. The vector clock 1114 facilitates the evaluation of tentative update sets 1110 received from the respective masters 302.

As depicted in this third stage 1134, the merge master 302 receives the tentative update set 1110 submitted by the second master 116 and evaluates it in the following manner. First, the logical sequence numbers 1106 in the tentative update set 1110 are compared with the logical sequence number 1106 of the second master 116 stored in the vector clock 1114 to determine whether any such updates 120 have previously been received and processed by the merge master 302. For example, the update 120 may have previously been transmitted by the second master 116 to a different master 116 that propagated the update 120 to the merge master 302, which processed the update 120, but the second master 116 may not have been informed of the successful transmission by the other master 116, and may therefore maintain the update 120 in its tentative update set 1110. When the first update 120 in the tentative update set 1110 is compared with the logical sequence number 1106, the merge master 302 may determine that the update 120 has already been processed, and may therefore drop the update 120 in order to avoid sending a duplicate update 120 to the other masters 116.

After comparing the logical sequence numbers 1106 of the updates 120 of the tentative update set 1110 to the logical sequence number 1106 of the master 116, the merge master 302 may compare the global logical sequence numbers 1104 of the updates 120 with the global logical sequence number 1104 of the last transmitted merge batch 1118. The merge master 302 may determine that the second and third updates 120 in the tentative update set 1110 indicate the previous global logical sequence number 1104, and may therefore conflict with updates 120 of the same data items 108 that were previously reported to the other masters 116 in the merge batch 1118. That is, the chronological sequence of updates 120 to a particular data item 108 may include a second update 120 that was previously initiated by another master 116 and included by the merge master 302 in a previous merge batch 1118, but the second update 120 may have been chronologically preceded by a first update 120 initiated by a different master 116 but received later by the merge master 302, and the merge master 302 may have to resolve the chronological inconsistency using a data version conflict resolution technique. When such circumstances arise (e.g., due to the inclusion of an update 120 in a tentative update set 1110 featuring a global logical sequence number 1104 that precedes the global logical sequence number 1104 of the merge master 302), the merge master 302 may first determine whether a data version conflict 202 exists for each such update 120 (e.g., whether another update 120 of the data item 108 included in the update 120 has been processed by the merge master 302 in a subsequent merge batch 1118 with a higher global logical sequence number 1104). If such an update 120 exists, the merge master 302 may determine whether the updates 120 are mutually incompatible (e.g., according to a consistency level for the data items 108 and/or the data set 106). If the update 120 in the tentative update set 1110 is determined to be mutually incompatible with another update 120 of the same data item 108, the merge master 302 may initiate a data version conflict 202 and/or invoke a data version conflict resolution technique 304 with the mutually incompatible updates 120, including any of the data version conflict resolution techniques 304 described herein, and may produce a data version conflict resolution outcome 306 that resolves the data version conflict 202. For example, in the third stage 1134 depicted in the example scenario 1100 of FIG. 11B, the merge master 302 determines that the second update 120 in the tentative update set 1110 has a global logical sequence number 1104 that is lower than the current global logical sequence number 1104 stored by the merge master 302, and conflicts with a previously processed update 120 to the fourth data item 108 that is also involved in the update 120. The merge master 302 invokes a data version conflict resolution technique 304 that is associated with the fourth data item 108, and the data version conflict resolution technique 304 produces a data version conflict resolution outcome 306 indicating that the update 120 of the fourth data item 108 is to be dropped. For example, the data version conflict resolution technique 304 may comprise a last-writer-wins policy that prioritizes retaining the most recent value of the data item 108 according to timestamps of the updates 120, and the update 120 included in the tentative update set 1110 may have a timestamp that is earlier than the timestamp of a previously processed update 120 of the fourth data item 108. As another example, the merge master 302 determines that the third update 120 in the tentative update set 1110 also has a global logical sequence number 1104 that is lower than the current global logical sequence number 1104 stored by the merge master 302, and conflicts with a previously processed update 120 to the second data item 108 that is also involved in the update 120. The merge master 302 invokes a data version conflict resolution technique 304 that is associated with the fourth data item 108, and the data version conflict resolution technique 304 produces a data version conflict resolution outcome 306 indicating that the update 120 of the fourth data item 108 is to be kept and applied to the data set 106 (e.g., the update 120 in the tentative update set 1110 may have a later timestamp than the previously applied update 120). In some scenarios, resolving the data version conflict 202 may involve generating and adding to a merge batch 1118 a new update 120 that reconciles the new update 120 with a previously committed update; e.g., a previously committed update 120 of an incremental counter (updating the value from 3 to 5) and a currently pending update 120 of the same incremental counter (updating the value from 3 to 6) may result in the synthesis of a new update 120 that updates the value of the incremental counter from 3 to 8, thereby fulfilling the semantics of updating the data item 108 in a manner that is not provided by either of the individual updates 120.

Finally, the merge master 302 may examine updates 120 in the tentative update set 1110 that include a global logical sequence number 1104 that matches the global logical sequence number 1104 of the merge master 302. Such matching indicates that the update 120 in the tentative update set 1110 was generated after the master 116 that initiated the update 120 received the most recent merge batch 1118 provided by the merge master 302, and therefore is free of conflicts from any updates 120 that were included in any previous merge batch 1118 transmitted by the merge master 302. In such circumstances, it is possible that the update 120 conflicts with another update 120 that is pending at the merge master 302, such as a second update 120 of the same data item 108 that is included in a second tentative update set 1110 received from another master 116 that the merge master 302 is concurrently evaluating, or even another update 120 in the same tentative update set 1110. However, data version conflict resolution may be simpler in such circumstances, as the data version conflict 202 represents mutually exclusive co-pending updates 120 to the data item 108, and the selection of either update 120 is unlikely to involve an extensive rollback of any previously committed updates 120 that were included in previous merge batches 1118 transmitted by the merge master 302. Accordingly, the merge master 302 may perform a more cursory check of the fourth update 120 in the tentative update set 1110 and verify that no co-pending updates 120 involve the same data item 108 (e.g., by verifying that neither the tentative update set 1110 nor a pending merge batch 1118 includes any update 120 of the same data item 108). If any such co-pending updates 120 are identified, then a simpler data version conflict resolution technique may be applied, such as choosing one update 120 and dropping the other. In this example scenario 1100, the fourth update 120 is found to have no data version conflict 202 with any co-pending update 120 and is therefore kept.

Although not shown in the example scenario 1100 of FIG. 11B, in some variations, the merge master 302 is also designated as a master 116 of at least a portion of the data set 106 (e.g., the selected data items 108 for which the merge master 302 provides data version conflict resolution). Optionally, the merge master 302 may be designated as a master 116 for the entire data set 106 and may provide data version conflict resolution involving any data items 108. Alternatively, the merge master 302 may only be designated as a merge master 302 for a subset of the data items 108 of the data set 106, and may not be designated as a merge master 302 for other data items 108 for which the server 104 does not provide data version conflict resolution. Rather, another server 104 of the server set 102 may be designated as a merge master 302 for such other data items 108. In some variations, in accordance with its designation as a master 116, the merge master 302 may receive requests 118 to read and/or update 120 various data items 108, and may fulfill such requests 118 in a similar manner as any master 116 that has not been further designated as a merge master 302. Such variations may be advantageous, e.g., for utilizing the server 104 acting as the merge master 302 in the additional role of a master 116 that services requests 118 and thereby balancing the computational load of the data set 106, rather than allocating such tasks to a different server 104. Such variations may also be advantageous, e.g., where updates 120 are infrequent (such as a predominantly static data set 106) and/or where data version conflicts 202 are infrequent, such that adding the designation of merge master 302 to an existing master 116 does not significantly increase its computational load. In other embodiments, the merge master 302 may be reserved for handling data version conflict resolution, and as such may not be available to fulfill requests 118 to read and/or update 120 the data set 106. Such variations may be advantageous, e.g., for reserving a server 104 primarily for the task of data version conflict resolution, particularly where the updates 120 and/or data version conflicts 202 are frequent, and wherein further tasking the merge master 302 with fulfilling such requests 118 may diminish its capacity and/or throughput. In some scenarios, the merge master 302 may comprise a performance bottleneck, such that tasking the merge master 302 with the additional duties of other masters 116 may jeopardize performance criteria 122 of a workload 114 of the data set 106. In some scenarios, the availability of the merge master 302 to handle requests 118 to read or update the data set 106 may be dynamic and/or prioritized, e.g., based on the computational load of the merge master 302 and a comparison with the performance of the merge master 302 to fulfill data version conflict resolution within the performance criteria 122 of a workload 114. That is, when the resources of the merge master 302 are not significantly utilized to resolve data version conflicts 202, the merge master 302 may also receive and fulfill requests 118; and when the resources of the merge master 302 are significantly utilized to resolve data version conflicts 202, the merge master 302 may decline to receive and fulfill requests 118 in order to maintain the performance and throughput of the data version conflict resolution component of the server set 102.

In FIG. 11B, at a fourth stage 1136, the merge master 302 increments the global logical sequence number 1116, and then transmits the merge batch 1118 to the master 116 including the new global logical sequence number 1116 that distinctively identifies the merge batch 1118. The master 116 receives the merge batch 1118 and processes it in the following manner. The master 116 also includes a vector clock 1114, which, similar to the vector clock 1114 of the merge master 302, tracks the highest logical sequence number 1106 of each master 116 that has appeared in a merge batch 1118. For example, prior to receipt of the merge batch 1118 in the fourth stage 1136 of FIG. 11B, the vector clock 1114 of the second master 116 stored a value of 517, which was the highest logical sequence number 1106 among the updates 120 in previous merge batches 1118 that were associated with the second master 116.

The second master 116 uses the vector clock 1114 to process the merge batch 1118 in the following manner. First, for each master 116 with at least one update 120 included in the merge batch 1118, the master 116 updates the logical sequence number 1106 of the master 116 in the vector clock 1114 to the highest logical sequence number 1106. As shown in the fourth stage 1136 in this example scenario 1100, the merge batch 1118 only includes updates 120 for the second master 116, but the merge batch 1118 may also include updates 120 for other masters 116 that result in updating the logical sequence numbers 1106 of other masters 116 in the vector clock 1114. Next, the second master 116 determines whether the merge batch 1118 includes updates 120 for the second master 116, and upon determining that it does, prunes 1120 the tentative update set 1110 by dropping 1122 the updates 120 with logical sequence numbers 1106 that are not greater than the logical sequence number 1106 of the second master 116 in the vector clock 1114. The pruning 1120 results in dropping the first three updates 120 and keeping the last update 120, which has a logical sequence number 1106 that is higher than the highest logical sequence number 1106 in the merge batch 1118 (e.g., because the update 120 occurred after sending the tentative update set 1110 and before receiving the merge batch 1118), and which may be sent to the merge master 302 in the next tentative update set 1110.

Next, the second master 116 reviews each update 120 included in the merge batch 1118, each of which corresponds to an update 120 in the tentative update set 1110 that was sent to the merge master 302. Each such update 120 is compared with remaining updates 120 in the tentative update set 1110, after pruning 1120, to determine whether the master 116 retains any additional updates 120 of the same data items 108 in the tentative update set 1110, which indicates that the value of the data item 108 is tentative and is likely to change again with the next merge batch 1118. The first update 120 in the merge batch 1118 has no superseding update 120 in the tentative update set 1110, and is therefore committed 1126 to the data set 106. Conversely, the second update 120 in the merge batch 1118 has a superseding update 120 in the tentative update set 1110 with a later logical sequence number 1106. In this example scenario 1100, the second update 120 (corresponding to the third update 120 in the tentative update set 1110 before pruning 1120) is discarded 1128; in other scenarios, the update 120 may be applied to the data item 108 in the data set 106, while retaining the flagging of the data item 108 as tentative 1108, thereby providing an intermediate update 120 of the data item 108 even if only on an ephemeral basis. Since the first update 120 that was pruned from the tentative update set 1110 does not have any corresponding update 120 in the merge batch 1118, the first update 120 is tacitly rolled back 1124; e.g., the value of the data item 108 before the pruned update 120 is retained. As part of this process, any data items 108 that are flagged as tentative 1108 but that are no longer involved in any update 120 in the tentative update set 1110 are unflagged to indicate that no such update 120 is pending. The second master 116 and the merge master 302 thereafter continue accumulating updates 120, exchanging tentative update sets 1110 and merge batches 1118, and applying updates 120 pursuant to data version conflict resolution as performed by the merge master 302.

Although not shown in the fourth stage 1136 illustrated in FIG. 11B, the merge batch 1118 may be transmitted to the second master 116 either directly or indirectly via another master 116. Additionally, the merge batch 1118 may be generated ad-hoc for the second master 116, or may be distributed to several or all masters 116 of the server set 102, including via broadcast or multicast. Additionally, the merge batch 1118 may be limited to updates 120 initiated by the second master 116 and/or responsive only to the tentative update set 1110 received from the second master 116, or may include updates 120 for masters 116 other than the second master 116 and/or responsive to tentative update sets 1110 received from other masters 116. As another variation, the merge batch 1118 may include information about data version conflicts 202, such as the data items 108 and updates 120 that were identified as presenting a data version conflict 202; the data version conflict resolution technique 304 invoked to address the data version conflict 202; and/or the data version conflict resolution outcome 306 of such invocation, such as metadata indicating that the first and second updates 120 of the tentative update set 1110 were dropped; that the third update 120 was involved in a data version conflict 202 but retained; and/or that the fourth update 120 was, at least for the present time, cleared of any data version conflicts. Such information may include a description of how data version conflict resolution outcome 306 affected other data items 108; e.g., the merge batch 1118 may indicate that the third update 120 was retained because it supersedes a conflicting update 120 of the same data item 108. Where updates 120 are synthesized by the merge master 302 to resolve data version conflicts 202, the merge batch 1118 may specifically denote that the synthesized update 120 in the merge batch 1118 does not correspond to any update 120 from the tentative update set 1110. This indication may have to be included, e.g., because a synthesized update may not match the logical sequence number 1106 of any update 120 generated by the master 116. One such technique may involve assigning a new logical sequence number 1106 on behalf of the master 116, including a non-integer, fractional logical sequence number 1106 that indicates the position of the synthesized update 120 in the sequential order of the updates 120 initiated by the master 116 and assigned logical sequence numbers 1106. Alternatively or additionally, for some updates 120, the merge batch 1118 may imply the data version conflict resolution outcomes 306 and/or the absence of data version conflicts 202; e.g., the presence of an update 120 in the merge batch 1118 may indicate the absence of data version conflicts 202 or a data version conflict resolution outcome 306 that involves retaining the update 120. Conversely, when an update 120 in the tentative update set 1110 includes a logical sequence number 1106 that does not correspond to the logical sequence number 1106 of any update 120 in the merge batch 1118, the absence may tacitly indicate that the update 120 has been dropped, e.g., due to a determination that it is a duplicate update 120 or that it was involved in a data version conflict 202 for which the data version conflict resolution outcome 306 includes dropping the update 120.

E8. TLA+ Specification

Submitted concurrently with the present disclosure is an Appendix that demonstrates several variations of the techniques presented herein. This Appendix presents a complete TLA+ specification of a program sequence listing setting forth an example logic for configuring a master 116 and/or a merge master 302 to operate in accordance with the techniques presented herein. This program listing is to be appreciated as non-limiting, e.g., not as the sole embodiment of the techniques presented herein, but as one possible implementation of the merging multi-master server set described herein.

F. Computing Environment

Figure 12:
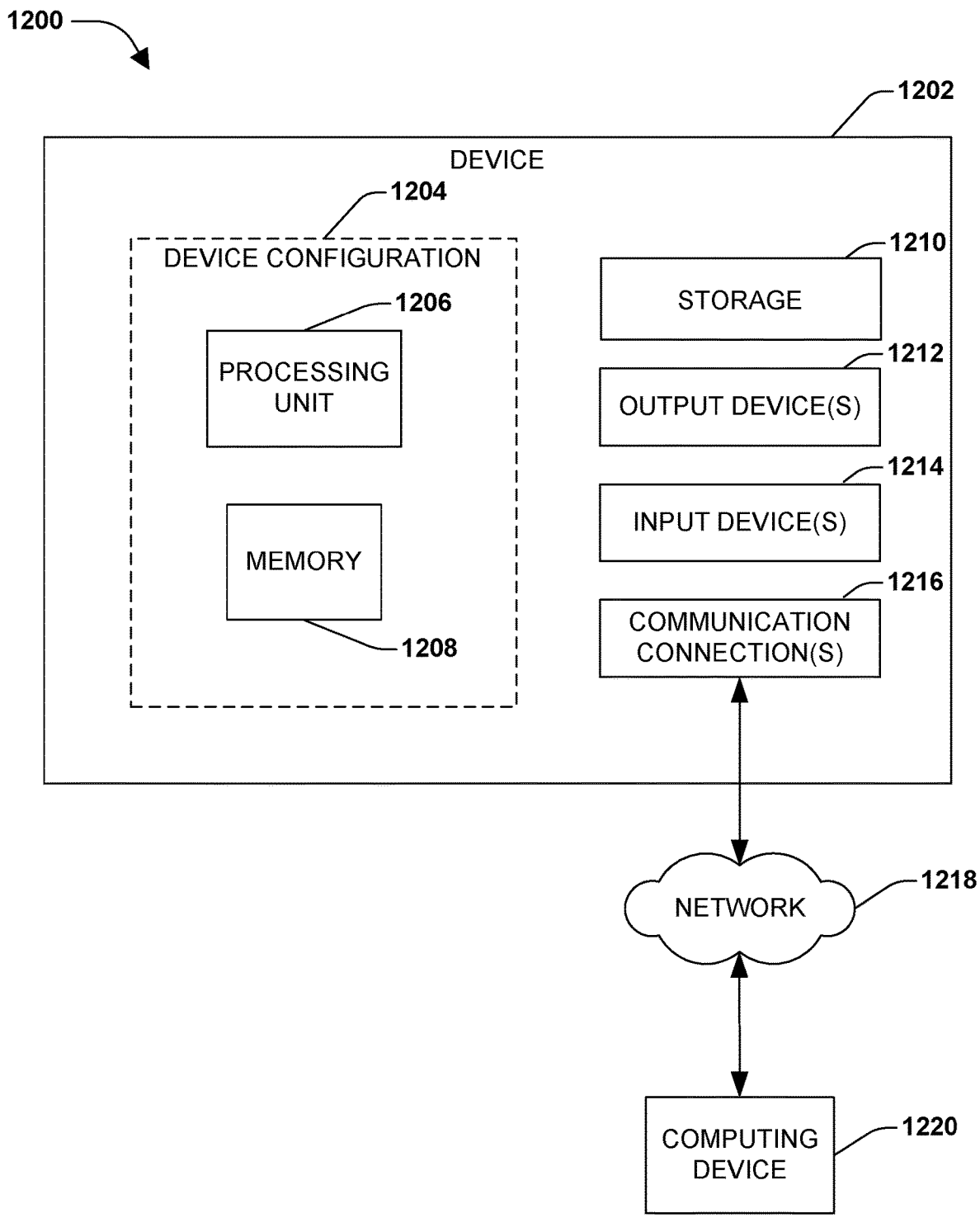
FIG. 12 is a component block diagram illustrating an example server featuring an example system for configuring a server set to provide a data set in accordance with the techniques presented herein.

FIG. 12 illustrates an example scenario 1200 featuring a system comprising a computing device 1202 configured to implement one or more embodiments provided herein. In one configuration, computing device 1202 includes at least one processing unit 1206 and memory 1208. Depending on the exact configuration and type of computing device, memory 1208 may be volatile (such as RAM, for example), non-volatile (such as ROM, flash memory, etc., for example) or some combination of the two. This configuration is illustrated in FIG. 12 by dashed line 1204.

In other embodiments, device 1202 may include additional features and/or functionality. For example, device 1202 may also include additional storage (e.g., removable and/or non-removable) including, but not limited to, magnetic storage, optical storage, and the like. Such additional storage is illustrated in FIG. 12 by storage 1210. In one embodiment, computer readable instructions to implement one or more embodiments provided herein may be in storage 1210. Storage 1210 may also store other computer readable instructions to implement an operating system, an application program, and the like. Computer readable instructions may be loaded in memory 1208 for execution by processing unit 1206, for example.

The term "computer readable media" as used herein includes computer storage media. Computer storage media includes volatile and nonvolatile, removable and non-removable media implemented in any method or technology for storage of information such as computer readable instructions or other data. Memory 1208 and storage 1210 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1202. Any such computer storage media may be part of device 1202.

Device 1202 may also include communication connection(s) 1216 that allows device 1202 to communicate with other devices. Communication connection(s) 1216 may include, but is not limited to, a modem, a Network Interface Card (NIC), an integrated network interface, a radio frequency transmitter/receiver, an infrared port, a USB connection, or other interfaces for connecting computing device 1202 to other computing devices. Communication connection(s) 1216 may include a wired connection or a wireless connection. Communication connection(s) 1216 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1202 may include input device(s) 1214 such as keyboard, mouse, pen, voice input device, touch input device, infrared cameras, video input devices, and/or any other input device. Output device(s) 1212 such as one or more displays, speakers, printers, and/or any other output device may also be included in device 1202. Input device(s) 1214 and output device(s) 1212 may be connected to device 1202 via a wired connection, wireless connection, or any combination thereof. In one embodiment, an input device or an output device from another computing device may be used as input device(s) 1214 or output device(s) 1212 for computing device 1202.

Components of computing device 1202 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1202 may be interconnected by a network. For example, memory 1208 may be comprised of multiple physical memory units located in different physical locations interconnected by a network.

Those skilled in the art will realize that storage devices utilized to store computer readable instructions may be distributed across a network. For example, a computing device 1220 accessible via network 1218 may store computer readable instructions to implement one or more embodiments provided herein. Computing device 1202 may access computing device 1220 and download a part or all of the computer readable instructions for execution. Alternatively, computing device 1202 may download pieces of the computer readable instructions, as needed, or some instructions may be executed at computing device 1202 and some at computing device 1220.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of resolving data version conflicts within a data set provided by a server set including a plurality of servers, the method comprising:
   executing, by a processor of a first server of the server set, instructions that cause the first server to:
      identify a data version conflict involving at least two mutually incompatible updates of the data set;
      identify, within the server set, a second server designated as a merge master, the merge master being designated to resolve data version conflicts of the data set;
      receive, from the second server designated as the merge master, a conflict resolution outcome of the data version conflict;
      responsive to a request to apply an update to the data set, store the update in a tentative update set and forward the update to the second server designated as the merge master, wherein respective updates are associated with a logical sequence number, and wherein the conflict resolution outcome further specifies a global logical sequence number of updates included in the conflict resolution outcome; and
      responsive to the second server determining that the update is not included in the conflict resolution outcome based on the global logical sequence number exceeding the logical sequence number of the update, discard the update from the tentative update set.

2. The method of claim 1, wherein executing the instructions further causes the first server to:
   receive, from a client, a request to read a portion of the data set that is involved in a data version conflict;
   selecting at least one read response from a read response set consisting of:
      a pre-update read of the data set prior to applying the update in the tentative update set, and
      a post-update read of the data set after applying the update in the tentative update set; and
   sending the at least one read response selected from the read response set to the client.

3. The method of claim 2, wherein:
the data set is provided according to a consistency level; and
selecting the at least one read response further comprises:
selecting the at least one read response based at least in part on the consistency level of the data set.

4. The method of claim 1, wherein executing the instructions further causes the first server to:
receive a request by a client for a data item that is involved in the update stored in the tentative update set; and
providing to the client, with the data item, an update status of the data item.

5. A method of providing a data set by a server set including a plurality of servers, the method comprising:
designating two or more servers of the plurality of servers as masters of the data set;
designating a first server from the two or more servers as a merge master of the data set;
configuring one or more non-master servers from the plurality of servers to forward updates of the data to set one or more of the two or more masters;
configuring the two or more servers designated as masters to:
apply the updates to the data set; and
identify a data version conflict involving at least two mutually incompatible updates of the data set; and
further configuring the first server designated as the merge master to:
apply a conflict resolution technique to the mutually incompatible updates to generate the conflict resolution outcome; and
forward the conflict resolution outcome to at least one other master of the server set; wherein forwarding the conflict outcome includes:
temporarily storing the conflict resolution outcome in a conflict resolution outcome batch until a batch transmit condition is detected, wherein the batch transmit condition is based on one or more of a quantity of conflict resolution outcomes in the conflict resolution outcome batch or a period of time associated with the conflict resolution outcome batch; and
in response to detecting the batch transmit condition, transmitting the conflict resolution outcome to one or more additional servers designated as masters of the dataset.

6. The method of claim 5, wherein the batch transmit condition is based on one or more of:
a batch time as compared with a batch period threshold;
a batch age as compared with a batch age threshold;
a batch data volume as compared with a batch volume threshold;
a batch item count as compared with a batch item count threshold; and
a batch priority as compared with a batch priority threshold.

7. The method of claim 5, wherein:
the merge master further generates a sequence of global logical sequence numbers; and
transmitting the conflict resolution outcome batch further comprises:
attaching a current global logical sequence number to the conflict resolution outcome batch; and
incrementing the current global logical sequence number.

8. The method of claim 5, wherein:
the plurality of servers further comprises a routing map for propagating conflict resolution outcome throughout the plurality of servers; and
forwarding the conflict resolution outcome further comprises: forwarding the conflict resolution outcome to two or more masters of the plurality of servers according to the routing map.

9. The method of claim 5, wherein:
respective servers of the plurality of servers have a proximity with respect to other servers of the plurality of servers; and
designating the merge master further comprises: selecting a first master to designate as the merge master according to the proximity of the merge master with respect to the masters of the plurality of servers.

10. The method of claim 5, further comprising:
monitoring a computational load of the server designated as the merge master; and
responsive to determining that the computational load of the merge master exceeds a computational load threshold:
removing the designation of the server as the merge master; and
designating a second master as the merge master of the server set.

11. The method of claim 5, further comprising:
storing a set of subscribers of updates of the data set; and
responsive to receiving the conflict resolution outcome, notifying the set of subscribers of the conflict resolution outcome.

12. The method of claim 5, further comprising:
storing an update feed that indicates updates to the data set; and
presenting the update feed to a client inquiring about updates to the data set.

13. A first server of a server set including a plurality of servers that resolves data version conflicts within a data set, the first server comprising:
a processor; and
a memory storing instructions that, when executed by the processor, cause the first server to:
identify a data version conflict involving at least two mutually incompatible updates of the data set;
identify, within the server set, a second server designated as a merge master, the merge master being designated to resolve data version conflicts of the data set;
receive, from the second server designated as the merge master, a conflict resolution outcome of the data version conflict;
responsive to a request to apply an update to the data set, store the update in a tentative update set and forward the update to the second server designated as the merge master, wherein respective updates are associated with a logical sequence number, and wherein the conflict resolution outcome further specifies a global logical sequence number of updates included in the conflict resolution outcome; and
responsive to the second server determining that the update is not included in the conflict resolution outcome based on the global logical sequence number exceeding the logical sequence number of the update, discard the update from the tentative update set.

14. The first server of claim 13, wherein:

the server set further comprises at least one replica of the server; and execution of the instructions further causes the first server to propagate the tentative update set to the at least one replica.

15. The first server of claim 13, wherein:

the memory further stores a vector clock representing, for each master of the server set, a logical sequence number that identifies a latest update received from the master;

respective updates issued by an issuing master further comprise an update logical sequence number generated by the issuing master; and receiving the conflict resolution outcome further comprises: comparing the logical sequence number identifying each mutually incompatible update with the logical sequence number of the merge master that issued the mutually incompatible update recorded in the vector clock.

\* \* \* \* \*